US012158992B1

(12) United States Patent
Yan et al.

(10) Patent No.: US 12,158,992 B1
(45) Date of Patent: Dec. 3, 2024

(54) SYSTEMS FOR INTERPRETING THUMB MOVEMENTS OF IN-AIR HAND GESTURES FOR CONTROLLING USER INTERFACES BASED ON SPATIAL ORIENTATIONS OF A USER'S HAND, AND METHOD OF USE THEREOF

(71) Applicant: Meta Platforms Technologies, LLC, Menlo Park, CA (US)

(72) Inventors: Chengyuan Yan, San Bruno, CA (US); Willy Huang, San Francisco, CA (US); Joseph Davis Greer, Portland, OR (US); Sheng Shen, Shoreline, WA (US); Szeyin Lee, Seattle, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 18/312,571

(22) Filed: May 4, 2023

Related U.S. Application Data

(60) Provisional application No. 63/402,893, filed on Aug. 31, 2022, provisional application No. 63/346,777, filed on May 27, 2022.

(51) Int. Cl.
G06F 3/01 (2006.01)
G06V 40/10 (2022.01)

(52) U.S. Cl.
CPC .............. *G06F 3/017* (2013.01); *G06V 40/11* (2022.01)

(58) Field of Classification Search
CPC ...................................... G06F 3/017
See application file for complete search history.

(56) References Cited

U.S. PATENT DOCUMENTS

2018/0073889 A1* 3/2018 Vigilante .............. G06F 3/0481
2018/0153430 A1 6/2018 Ang et al.
(Continued)

FOREIGN PATENT DOCUMENTS

CN 114206654 A 3/2022

OTHER PUBLICATIONS

Invitation to Pay Additional Fees for International Application No. PCT/US2023/023748 mailed Sep. 12, 2023, 19 pages.
(Continued)

*Primary Examiner* — Gustavo Polo
(74) *Attorney, Agent, or Firm* — Morgan, Lewis & Bockius LLP

(57) ABSTRACT

Methods of interpreting in-air hand gestures based on orientations of a wrist-wearable device are provided. The method includes receiving, from sensors of a wrist-wearable device, data associated with performance of an in-air hand gesture during a first period of time. The method includes, when determining the data indicates that the wrist-wearable device had a first orientation when the in-air hand gesture was performed during the first period of time, causing performance of a first operation. The method includes receiving, from sensors of the wrist-wearable device, new data associated with performance of the in-air hand gesture during a second period of time, the second period of time being after the first period of time. The method includes, when determining that the new data indicates that the wrist-wearable device had a second orientation when the in-air hand gesture was performed during the second period of time, causing performance of a second operation.

20 Claims, 34 Drawing Sheets

(56) References Cited

U.S. PATENT DOCUMENTS

2021/0096726 A1  4/2021  Faulkner et al.
2022/0258606 A1  8/2022  Kassner

OTHER PUBLICATIONS

International Search Report and Written Opinion for International Application No. PCT/US2023/023748, mailed Nov. 3, 2023, 23 pages.

* cited by examiner

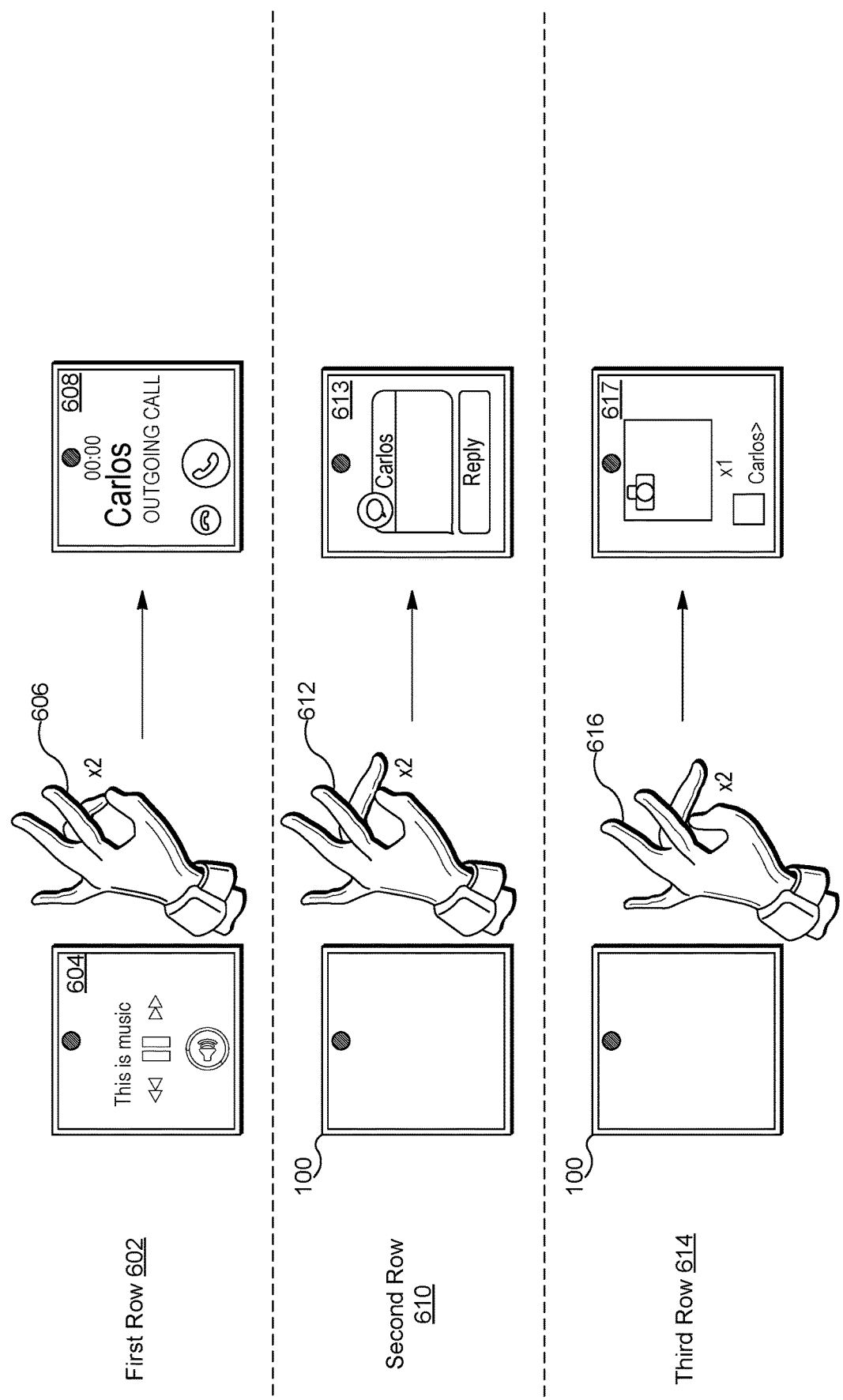

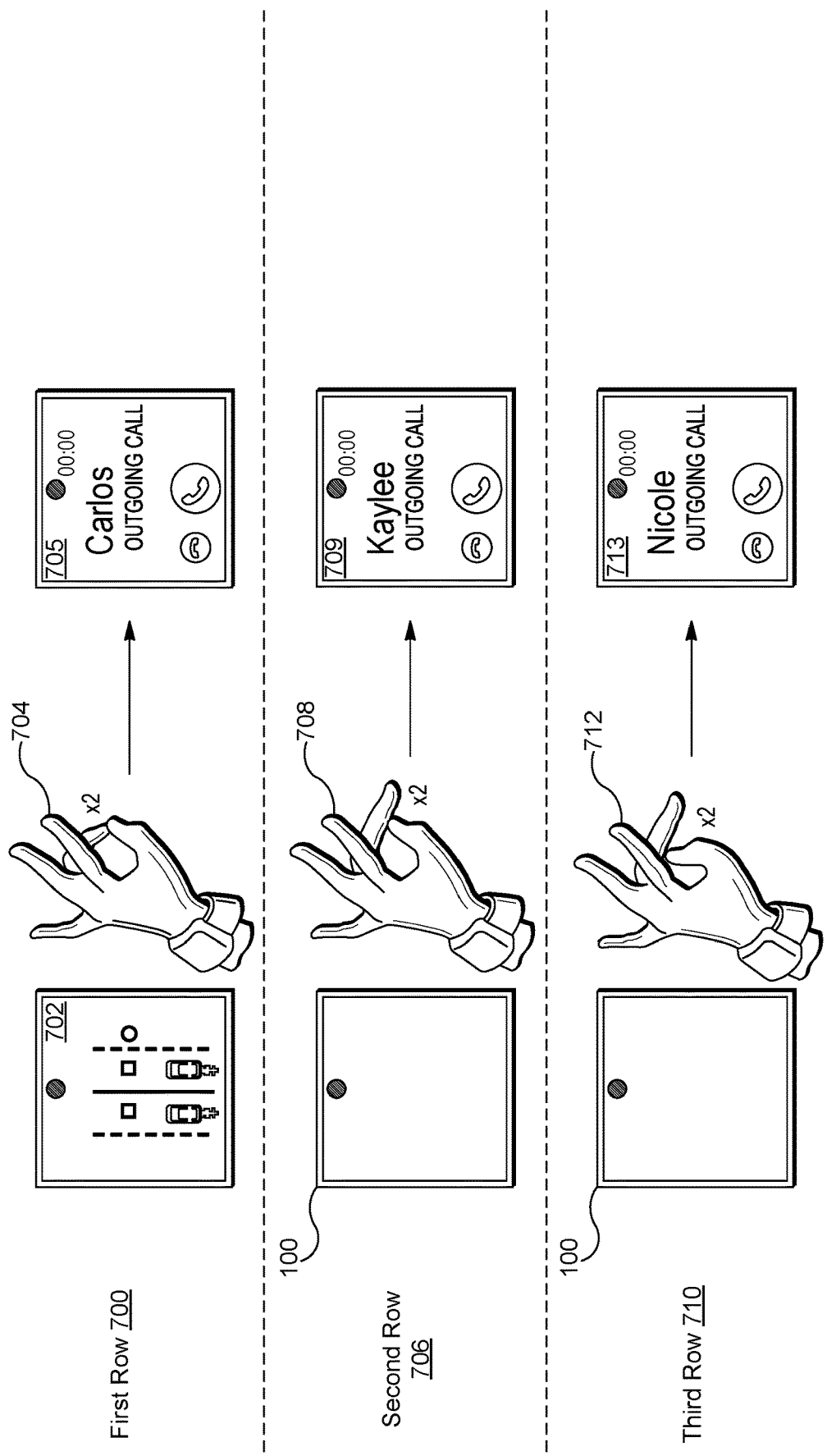

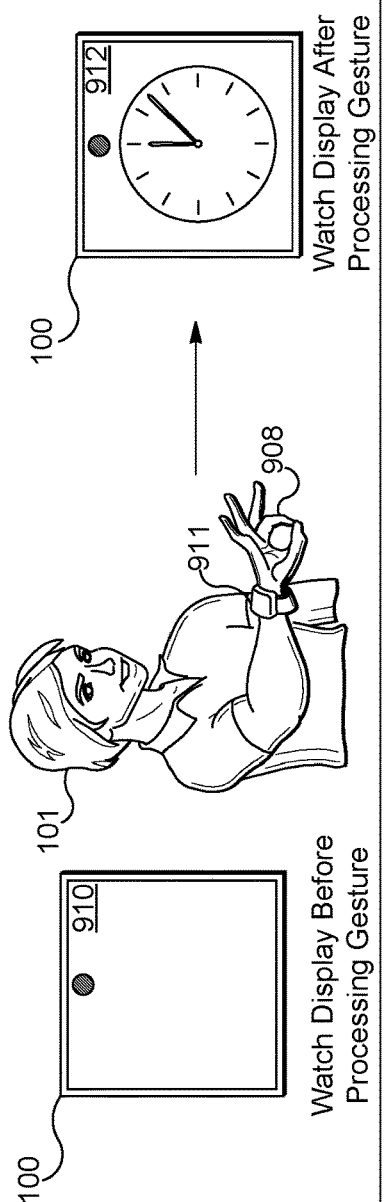

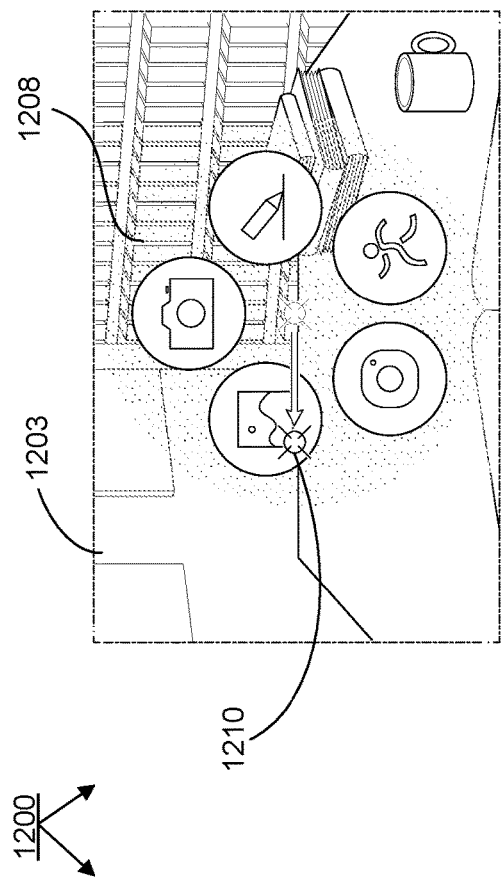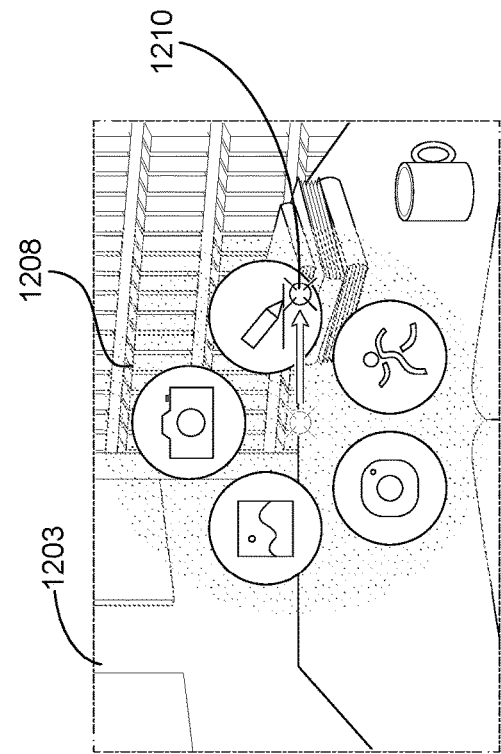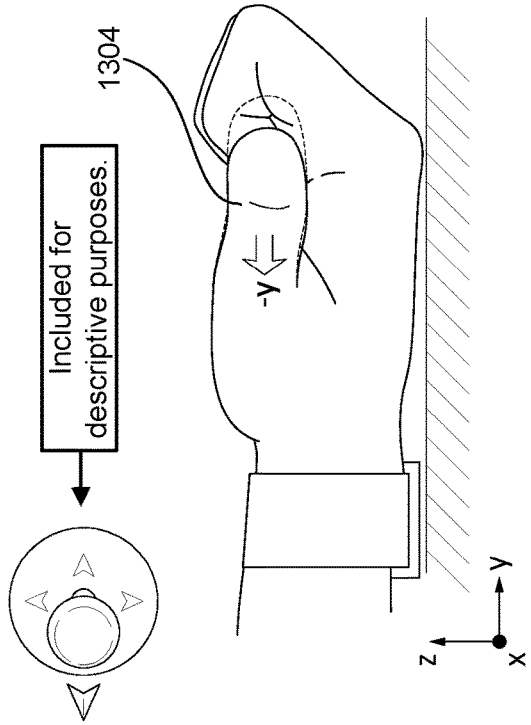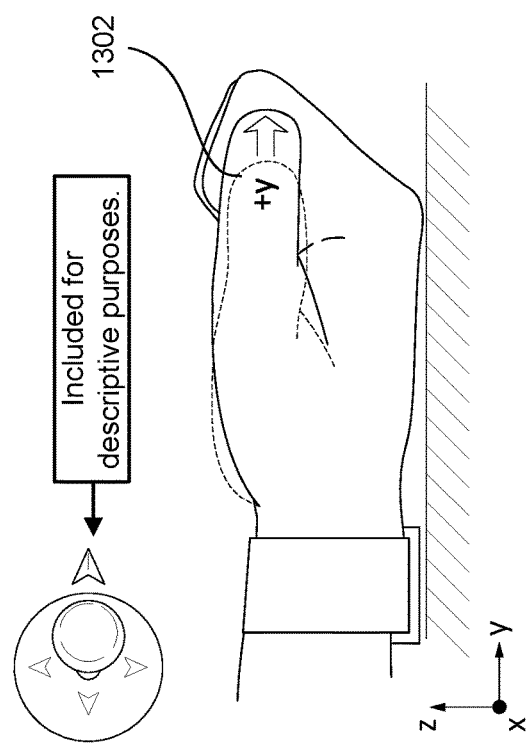
Figure 13B
Figure 13C

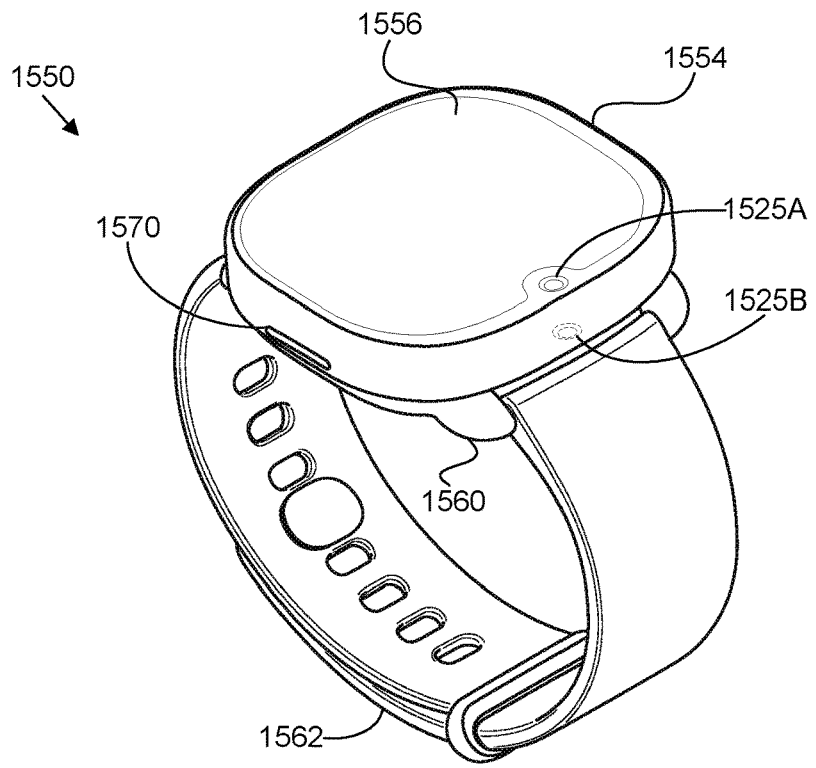
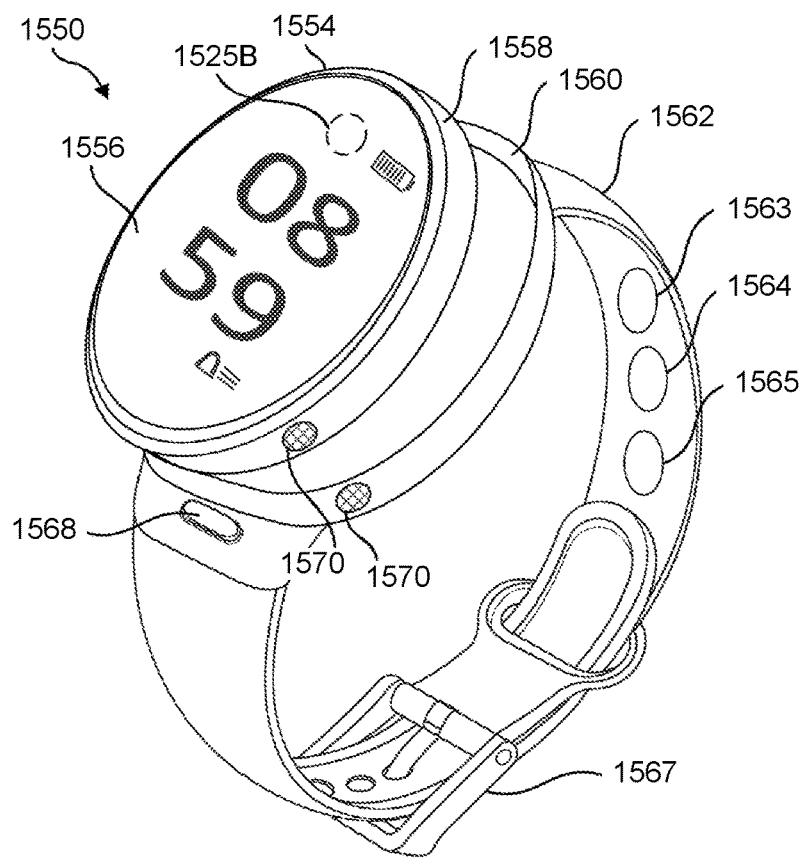
Figure 15A

2100

2102 Detect, using one or more sensors of a wearable electronic device, a performance of a first in-air hand gesture, including a first movement of a user's thumb.

2104 The wearable electronic device is a wrist-wearable device.

2106 The wrist-wearable device has a display, and the first operation causes movement of a first focus selector in a first direction, within a first user interface displayed on the display of the wrist-wearable device.

2108 The wrist-wearable device is a physical wrist-wearable device.

2110 The physical wrist-wearable device includes one or more neuromuscular-signal-sensing electrodes, and the performance of one of the first in-air hand gesture and the second in-air hand gesture is detected by at least one of the one or more neuromuscular-signal-sensing electrodes.

2112 The physical wrist-wearable device includes one or more inertial measurement unit (IMU) sensors disposed at the physical wrist-wearable device, and the IMU sensors are configured to detect one or more of the first in-air hand gesture and the second in-air hand gesture.

2114 The first movement includes motion of the thumb of the user in a lateral direction along an index finger of the user from a first location on the index finger to a second location on the index finger.

2116 The first movement includes a downward press gesture by the user's thumb on the index finger at the first location and/or the second location.

2118 Based on a hand of the user being in a first spatial orientation, cause performance of a first operation of a predetermined set of operations at the wearable electronic device.

2120 The first spatial orientation corresponds to an orientation in which a display of the wearable electronic device is within the viewing range of the user such that the display is visible to the user.

Figure 21A

SYSTEMS FOR INTERPRETING THUMB MOVEMENTS OF IN-AIR HAND GESTURES FOR CONTROLLING USER INTERFACES BASED ON SPATIAL ORIENTATIONS OF A USER'S HAND, AND METHOD OF USE THEREOF

CROSS-REFERENCE TO RELATED APPLICATIONS

This application claims priority to U.S. Prov. App. No. 63/346,777, filed on May 27, 2022, and entitled "Systems for Interpreting Hand Gestures Detected Via a Sensor of a Wearable Device to cause Performance of Different Operations Based on Operational Context and/or Spatial Orientation of the Wearable Device, and Methods of Use thereof," and U.S. Prov. App. No. 63/402,893, filed on Aug. 31, 2022, and entitled "Systems for Interpreting Thumb Movements of In-Air Hand Gestures for Controlling User Interfaces based on Spatial Orientations of a User's Hand, and Method of Use Thereof," each of which is hereby incorporated by reference in their entirety.

TECHNICAL FIELD

This application relates generally to wearable devices (e.g., wrist-wearable devices), including but not limited to interpreting hand gestures (e.g., connecting digits of the same hand together so that two or more digits contact each other) and thumb movements (e.g., thumb movements on a virtual directional-pad) detected via one or more sensors (e.g., an inertial measurement unit (IMU) or an electrode for sensing neuromuscular signals, such as electromyography (EMG) signals) of a wearable device to cause performance of different operations based on operational context (e.g., a current display or application state of the wearable device) and/or spatial orientation of the wearable device (e.g., positions of the wearable device in three-dimensional space, including orientations in which the wearable device is positioned near a user's ear and below or above the user's chin as well as the direction that a display of the wrist-wearable device is facing relative to a viewing range of the user).

BACKGROUND

Wearable electronic devices, such as wrist-wearable electronic devices (e.g., smart watches) and head-wearable devices (e.g., artificial-reality (AR) glasses, virtual-reality (VR) goggles, etc.) are gaining popularity, and users are gradually integrating more of such wearable devices into their everyday lives. While there are many positive aspects of such wearable electronic devices, there are also constraints and unresolved issues. For example, conventional wearable devices often have small displays that require precise inputs to interact with them, which can make such interactions difficult. This can lead to causing performance of unintended operations due to accidentally activating a feature with an imprecise or incorrectly interpreted touch input and/or creating situations in which it takes users a frustratingly long period of time to perform, or access and/or locate, a desired operation.

Further, users can experience ambiguity when interacting with user interfaces that are not part of a more conventional such as a keyboard and mouse for a laptop or desktop computer, or a touch-sensitive screen of a smart phone or tablet. Further, complications can arise when users are using multiple wearable devices at once. For example, a user can be wearing a head-wearable device and also interacting with a second electronic device (e.g., a wrist-wearable device).

Improved and/or simpler gesture spaces are thus needed, so users can interact with wearable electronic devices in an efficient, convenient, and intuitive manner.

SUMMARY

The embodiments discussed herein address one or more of the problems and drawbacks discussed above, for example, by interpreting in-air hand gestures detected via a sensor (e.g., IMU sensors, EMG sensors, and the like) of a wearable device by accounting for the wearable device's operational context and/or spatial orientation to cause performance of appropriate and intuitive operations.

The systems and methods described herein facilitate improved man-machine interfaces by providing convenient, efficient, and intuitive control of a computing system that includes, for example multiple user interfaces, and/or a user interface with multiple concurrent modes of performing operations (e.g., user navigation and camera controls). In some embodiments, the computing system includes a user interface presented at a head-wearable device (e.g., augmented-reality glasses or virtual-reality goggles), and a separate user interface at a wrist-wearable device, and the systems and methods described herein provide for improved and convenient disambiguation of gestures performed by the user that correspond to operations at either of the user interfaces. In some examples, the same predetermined subset of operations (e.g., navigation) are available at both user interfaces. For example, a gesture can correspond to a movement of a focus selector in the user interface presented by the head-wearable device, and the same gesture can correspond to a movement of another focus selector in the other user interface of the wrist-wearable device. The systems and methods described herein provide for an efficient way for a user to control which respective user interface is being targeted by the respective gestures that correspond to the same operations at both interfaces.

Further, in some examples, the gesture control is intuitive by accounting for how the spatial orientation affects the expected behavior of the user interfaces corresponding to the performed gestures. For example, the same movement of a user's thumb relative to (e.g., along) the hand can correspond to different directions with respect to the user's physical environment (e.g., a thumb movement toward the palm of the hand is downward when the user's palm is facing downward, whereas the same thumb movement toward the palm of the hand is upwards when the user's palm is facing upwards). In this way, the systems and methods described herein provide intuitive and seamless interactions with the respective user interfaces by accounting for how the different spatial orientations of the hand affect the expected behavior at the respective user interfaces.

As described herein, a spatial orientation of a wearable electronic device can be used to disambiguate how in-air hand gestures that include the same or similar thumb movements (detected via the wearable electronic device) are interpreted, including how such thumb gestures can be used to control different electronic devices. For example, if a user is wearing a wearable electronic device, and the wearable electronic device has a first spatial orientation (e.g., the wearable device is oriented such that a display of the wearable device is within a predefined viewing range of a user), then in-air hand gestures that include a particular thumb movement control the wearable device, whereas if the wearable device has a second spatial orientation (e.g., the wearable device is oriented such that the display of the wearable device is not viewable by the user because the user's wrist has been rotated away from their body), then in-air hand gestures with the same thumb movements (e.g., involving the same physical movement relative to the rest of the hand of the user) control a second electronic device that is in communication with the wearable electronic device, such as a head-wearable device. In circumstances in which no second electronic device is connected, then the in-air hand gesture can be ignored or cause a different operation to be performed than the operation corresponding to the in-air hand gesture being performed while the user's hand is in the first spatial orientation. Further, thumb movements associated with in-air gestures can be interpreted differently depending on whether the gesture is determined to be directed to a wrist-wearable device or to a head-wearable device. In this example, the interpretation is essentially inverted such that downward movement of the thumb across a surface of the user's index finger can be interpreted to cause a downward movement within a user interface on the wrist-wearable device (e.g., based on an orientation of the wrist-wearable device being toward the user's upper body and head). When the user's hand is rotated 90 degrees or 180 degrees in a radial direction, then that same downward movement of the thumb can be interpreted differently. And after, for example, a 180-degree rotation, the downward thumb movement now is more appropriately understood as an upward movement of the user's thumb given the different orientation of the user's hand after the 180 degrees of rotation. The techniques discussed herein take advantage of these observations to ensure that, after rotation, the thumb movement gestures are appropriately interpreted within an artificial-reality environment, and/or a two-dimensional display, and the like.

As one first example method that is briefly summarized below, in-air hand gestures can be interpreted to cause performance of context-specific or context-agnostic operations, thereby enabling users to quickly and efficiently learn new gesture spaces and associate in-air hand gestures with the performance of corresponding operations. The delineation and selection of the context-specific and context-agnostic operations, and their respective associations with certain in-air hand gestures can be carefully and intuitively selected to ensure quick user adoption and acceptance, thus facilitating new sustained interactions and improved man-machine interfaces.

A further summary of this first example method will now be provided. This first example method for interacting with a wrist-wearable device occurs while displaying, via a display of a wrist-wearable device that includes one or more sensors for detecting signals associated with performance of in-air hand gestures, a user interface. The first example method includes, receiving, via a biometric sensor of the one or more sensors, a first biometric signal associated with performance of an in-air hand gesture, and after receiving the first biometric signal, performing a context-specific operation at the wrist-wearable device. The method also includes, receiving, via the biometric sensor, a second biometric signal associated with performance of another in-air hand gesture, the other in-air hand gesture being distinct from the in-air hand gesture. The method can also include, after receiving the second biometric signal, performing a context-agnostic operation distinct from the context-specific operation at the wrist-wearable device. The method also includes, after ceasing to display the user interface, receiving, via the biometric sensor, a third biometric signal associated with a second performance of the same type of in-air hand gesture, and after receiving the third biometric signal, forgoing performing the context-specific operation. Further, the method can also include, after ceasing to display the user interface, receiving, via the one or more biometric sensors, a fourth biometric signal associated with a second performance of the other in-air hand gesture, and after receiving the fourth biometric signal, performing the context-agnostic operation at the wrist-wearable device.

A second example method will next be briefly summarized: in-air hand gestures can also (as an alternative, or in addition, to the context-based interpretation space summarized for the first example method above) be interpreted based on the wearable device's spatial orientation (e.g., based on position on the device itself in three-dimensional space, which can also be determined based on a hand pose of the user's hand that is wearing the device) when a respective in-air hand gesture is performed, which can help to ensure that the same in-air hand gesture can cause performance of different operations as the wearable device moves to different spatial orientations. This can mean that an in-air hand gesture that includes performing a movement and/or a contact of the user's thumb and index finger a predetermined number of times (e.g., one, two, or three) can cause different operations depending on the spatial orientation the wearable device is in when the in-air hand gesture is performed. This allows for a flexible, intuitive, and easily-learned gesture interaction, which facilitates new sustained interactions and improved man-machine interfaces.

A third example method will next be briefly summarized. The third example method includes operations for interpreting in-air hand gestures based on orientation of a wrist-wearable device includes receiving, from one or more sensors of a wrist-wearable device, data associated with performance of an in-air hand gesture during a first period of time by a wearer of the wrist-wearable device. The other method includes, in accordance with determining that the data indicates that the wrist-wearable device had a first orientation when the in-air hand gesture was performed during the first period of time, causing performance of a first operation at the wrist-wearable device. The other method also includes, receiving, from the one or more sensors of the wrist-wearable device, new data associated with performance of the in-air hand gesture during a second period of time by the wearer of the wrist-wearable device, the second period of time being after the first period of time. The other method also includes, in accordance with determining that the new data indicates that the wrist-wearable device had a second orientation when the in-air hand gesture was performed during the second period of time, causing performance of a second operation at the wrist-wearable device, where the second operation is distinct from the first operation, and the second orientation of the wrist-wearable device is distinct from the first orientation of the wrist-wearable device.

A fourth example method will next be briefly summarized. The fourth example method provides for using thumb-based in-air gestures detected via a wearable device to control two different electronic devices. The method includes, in response to detecting, using one or more sensors of a wearable electronic device, a performance of a first in-air hand gesture, including a first movement of a thumb of a user, while the wearable electronic device has a first spatial orientation relative to a viewing range of the user, causing performance of a first operation of a predetermined set of operations to be performed at the wearable electronic device. The method further includes, while the wearable electronic device is in communication with a second electronic device that is distinct and separate from the wearable electronic device, in response to detecting, using the one or more sensors, a performance of a second in-air hand gesture, including the first movement of the thumb of the user, while the wearable electronic device has a second spatial orientation relative to the viewing range of the user, wherein the second spatial orientation is distinct from the first spatial orientation, causing performance of a second operation, distinct from the first operation, of the predetermined set of operations to be performed at the second electronic device.

In some embodiments, a computing system (e.g., an artificial-reality system that includes a wrist-wearable device and a head-wearable device) includes one or more processors, memory, one or more means (e.g., a display or projector) of presenting a user interface, and one or more programs stored in memory. The one or more programs are configured for execution by the one or more processors. The one or more programs include instructions for performing any of the methods described herein (e.g., the methods 1900, 2000, and 2100).

In some embodiments, a non-transitory computer-readable storage medium stores one or more programs configured for execution by a computing device (e.g., a wrist-wearable device or a head-wearable device, or another connected device, such as a smartphone or desktop or laptop computer that can be configured to coordinate operations at the wrist-wearable device and the head-wearable device), having one or more processors, memory, and a display (in some embodiments, the display can be optional, such as for example certain connected devices that can coordinate operations to be performed at the wrist-wearable device and/or the head-wearable device, and thus have processing and power resources, but need not have their own displays). The one or more programs include instructions for performing (or causing performance of) any of the methods described herein (e.g., the methods 1900, 2000, and 2100).

Thus, methods, systems, and computer-readable storage media are disclosed for detecting in-air and surface gestures in an artificial-reality environment. Such methods can complement or replace conventional methods for interacting with an artificial-reality environment. Having summarized the above example aspects, a brief description of the drawings will now be presented.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 6 illustrates that one of a user's fingers can be associated with a specific contact, and gestures performed by one or more phalanxes on the user's finger can be associated with a different operation, in accordance with some embodiments.

FIG. 7 illustrates that a single finger can be associated with a certain operation, and each phalanx of that finger can be associated with a different contact, in accordance with some embodiments.

FIG. 9A-9C illustrate performing a second in-air hand gesture (distinct from the first in-air hand gesture illustrated for FIGS. 8A-8C) while the wrist-wearable device has different orientations, in accordance with some embodiments.

FIGS. 13A-13F illustrate another example user scenario with an example computing system (e.g., including at least a head-wearable device and a wrist-wearable device), in accordance with some embodiments.

FIGS. 15A-15C illustrate an example wrist-wearable device, in accordance with some embodiments.

FIGS. 21A-21B are flow diagrams illustrating a method for controlling user interfaces at separate electronic devices, in accordance with some embodiments.

Figure 1:
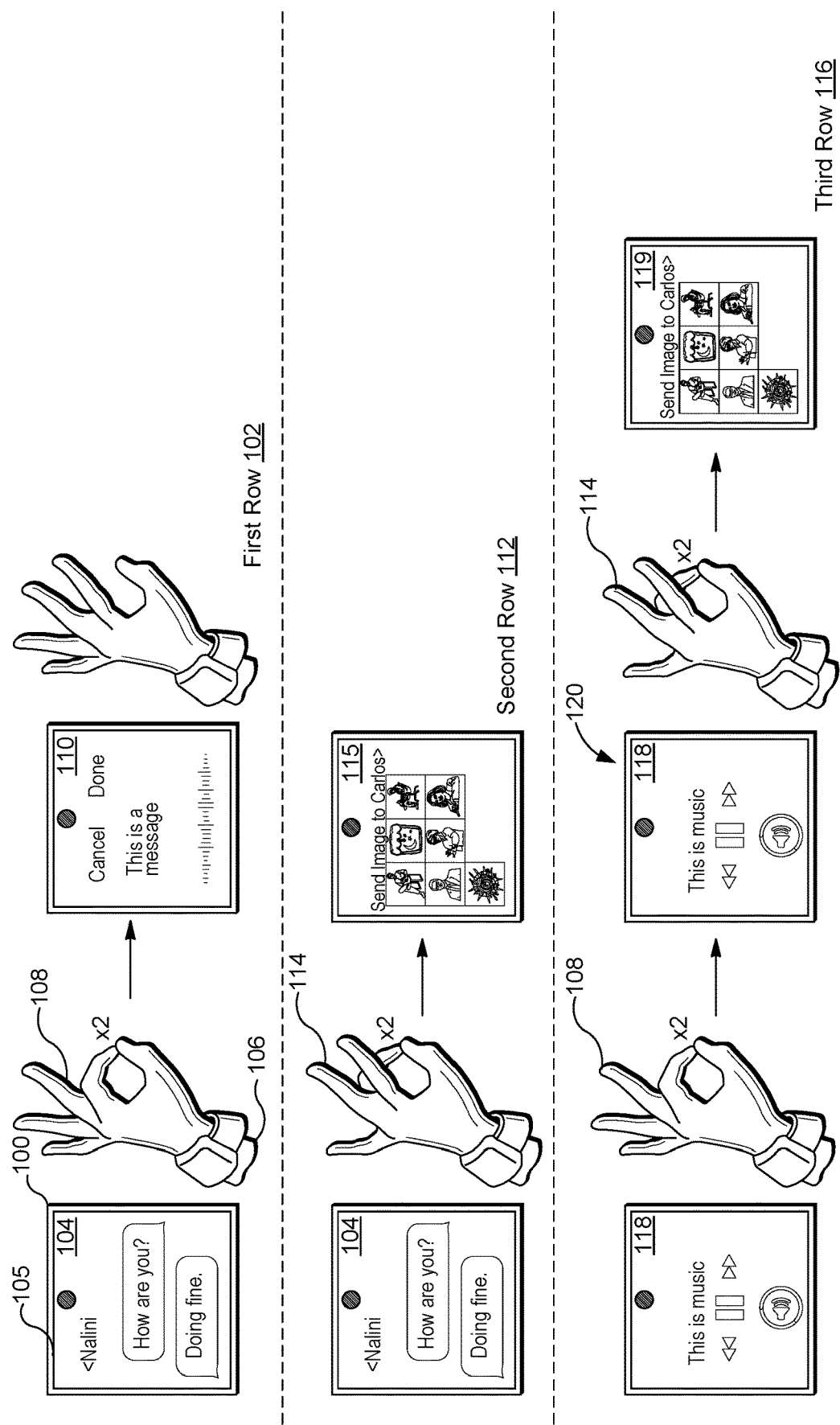
FIG. 1 illustrates scenarios in which a wrist-wearable device is controlled using hand gestures that are interpreted to cause context-specific or context-agnostic gestures, in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DETAILED DESCRIPTION

Numerous details are described herein, to provide a thorough understanding of the example embodiments illustrated in the accompanying drawings. However, some embodiments can be practiced without many of the specific details, and the scope of the claims is only limited by those features and aspects specifically recited in the claims. Furthermore, well-known processes, components, and materials have not necessarily been described in exhaustive detail, to avoid obscuring pertinent aspects of the embodiments described herein.

Embodiments of this disclosure can include or be implemented in conjunction with various types or embodiments of artificial-reality systems. Artificial-reality (AR), as described herein, is any superimposed functionality and or sensory-detectable presentation provided by an artificial-reality system within a user's physical surroundings. Such artificial-realities can include and/or represent virtual reality (VR), augmented reality, mixed artificial-reality (MAR), or some combination and/or variation one of these. For example, a user can perform a swiping in-air hand gesture to cause a song to be skipped by a song-providing API providing playback at, for example, a home speaker. An AR environment, as described herein, includes, but is not limited to, VR environments (including non-immersive, semi-immersive, and fully immersive VR environments); augmented-reality environments (including marker-based augmented-reality environments, markerless augmented-reality environments, location-based augmented-reality environments, and projection-based augmented-reality environments); hybrid reality; and other types of mixed-reality environments.

Artificial-reality content can include completely generated content or generated content combined with captured (e.g., real-world) content. The artificial-reality content can include video, audio, haptic events, or some combination thereof, any of which can be presented in a single channel or in multiple channels (such as stereo video that produces a three-dimensional effect to a viewer). Additionally, in some embodiments, artificial reality can also be associated with applications, products, accessories, services, or some combination thereof, which are used, for example, to create content in an artificial reality and/or are otherwise used in (e.g., to perform activities in) an artificial reality.

A hand gesture, as described herein, can include an in-air gesture, a surface-contact gesture, and or other gestures that can be detected and determined based on movements of a single hand (e.g., a one-handed gesture performed with a user's hand that is detected by one or more sensors of a wearable device (e.g., electromyography (EMG) and/or inertial measurement units (IMU)s of a wrist-wearable device) and/or detected via image data captured by an imaging device of a wearable device (e.g., a camera of a head-wearable device)) or a combination of the user's hands. In-air means, in some embodiments, that the user hand does not contact a surface, object, or portion of an electronic device (e.g., the head-wearable device 110 or other communicatively coupled device, such as the wrist-wearable device 120), in other words the gesture is performed in open air in 3D space and without contacting a surface, an object, or an electronic device. Surface-contact gestures (contacts at a surface, object, body part of the user, or electronic device) more generally are also contemplated in which a contact (or an intention to contact) is detected at a surface (e.g., a single or double finger tap on a table, on a user's hand or another finger, on the user's leg, a couch, a steering wheel, etc.). The different hand gestures disclosed herein can be detected using image data and/or sensor data (e.g., neuromuscular signals sensed by one or more biopotential sensors (e.g., EMG sensors) or other types of data from other sensors, such as proximity sensors, time-of-flight sensors, sensors of an inertial measurement unit, etc.) detected by a wearable device worn by the user and/or other electronic devices in the user's possession (e.g., smartphones, laptops, imaging devices, intermediary devices, and/or other devices described herein).

As will become apparent to a person of skill in this art upon reading this disclosure, the various embodiments provide systems and methods of providing intuitive ways for interacting with a wrist-wearable device while reducing the need for precise touch inputs provided on a display (e.g., a display of the wrist-wearable device). One example method of interacting with a wrist-wearable device occurs while displaying, via the display of a wrist-wearable device that includes a display and one or more sensors for detecting signals associated with performances of in-air hand gestures, a user interface.

Small portable devices, such as wearable devices, need to be convenient to use while also being power-efficient. The following figures and accompanying descriptions provide an explanation of how a wrist-wearable device can be interacted with (e.g., by a wearer) using a combination of hand gestures and determined spatial orientations (e.g., relative to the wearer). By helping to avoid the wasted time and frustrations caused by users (e.g., wearers, and/or other users in proximity to a respective wearer) activating unintended operations due to the imprecision of interacting with a small display using touch inputs, the techniques provided herein encourage/support sustained and uninterrupted user interactions and improved man-machine interfaces.

Further, embodiments of this disclosure can also include and/or be implemented in conjunction with various types or embodiments of artificial-reality systems. Artificial reality, as described herein, is any superimposed functionality and/or sensory-detectable presentation provided by an artificial-reality system within a user's physical surroundings. Such artificial reality can include and/or represent virtual reality (VR), augmented reality, mixed artificial reality (MAR), or some combination and/or variation of one or more of the representations.

In some embodiments of this disclosure, systems and methods are provided for interacting with a user interface displayed at a wrist-wearable device, while a user is also being presented with another user interface at the head-wearable device. In such circumstances, as will be described in detail below, the user can control which context (e.g., user interface, subset of predetermined operations, and the like) respective operations are being performed in based on a spatial orientation of the user's hand in conjunction with the performance of in-air hand gestures (or surface-contact gestures). The performance of such gestures, and the respective context that the respective gestures correspond to (e.g., via a spatial orientation of the user's hand during performance of the respective gestures), can be detected by one or more sensors located at electronic devices in the computing system (e.g., the wrist-wearable device, the head-wearable device, etc.).

As one example, a method described herein can detect a performance of an in-air hand gesture by receiving, via a biometric sensor at the wrist-wearable device, a biometric signal associated with the performance of an in-air hand gesture. As one specific example, an EMG sensor located on an interior surface of the wrist-wearable device can detect muscular movements of a hand of the user (e.g., a pinch gesture, a movement of a thumb of the user along another finger of the user, etc.). During performance of the gesture, a sensor (e.g., an IMU sensor), also located at the wrist-wearable device, can detect a spatial orientation of the user's hand. Based on data from the sensor detecting the performance of the gesture, and the spatial orientation of the user's hand during performance of the gesture, the computing system can determine a context where an operation corresponding to the gesture can be activated. Furthering the specific example, the gesture performed by the user can correspond to navigational operations in both of a user interface displayed at the wrist-wearable device and another user interface presented at a head-wearable device (e.g., AR glasses). The spatial orientation of the user's hand during performance of the gesture, detected based on sensor data (e.g., data from IMU sensors at the wrist-wearable device), causes one of the two user interfaces to actuate the navigational operations.

FIG. 1 illustrates scenarios in which a wrist-wearable device 100 is controlled using in-air hand gestures that are interpreted to cause context-specific or context-agnostic operations, in accordance with some embodiments. FIG. 1 illustrates certain in-air hand gestures that can be assigned to cause performance of respective context-specific operations at the wrist-wearable device 100 (which can include some or all of the components of the wrist-wearable device 1550 in FIGS. 15A-15B). In other words, some in-air hand gestures only cause performance of a particular operation when certain applications or user interfaces (e.g., the device has a particular contextual/operational state when the hand gesture is performed) are displayed. Other gestures, however, can be configured to be context-agnostic, so that a respective gesture of the context-agnostic gestures causes the same operation to be performed irrespective of what is being displayed on the display of the wrist-wearable device 100.

FIG. 1 illustrates three separate rows, each indicating a different user interface and/or a different in-air hand gesture. The first row 102 illustrates a first in-air hand gesture 108 causing performance of a context-specific operation at the wrist-wearable device 100 (in some instances, this can also be referred to as a context-specific outcome for the device). As shown in user interface 104, displayed on a display 105 of a wrist-wearable device 100, a messaging conversation is displayed (e.g., a conversation thread with "Nicole"). While the user interface 104 is displayed, a user 101 wearing the wrist-wearable device 100 performs a first in-air hand gesture 108 (e.g., double tapping the tip of their index finger to the tip of their thumb on the same hand that is wearing the wrist-wearable device 100) which is a context-specific gesture. In other words, the first in-air hand gesture 108 causes performance of the depicted context-specific operation in accordance with (e.g., based on and/or in part on, in response to, etc.) the user interface 104 being displayed.

In response to receiving the first in-air hand gesture 108, the wrist-wearable device 100 displays, via a display, a message-transcription user interface 110 for transcribing a voice-dictated message to send in the messaging conversation shown in user interface 104.

The second row 112 of FIG. 1 illustrates an in-air hand gesture 114 (e.g., double tapping the tip of their ring-finger to the tip of their thumb on the same hand that is wearing the wrist-wearable device 100) that causes performance of a context-agnostic operation. In some embodiments, an operation being context-agnostic can be interpreted to mean that regardless of what is displayed on the display 105, the in-air hand gesture causes performance of the same operation. The second row 112 first shows the user interface 104 being displayed. The next pane of the second row 112 shows that in response to detecting performance of the context-agnostic in-air hand gesture 114 (e.g., which can be referred to as a context-agnostic hand gesture 114), a photo application user interface 115 is shown for sending a photo to a specific contact (e.g., Carlos) despite the messaging conversation being with a different contact (e.g., "Nalini"). The operation that causes display of the photo application user interface 115 can be referred to as a context-agnostic operation since the in-air hand gesture 114, regardless of the context of the wrist-wearable device 100 when that gesture is performed, always results in performance of the context-agnostic operation.

The third row 116 of FIG. 1 illustrates a user interface 118, different from the user interface 104, shown in the first row 102 and the second row 112. The first in-air hand gesture 108 shown in the third row 116 includes the same hand movements as the first in-air hand gesture 108, which causes a context-specific outcome when the user interface 104 is displayed. Since the user interface 104 is not displayed in the third row 116, the first in-air hand gesture 108 that is performed outside of that specific context does not result in the context-specific operation from the first row 102 occurring. This is illustrated by user interface 118 being shown again in the next pane 120 of the third row 116. The pane 120 of the third row 116 illustrates a context-agnostic in-air hand gesture 114 (e.g., double tapping the tip of user's ring-finger to the tip of their thumb on the same hand that is wearing the wrist-wearable device 100) occurring while the user interface 118 is being displayed. The third row 116 then shows that, in response to detecting performance of the context-agnostic hand gesture 114, a photo application user interface 119 is presented, where the photo application user interface 119 includes means for sending a photo to a specific contact (e.g., Carlos) despite a music application being shown in the user interface 118. The means for sending the photo illustrated in this pane of the third row 116 shows a gallery that includes thumbnails of images that a user can select for sending to another user (e.g., Carlos). In other words, users can quickly and easily use the context-agnostic hand gesture 114 to activate the context-agnostic operation, which is also a contact-specific operation in third row 116, thereby allowing them to use a single input to initiate sharing of a photo with a specific contact.

Figure 2:
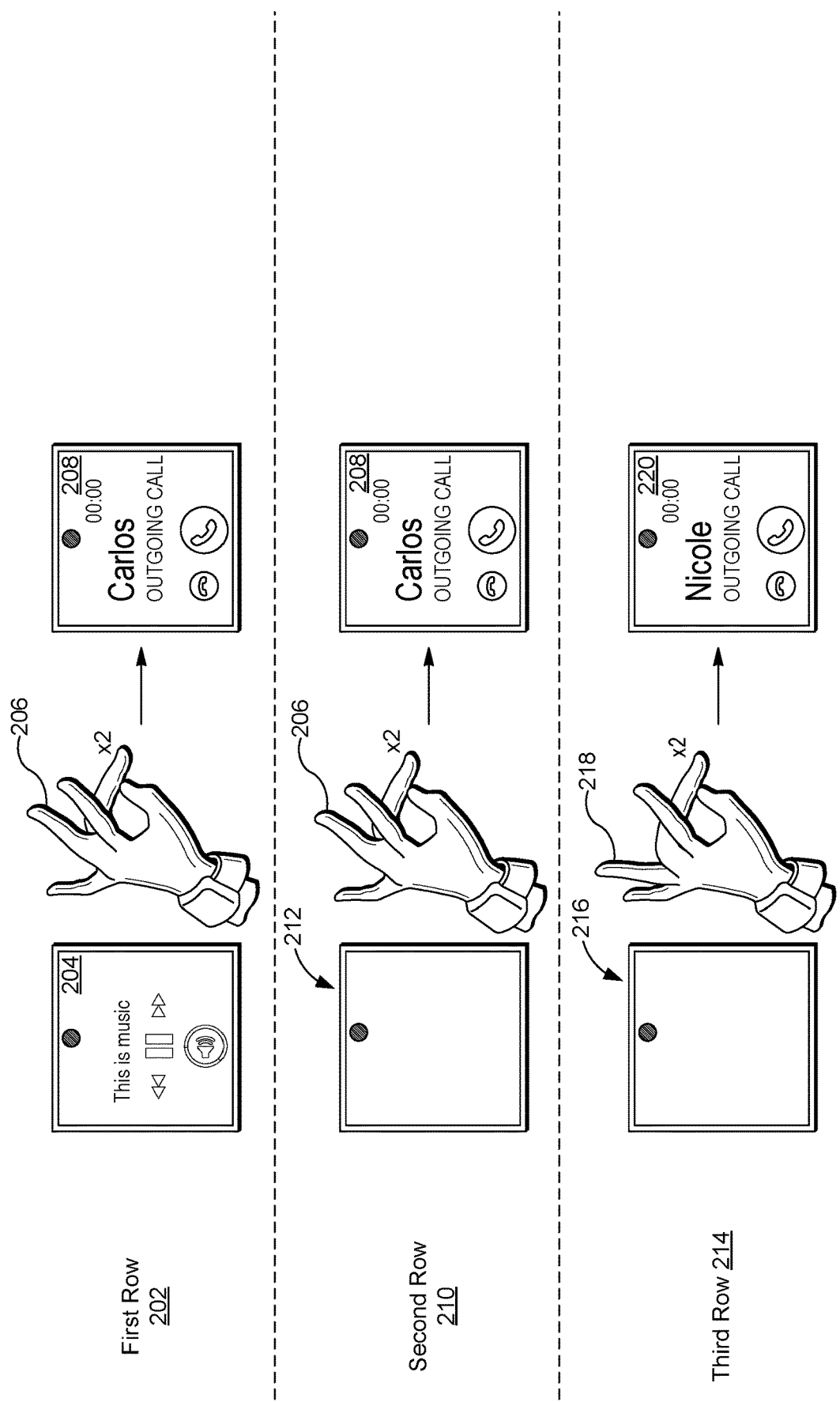
FIG. 2 illustrates in-air hand gestures associated with context-agnostic operations that also correspond to contact-specific operations, in accordance with some embodiments.

FIG. 2 illustrates in-air hand gestures associated with context-agnostic operations that also correspond to contact-specific operations, in accordance with some embodiments. As shown in FIG. 2, a finger can be associated with a specific contact, in accordance with some embodiments. Additionally, a respective touch of a thumb of the user with each phalanx of that specific finger can also be associated with different functions for each contact. For example, a touch with a first phalanx of a finger can initiate a text conversation with a contact. In some embodiments, the middle phalanx of the finger, distinct from the first phalanx, can initiate a phone call with that same contact. These quick and intuitive (e.g., "shortcut") interactions allow users to easily navigate and activate desired operations for desired contacts, thereby providing sustained user interactions that are uninterrupted by unintentional inputs that are common when users must use touch gestures to interact with a small screen. These also open up improved man-machine interfaces by saving numerous inputs that otherwise would need to be provided at a touch-sensitive display or other conventional input device (e.g., navigating away from a user interface, locating a specific contact, finding an operation desired for that contact, etc.; all of that can be replaced with a single intuitive in-air hand gesture).

First row 202 illustrates a user interface 204 being displayed (e.g., a music application user interface). First row 202 also illustrates that while the user interface 204 is being displayed, an in-air hand gesture 206 connecting the user's thumb to the middle portion of their ring finger two times (e.g., tapping the fingers together) is identified by the wrist-wearable device 100. In response to the wrist-wearable device detecting the in-air hand gesture 206, the wrist-wearable device 100 initiates a phone call with a first contact (e.g., as indicated by the wrist-wearable device 100 displaying a phone call user interface 208 with "Carlos" being initiated). This can be understood as a first context-agnostic operation associated with a particular contact, such that the user can always activate the first context-agnostic operation regardless of a current state of the device, while the first context-agnostic operation is available to the user.

Second row 210 illustrates no user interface being displayed at the display of the wrist-wearable device 100 in the first pane 212 (e.g., a display-off state). The second row 210 illustrates the in-air hand gesture 206 being detected (e.g., identified) by the wrist-wearable device 100 while no user interface is being displayed. In response to the wrist-wearable device detecting (e.g., identifying) the in-air hand gesture 206, the wrist-wearable device 100 initiates a phone call with a first contact (e.g., as indicated by the wrist-wearable device 100 displaying a phone call user interface 208 with "Carlos" being initiated). Since the in-air hand gesture 206 is a context-agnostic operation, then it still performs the same operation (e.g., starting a phone call with "Carlos") regardless of whether the screen is in on state or an off state. Providing for context agnostic gestures allows users to interact with device at any time regardless of display state. Allowing such an interaction allows users to not have to wake the device display or navigate to an application before performing the gesture, thereby saving battery life.

Third row 214 illustrates no user interface being displayed in the first pane 216. The third row 214 also illustrates that while no user interface is being displayed, an in-air hand gesture 218 (distinct from in-air hand gesture 206) connecting the user's thumb to the middle portion of their middle finger two times (e.g., tapping the fingers together) is identified by the wrist-wearable device 100. In response to the wrist-wearable device detecting the in-air hand gesture 218, the wrist-wearable device 100 initiates a phone call with a second contact (e.g., as indicated by the wrist-wearable device 100 displaying a phone call user interface 220 with "Nicole" being initiated).

Figure 3:
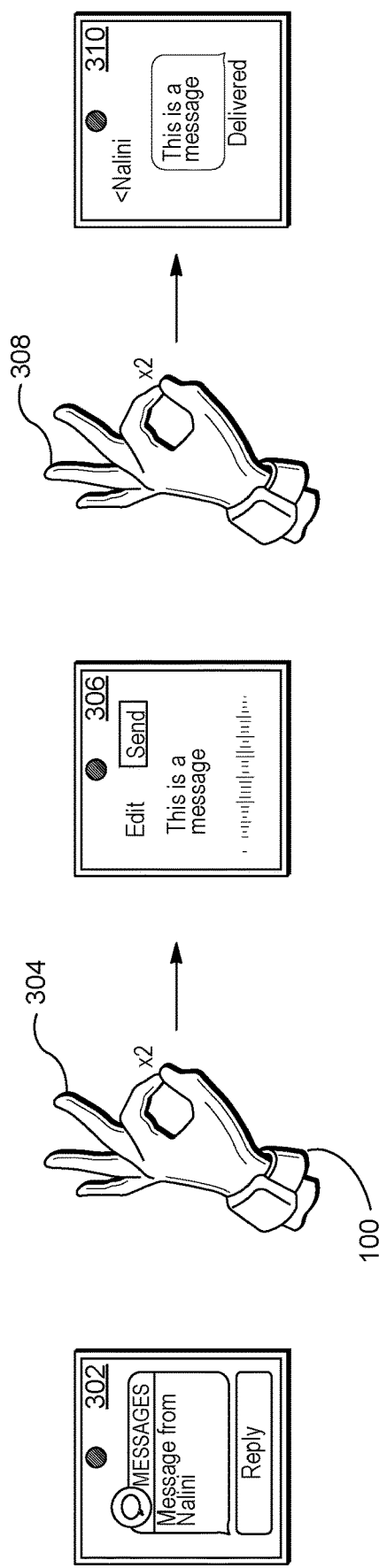
FIG. 3 illustrates a sequence for responding to a text message using operations that are caused to be performed via a combination of in-air hand gestures and voice-dictation-provided inputs, in accordance with some embodiments.

FIG. 3 illustrates a sequence for responding to a text message using operations that are caused to be performed using a combination of in-air hand gestures and voice-dictation-provided inputs, in accordance with some embodiments. FIG. 3 first illustrates a first user interface 302 that shows that a message was received from a contact (e.g., "Nalini"). FIG. 3 then shows (moving from left to right) that a first in-air hand gesture 304 is detected. In response to detecting the in-air hand gesture 304, the wrist-wearable device 100 is configured to detect, via for example, a speaker (e.g., listens for) a spoken message, and transcribes the spoken message to be sent via a text message, as indicated by user interface 306. Another in-air hand gesture 308 (which can be the same as in-air hand gesture 304) is then received to send the text message after the spoken message has been completed. User interface 310, indicates that the message has been sent in response to the wrist-wearable device 100 detecting the other in-air hand gesture 308. FIG. 3 thus depicts that, in some embodiments when the in-air hand gesture 304 and 308 are the same in-air hand gesture, the same in-air hand gesture can cause more than one context-specific operation depending on current device context. Because the first user interface 302 is displayed when the gesture 304 is performed, the voice-dictation interface is then activated (a first context-specific operation), and because the second user interface 306 is performed when the in-air hand gesture 308 is performed (when it is the same as gesture 304), a message is caused to be sent (a second context-specific operation). Thus, one gesture can be associated with more than one context-specific operation. As was depicted in the third row 116 of FIG. 1, the same in-air hand gesture can also cause no operations to occur if its specific associated contexts are not present when the gesture is performed.

Figure 4:
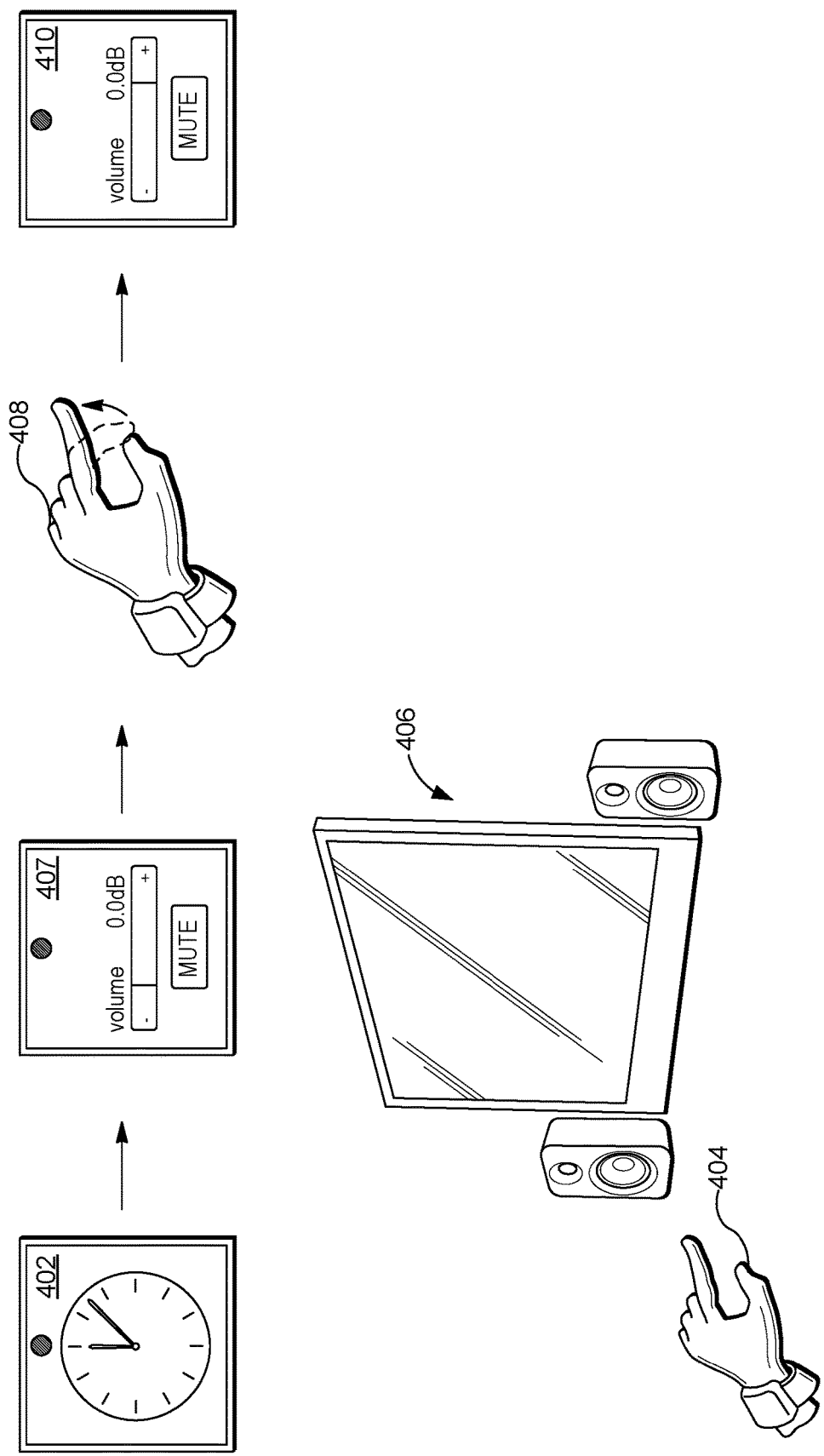
FIG. 4 illustrates a sequence of using hand gestures to control an external device, in accordance with some embodiments.

FIG. 4 illustrates a sequence (moving from left to right) of using hand gestures to control an external device (e.g., a device that can have an active communication channel with the wrist-wearable deice, which channel can be provided by, e.g., an ultra-wideband antenna), in accordance with some embodiments. FIG. 4 illustrates a first part of the sequence in which the wrist-wearable device is displaying a clock user interface 402. FIG. 4 then illustrates a user pointing their finger 404 at a speaker or a television system with attached speakers 406 (as mentioned above, the wrist-wearable device can already have the active communication channel with the speakers 406). In response to the wrist-wearable device 100 detecting that the user is pointing at a speaker or television, the wrist-wearable device 100 displays a user interface 407 for controlling volume of the speaker or the television system with attached speakers 406. The wrist-wearable device 100 then detects the user providing another in-air hand gesture 408 (e.g., a flicking-up gesture or a flicking-down gesture to turn up the volume or decrease the volume, respectively). In response to the wrist-wearable device detecting the other in-air hand gesture 408, the wrist-wearable device transmits a command to the speaker or the television system with attached speakers 406 to increase the volume. In some embodiments, the user interface updates (e.g., user interface 410) to indicate that the volume has increased. In some embodiments, hand gestures can be used to control other smart home devices (e.g., turning on or off smart lights).

Figure 5:
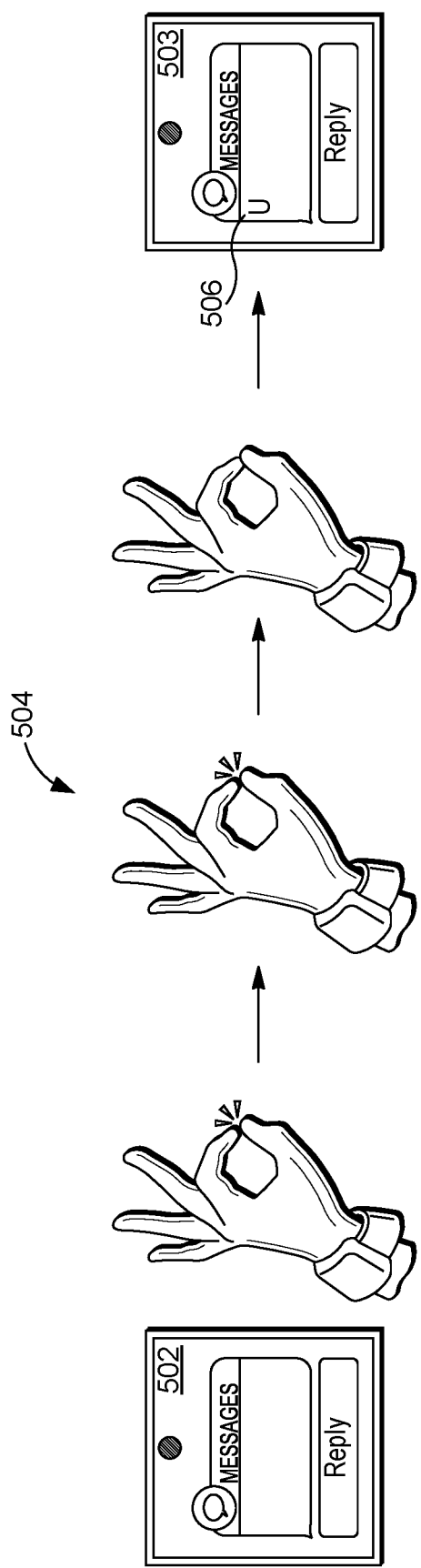
FIG. 5 illustrates a sequence for using hand gestures to compose a text message, in accordance with some embodiments.

FIG. 5 illustrates a sequence (moving from left to right) for using hand gestures to compose a text message, in accordance with some embodiments. FIG. 5 first illustrates a user interface 502 that shows that a message was received from a contact. FIG. 5 illustrates a sequence of hand gestures 504 that emulate morse code for creating a message response. FIG. 5 shows the user tapping their index finger to their thumb two times, and then tapping and holding their index finger to their thumb ("- - ---" or "\*\*-") to produce the letter "U." In response to the electronic device detecting the morse-code hand gesture, the electronic device updates the message response user interface 503 with the detected morse code letter 506.

FIG. 6 illustrates that a user's fingers can be associated with a specific contact, and each phalanx on the finger can be associated with a different operation, in accordance with some embodiments. In other words, tapping different phalanges of a first finger can result in the same contact being called, texted, or sent a photograph, in accordance with some embodiments.

FIG. 6 shows three separate rows of sequences for initiating different operations with a contact associated with a single finger (e.g., the ring finger being associated with contact "Carlos"). First row 602 illustrates a user interface 604 being displayed (e.g., a music application user interface). First row 602 also illustrates that while the user interface 604 is being displayed, an in-air hand gesture 606 connecting the user's thumb to the distal phalanx of their ring finger (e.g., tapping the fingers together) is identified by the wrist-wearable device 100. In response to the wrist-wearable device detecting the in-air hand gesture 606, the wrist-wearable device 100 initiates a phone call with a first contact (e.g., as indicated by the wrist-wearable device 100 displaying a phone call user interface 608 with "Carlos").

Second row 610 illustrates wrist-wearable device 100 not displaying a user interface. Second row 610 also illustrates that while no user interface is being displayed, an in-air hand gesture 612 connecting the user's thumb to the middle phalanx of their ring finger (e.g., tapping the fingers together) is identified by the wrist-wearable device 100. In response to the wrist-wearable device detecting the in-air hand gesture 612, the wrist-wearable device 100 initiates a messaging conversation with the first contact (e.g., as indicated by the wrist-wearable device 100 displaying a messaging conversation user interface 613 with "Carlos").

Third row 614 also illustrates wrist-wearable device 100 not displaying a user interface. Third row 614 also illustrates that while no user interface is being displayed, an in-air hand gesture 616 connecting the user's thumb to the proximal phalanx of their ring finger (e.g., tapping the fingers together) is identified by the wrist-wearable device 100. In response to the wrist-wearable device detecting the in-air hand gesture 616, the wrist-wearable device 100 initiates a photo sending application with the first contact (e.g., as indicated by the wrist-wearable device 100 displaying a photo sending user interface 617 call with "Carlos").

FIG. 7 illustrates that a single finger can be associated with a certain operation (e.g., making a phone call), and each phalanx of that finger can be associated with a different contact (e.g., akin to having your favorited contacts easily accessible), in accordance with some embodiments. FIG. 7 illustrates three rows of gestures causing different operations. The first row 700 shows the wrist-wearable device 100 displaying user interface 702 (e.g., a gaming application). While the user interface 702 is displayed, an in-air hand gesture 704 is detected by the wrist-wearable device 100 connecting the user's thumb to the tip portion of their ring finger (e.g., tapping the fingers together) is identified by the wrist-wearable device 100. In response to the in-air hand gesture 704, a user interface 705 is displayed on wrist-wearable device indicating a call is being made to a first contact (e.g., Carlos).

The second row 706 shown in the second row shows the wrist-wearable device 100 is not displaying a user interface. While no user interface is being displayed, an in-air hand gesture 708 is detected by the wrist-wearable device 100 connecting the user's thumb to the middle portion of their ring finger (e.g., tapping the fingers together) is identified by the wrist-wearable device 100. In response to the in-air hand gesture 708, a user interface 709 is displayed on wrist-wearable device indicating a call is being made to a second contact (e.g., Kaylee).

The third row 710 shows the wrist-wearable device 100 is not displaying a user interface. While no user interface is being displayed, an in-air hand gesture 712 is detected by the wrist-wearable device 100 connecting the user's thumb to the inner phalanx portion of their ring finger (e.g., tapping the fingers together) is identified by the wrist-wearable device 100. In response to the in-air hand gesture 712, a user interface 713 is displayed on wrist-wearable device (e.g., at touchscreen display 1513) indicating a call is being made to a third contact (e.g., Nicole).

Aspects depicted in FIGS. 6 and 7 can also be combined such that a user can configure their device such that one finger can be associated with operations for a specific contact, while a different finger can be associated with a same operation for multiple different contacts. A configuration user interface available on the wrist-wearable device (or a companion device such as smartphone or tablet) can allow the user to configure such settings.

Figure 8A:
FIG. 8A-8C illustrate performing a first in-air hand gesture while the wrist-wearable device has different orientations, in accordance with some embodiments.
Figure 8B:
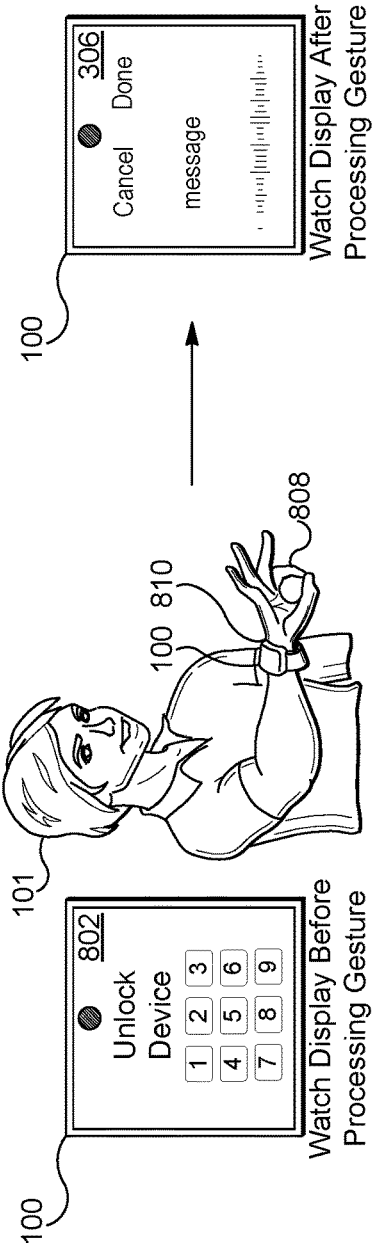
Figure 8C:
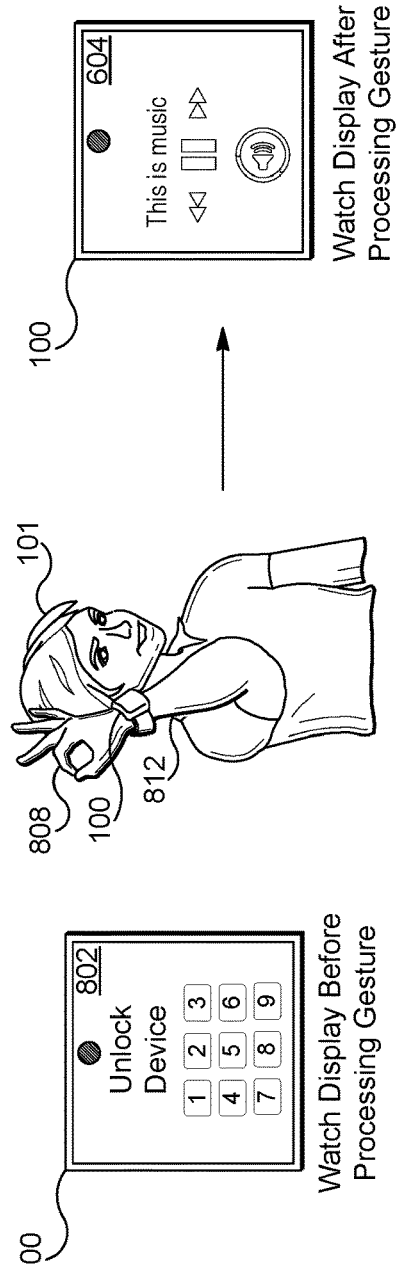

FIG. 8A-8C illustrate performing a first in-air hand gestures (e.g., connecting fingers of the same hand) while the wrist-wearable device has different orientations (e.g., where the orientations are determined by arm orientations, and placements of the wrist wearable device relative other parts of the user (e.g., next to an ear, in front of the face, below the waist of the user, etc. . . . )), in accordance with some embodiments.

FIG. 8A illustrates the wrist-wearable device 100 displaying an unlock user interface 802. While unlock user interface 802 is displayed, the wrist-wearable device determines, using included sensors (such as those of an inertial measurement unit and/or neuromuscular-signal sensors that allow the device to determine the user's current hand pose), that the wrist-wearable device has a first spatial orientation 804 (e.g., the wrist-wearable device's display is turned such that it is facing a face of the user 101) and a first in-air hand gesture 808 (e.g., connecting a distal end of the index finger to the distal end of a thumb on the same hand). FIG. 8A illustrates that in response to the wrist-wearable device (and or other devices) processing the first spatial orientation 804 combined with the first in-air hand gesture 808, the wrist-wearable device initiates a front facing camera for taking a "selfie" photograph (e.g., the watch user interface 809 shows a viewfinder of the front facing camera). In some embodiments, repeating the first in-air hand gesture in the same orientation, takes a photograph or an additional photograph.

FIG. 8B illustrates the wrist-wearable device 100 displaying an unlock user interface 802. While the unlock user interface 802 is displayed, the wrist-wearable device determines, using included sensors, that the wrist-wearable device has a second spatial orientation 810 (e.g., the wrist-wearable device is at a normal watch viewing location (e.g., near a chest of a user 101)) and the first in-air hand gesture 808 (e.g., connecting a distal end of the index finger to the distal end of a thumb on the same hand). FIG. 8B illustrates that in response to the wrist-wearable device (and or other devices) processing the second spatial orientation 810 combined with the first in-air hand gesture 808, the wrist-wearable device initiates a voice dictation user interface 306 for sending a text message to a contact.

FIG. 8C illustrates the wrist-wearable device 100 displaying an unlock user interface 802. While the unlock user interface 802 is displayed, the wrist-wearable device determines, using included sensors, that the wrist-wearable device has a third spatial orientation 812 (e.g., the wrist-wearable device is placed next to an ear of a user 101) and the first in-air hand gesture 808 (e.g., connecting a distal end of the index finger to the distal end of a thumb on the same hand). FIG. 8C illustrates that in response to the wrist-wearable device (and or other devices) processing the third spatial orientation 812 combined with the first in-air hand gesture 808, the wrist-wearable device begins initiating media playback (e.g., playing a song, a podcast, etc.,) as indicated by user interface 604.

FIG. 9A-9C illustrate performing a second in-air hand gestures (e.g., connecting fingers of the same hand) while the wrist-wearable device has different orientations (e.g., where the orientations are determined by arm orientations, and placements of the wrist wearable device relative other parts of the user (e.g., next to an ear, in front of the face, below the waist of the user, etc.,)) in accordance with some embodiments.

FIG. 9A illustrates the wrist-wearable device 100 displaying an unlock user interface 902. While unlock user interface 902 is displayed, the wrist-wearable device 100 determines, using included sensors, that the wrist-wearable device has a first spatial orientation 904 (e.g., the wrist-wearable device is facing a face of the user 101) and a second in-air hand gesture 908 (e.g., connecting a distal end of the middle finger to the distal end of a thumb on the same hand). FIG. 9A illustrates that in response to the wrist-wearable device 100 (and/or other devices) processing the first spatial orientation 904 combined with the second in-air hand gesture 908, the wrist-wearable device 100 initiates a weather application for viewing the nearby weather, as indicated by user interface 909.

FIG. 9B illustrates the wrist-wearable device 100, while the display of the wrist-wearable device is in an off state 910. While the display is in an off state 910, the wrist-wearable device 100 determines (e.g., based on detecting), using included sensors (e.g., IMU sensors), that the wrist-wearable device 100 has a second spatial orientation 911 (e.g., the wrist-wearable device is at a normal watch viewing location (e.g., near a chest of a user 101)) and the second in-air hand gesture 908 (e.g., connecting a distal end of the middle finger to the distal end of a thumb on the same hand). FIG. 9B illustrates that in response to the wrist-wearable device (and or other devices) processing the second spatial orientation 911 combined with the second in-air hand gesture 908, the wrist-wearable device displays a clock user interface 912 for presenting a current time to the user 101.

FIG. 9C illustrates the wrist-wearable device 100 displaying a clock user interface 913. While a clock user interface 913 is displayed, the wrist-wearable device determines, using included sensors, that the wrist-wearable device has a third spatial orientation 914 (e.g., the wrist-wearable device is placed next to an ear of a user 101) and the second in-air hand gesture 908 (e.g., connecting a distal end of the middle finger to the distal end of a thumb on the same hand). FIG. 9C illustrates that in response to the wrist-wearable device (and or other devices) processing the third spatial orientation 914 combined with the second in-air hand gesture 908, the wrist-wearable device begins initiating a phone call with a contact as indicated by user interface 916.

Figure 10A:
FIG. 10A-10C illustrate performing in-air hand gestures while the wrist-wearable device has different orientations and a specific application is active and in focus on the display of the wrist-wearable device, in accordance with some embodiments.
Figure 10B:
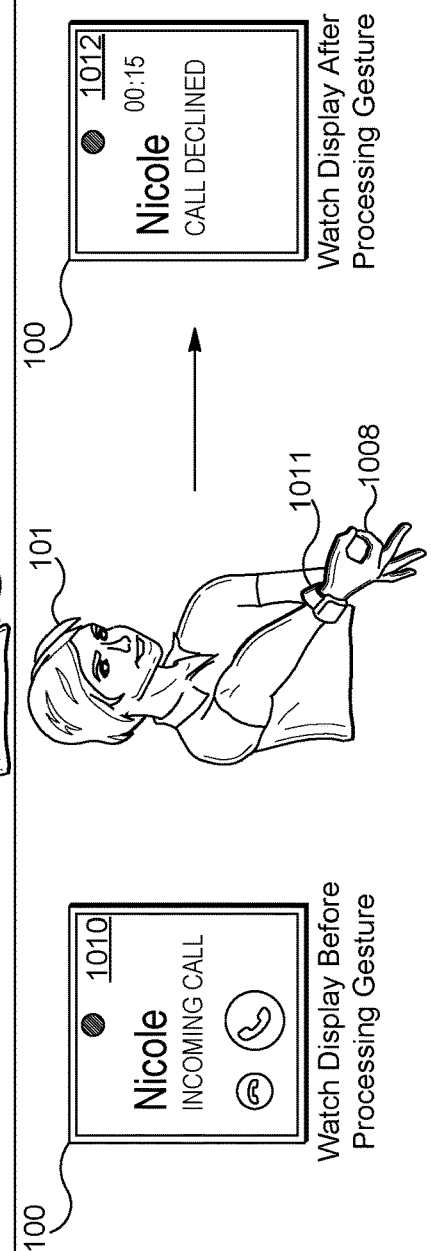
Figure 10C:

FIG. 10A-10C illustrate performing an in-air hand gestures (e.g., connecting fingers of the same hand) while the wrist-wearable device has different orientations (e.g., where the orientations are determined by arm orientations, and placements of the wrist wearable device relative other parts of the user (e.g., next to an ear, in front of the face, below the waist of the user, etc.,)) while a specific application is in focus or otherwise displayed on the display of the wrist-wearable device, in accordance with some embodiments.

FIG. 10A illustrates the wrist-wearable device 100 displaying an ongoing phone call user interface 1002. While an ongoing phone call user interface 1002 is displayed, the wrist-wearable device determines, using included sensors, that the wrist-wearable device has a first spatial orientation 1004 (e.g., the wrist-wearable device is facing a face of the user 101) and a first in-air hand gesture 1008 (e.g., connecting a distal end of the index finger to the distal end of a thumb on the same hand). FIG. 10A illustrates that in response to the wrist-wearable device (and or other devices) processing the first spatial orientation 1004 combined with the first in-air hand gesture 1008, the wrist-wearable device initiates a video call with the contact the ongoing call is occurring with, as indicated by user interface 1009.

FIG. 10B illustrates the wrist-wearable device 100 displaying an incoming phone call user interface 1010. While an ongoing phone call user interface 1010 is displayed, the wrist-wearable device determines, using included sensors, that the wrist-wearable device has a second spatial orientation 1011 (e.g., the wrist-wearable device is moved away from the user) and the first in-air hand gesture 1008 (e.g., connecting a distal end of the index finger to the distal end of a thumb on the same hand). FIG. 10B illustrates that in response to the wrist-wearable device (and or other devices) processing the second spatial orientation 1011 combined with the first in-air hand gesture 1008, the wrist-wearable device declines the incoming call, as indicated by user interface 1012.

FIG. 10C illustrates the wrist-wearable device 100 displaying an incoming phone call user interface 1010. While an ongoing phone call user interface 1010 is displayed, the wrist-wearable device determines, using included sensors, that the wrist-wearable device has a third spatial orientation 1014 (e.g., the wrist-wearable device is placed next to an ear of a user 101) and the first in-air hand gesture 1008 (e.g., connecting a distal end of the middle finger to the distal end of a thumb on the same hand). FIG. 10C illustrates that in response to the wrist-wearable device (and or other devices) processing the third spatial orientation 1014 combined with the first in-air hand gesture 1008, the wrist-wearable device begins initiating a phone call with a contact as indicated by user interface 1016.

Figure 11:
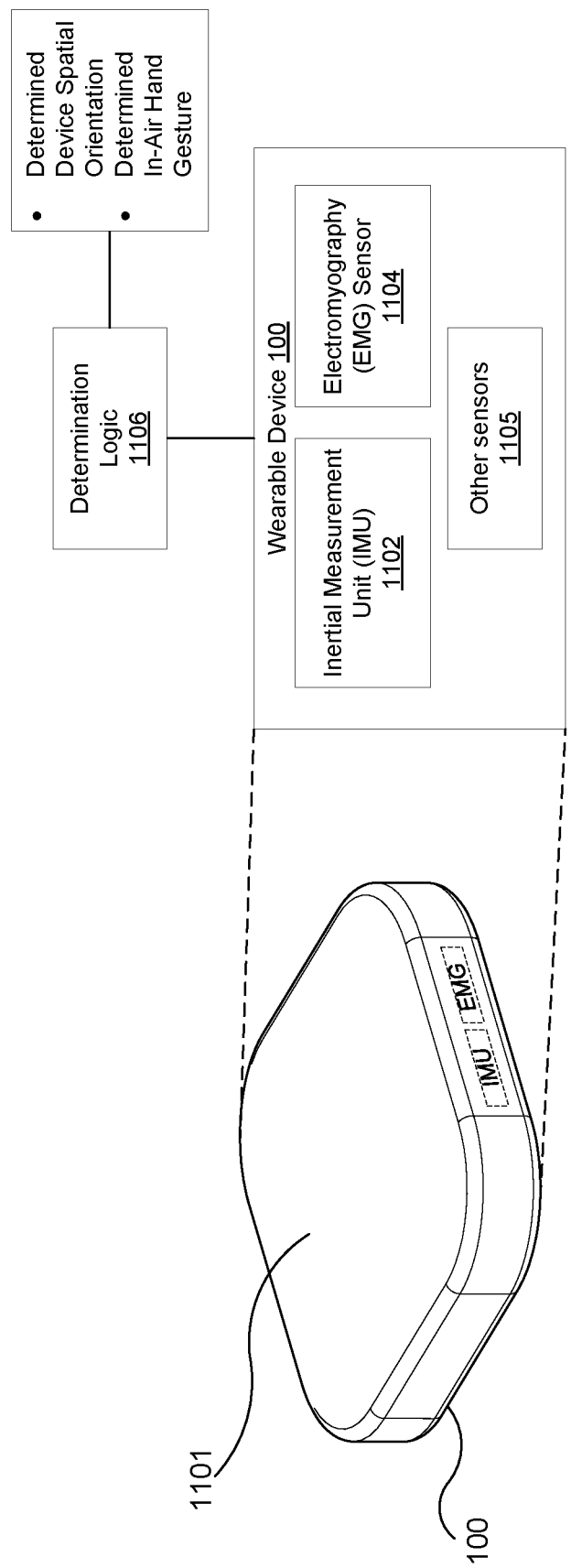
FIG. 11 illustrates a component of an example wrist-wearable device that includes one or more sensors for determining spatial orientation of the wrist-wearable device, in accordance with some embodiments.

FIG. 11 illustrates a component of an example of a wrist-wearable device 100 that includes one or more sensors for determining spatial orientation of the wrist-wearable device, in accordance with some embodiments. The wrist-wearable device 100 also includes a display 1101 (optionally a touch-sensitive display) for receiving additional inputs. FIG. 11 also shows a wrist-wearable device 100 with an example suite of sensors (e.g., an inertial measurement unit (IMU) 1102 and an electromyography (EMG) sensor 1104) for detecting both orientation of the wrist-wearable device while it is being worn by the user and the in-air hand gestures being performed by the user. While two example sensors are shown, any number of sensors may be used instead, for example a camera, an ambient light sensor, proximity sensor, a photoplethysmography (PPG) sensor, and other EXG sensors (ECG, EMG, etc.), which is indicated by box 1105 labeled "other sensors." These other sensors can be used in addition to the EMG and IMU sensors to further help with gesture determinations. Using information from the sensors shown in FIG. 11, the determination logic 1106 determines (locally and/or remotely) the spatial orientation of the wrist-wearable device and the in-air hand gesture being performed by the user.

While the primary example herein is an in-air gesture, the disclosure is not limited to those in-air gestures, as other gestures that do not contact a wrist-wearable device 100 are also contemplated, including the surface-contact gestures just described. Further, hand gestures can be associated with one or more commands other than a camera-control gesture. The hand gestures, when detected and determined as a respective command by one or more processors (e.g., FIG. 15C), are configured to cause an action to be performed at a computing device, such as the wrist-wearable device 100, head-worn wearable device, or other device described below in reference to FIG. 15C. In other words, although FIG. 1 illustrate the wrist-wearable device 100 using detected gestures to perform operations, gestures detected by the wrist-wearable device 100 can cause other devices (e.g., head-worn wearable device, smartphones, tablets, security cameras, etc.) to capture, provide, and/or present camera data.

In some embodiments, "in-air" means, in some embodiments, that the user's hand does not contact a portion of the device. In other words the gesture is performed in open air in 3D space and without contacting the wrist-wearable device 100. The in-air gestures are performed without a glove, without contacting a glove surface, or without the wrist-wearable device 100 being coupled to a glove. In some embodiments, the in-air hand gesture can include a single contact between a distal phalange (distal, proximal, middle) phalange portion of the user's thumb and a distal phalange portion of the user's index finger, which causes selection of a first camera (e.g., a camera of the head-worn device), or the in-air hand gesture includes two or more contacts between a distal phalange portion of the user's thumb and a distal phalange portion of the user's index finger, which can cause selection of a second camera distinct from the first camera (e.g., a security camera located near (e.g., within a distance that allows for short-range communication) the wrist-wearable device 100). Such in-air finger-contact gestures are non-limiting examples of the in-air gestures contemplated herein, other examples include gestures in which two fingers (and phalange portions thereof) are moved to make contact with a thumb (and a phalange portion thereof), multi-step gestures in which a first digit can make contact with a thumb and remain in contact and then another digit can make contact with the first digit while the first digit remains in contact with the thumb. Rotational in-air hand gestures are also contemplated, in which a user can rotate their wrist in various directions.

Surface-contact gestures (contacts at surfaces other than the wrist-wearable device 100) more generally are also contemplated in which neuromuscular signals (or other types of data from other sensors, such as proximity sensors, time-of-flight sensors, sensors of an IMU, etc.) can be used to detect a contact (or an intention to contact) a surface (e.g., a single or double finger tap on a table, on a user's leg, a couch, etc.). Thus, while the primary example herein is an in-air gesture, the disclosure is not limited to those in-air gestures, as other gestures that do not contact a wrist-wearable device 100 are also contemplated, including the surface-contact gestures just described. In some embodiments, the one or more sensors of the wrist-wearable device 100 detect data generated by one handed gestures performed by the user (e.g., detected from the hand wearing the wrist-wearable device 100). Examples of the different gestures are described above in reference to FIGS. 1-10C.

Figure 12A:
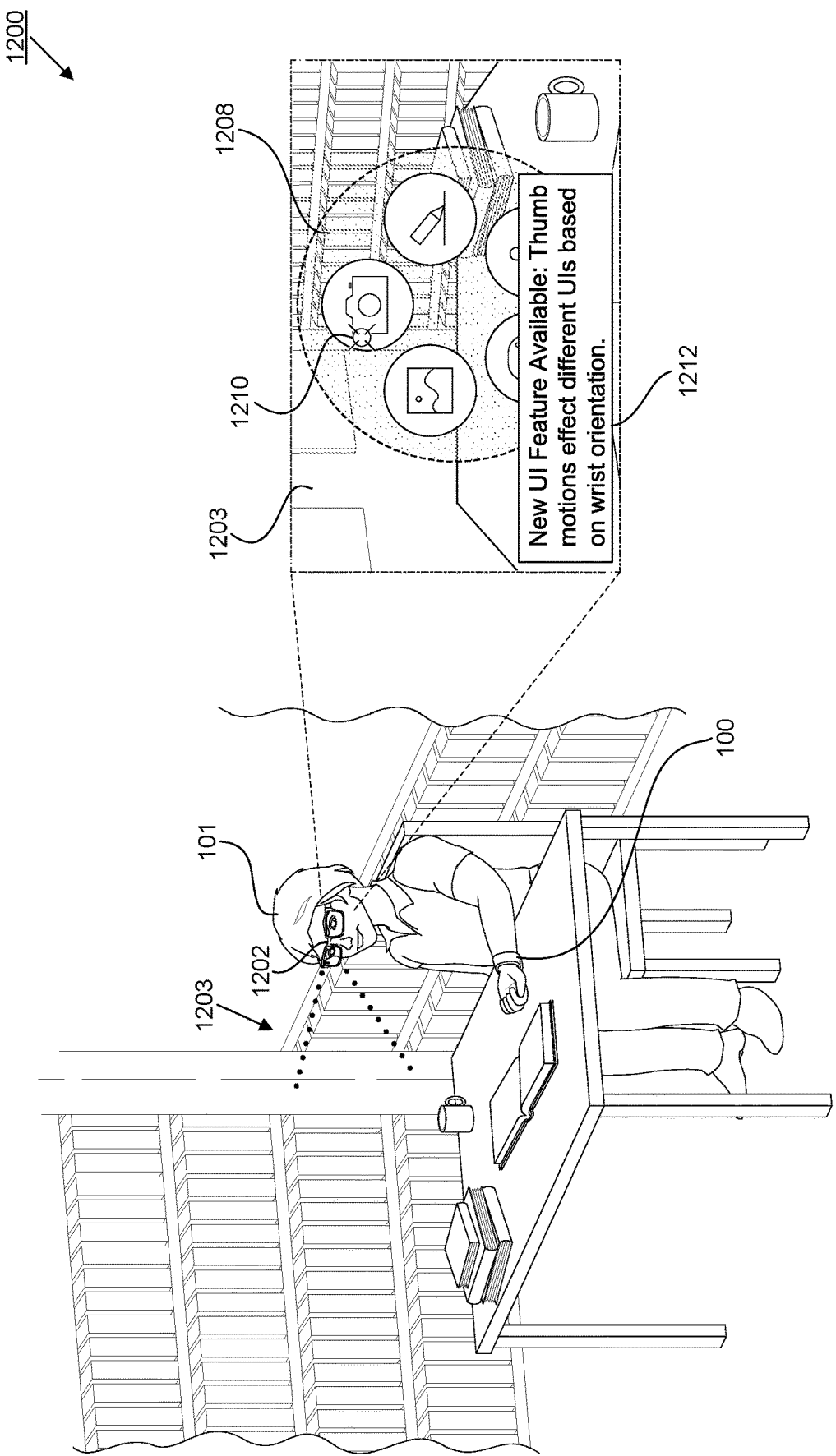
FIGS. 12A-12F illustrate an example user scenario with an example computing system (e.g., including at least a head-wearable device and a wrist-wearable device), in accordance with some embodiments.

FIGS. 12A-12F illustrate an example user scenario with an example computing system (e.g., including at least a head-wearable device and a wrist-wearable device), in accordance with some embodiments. FIG. 12A shows a user 101 and a computing system 1200 that includes a head-wearable device 1202 (e.g., AR glasses) and the wrist-wearable device 100. The wrist-wearable device 100 and/or the head-wearable device 1202 can include sensors that can detect aspects of gestures performed by the user and/or the orientation of a hand of the user 101 (and specifically, the hand that is wearing the wrist-wearable device 100, in accordance with some embodiments). In some embodiments, the wrist-wearable device 100 includes at least one IMU sensor and at least one EMG sensor.

The user 101 in FIGS. 12A-12F is performing gestures that correspond to operations to be performed by the computing system 1200. In the specific example illustrated by FIGS. 12A-12F, the user 101 is performing gestures that correspond to navigational operations at either a user interface of the head-wearable device 1202 or a user interface 1218 displayed at a display of the wrist-wearable device 100. In some embodiments, the wrist-wearable device 100 is a virtual object displayed by the head-wearable device 1202. In FIGS. 12A-12F, the navigational operations at the respective user interfaces of the respective wearable devices are illustrated as being actuated by focus selectors (e.g., a focus selector 1210 presented at the user interface of the head-wearable device 1202, or a focus selector 1222 displayed at the display of the wrist-wearable device 100). But in some embodiments, the navigational operations are actuated in a variety of different ways. For example, the navigational operations can simply change which of several user interface elements are selected (e.g., are in focus) within a respective user interface (e.g., which can be indicated by a border element surrounding the selected user interface element). The selected user interface elements can be identified by a different color, brightness, or other ornamentation (e.g., selected user interface elements can grow or shrink in size as compared to their non-selected representations), in accordance with some embodiments.

Turning now to FIG. 12A, the user 101 is sitting at a desk within a library, while a user interface is presented to the user 101 by the head-wearable device 1202. A palm of the user 101 is facing upwards, which can be considered a second spatial orientation according to some embodiments. A person of ordinary skill in the art will appreciate that the terms "first spatial orientation" and "second spatial orientation" have no specific significance and can be used interchangeably, aside from the specific meanings ascribed to them in the context of their usage (e.g., once a particular orientation is described as a first orientation in one embodiment, then that orientation should be understood to be the first orientation for that one embodiment, unless otherwise stated). It should be noted that the display of the wrist-wearable device 100 is facing downward, in this orientation, and therefore is not within a viewing range 1203 of the user 101. In some embodiments, the respective spatial orientation of the hand of the user 101 is based on whether the display of the wrist-wearable device 100 is in the viewing range 1203 of the user 101. In some embodiments, a respective viewing range of the user 101 does not correspond to the actual viewing range 1203 of the user 101 at any given moment but is instead simulated based on a likely viewing range of the user based on the arrangement of the electronic device in the computing system 1200.

The viewing range 1203 of the head-wearable device 1202 illustrated in FIG. 12A shows the head-wearable device 1202 presenting a circular menu user interface element 1208 that includes a circular menu of selectable options. The head-wearable device 1202 is also presenting a focus selector 1210 within the user interface, indicating which of the selectable options are currently selected. The head-wearable device 1202 is also presenting a notification user interface element 1212, instructing the user that "Thumb motions effect different UIs based on wrist orientation." In some embodiments, a notification user interface element (e.g., the notification user interface element 1212) can additionally display selectable options for allowing the user to manually initiate the functionality described.

Figure 12B:
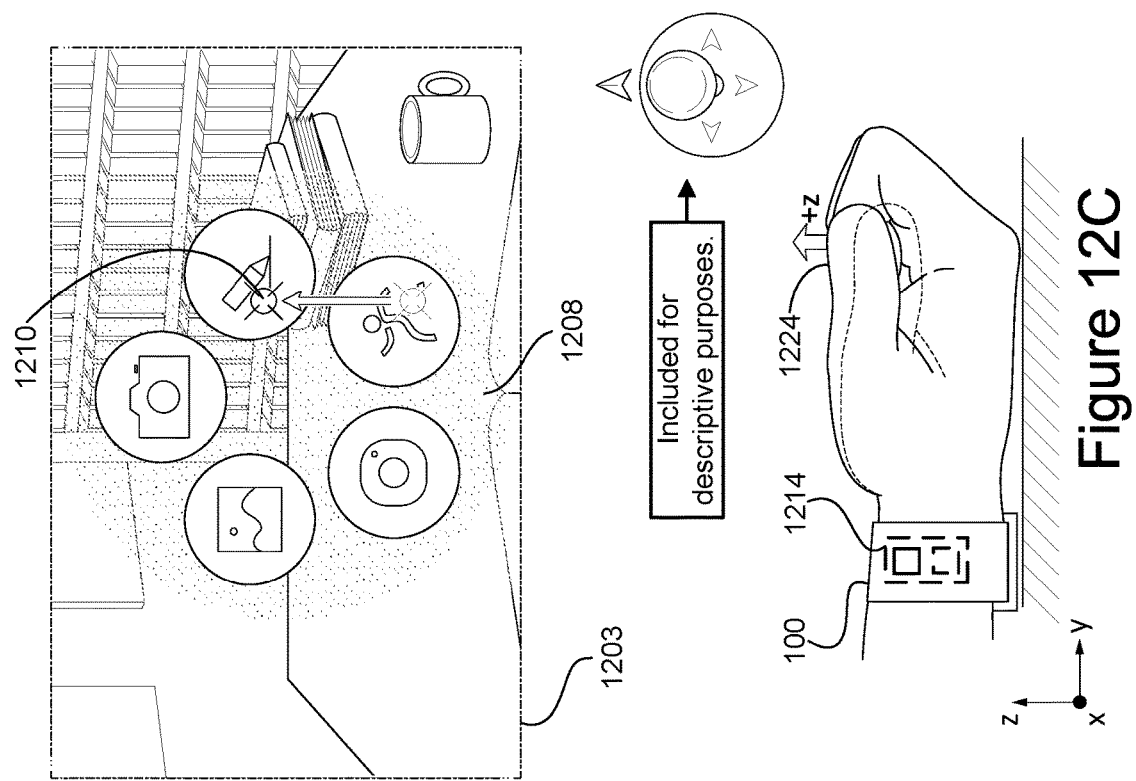

Turning now to FIG. 12B, the user 101 is performing a gesture that includes a thumb movement 1216 toward the back of the hand of the user 101. Since the hand of the user 101 is in the second spatial orientation (e.g., the palm of the user 101 is facing upwards), the thumb movement 1216 is in a downward direction (e.g., a negative "z" direction in a Cartesian coordinate plane) with respect to the reference frame of the user 101. In some embodiments, the thumb movement 1216 of the gesture performed in FIG. 12B is detected by one or more sensors 1214, shown in a symbolic block view (specific aspects of which are described in more detail below with respect to FIGS. 15A-15C and 17A-17B). Based on the thumb movement 1216 performed as part of the user gesture shown in FIG. 12B, the focus selector 1210 shown in the viewing range 1203 moves in a downward direction within the user interface displayed by the head-wearable device 1202. As a result, the focus selector 1210 is selecting a different selectable option within the circular menu user interface element 1208 than before the performance of the user gesture. It should be noted that the "D-Pad" control stick shown in FIG. 12B, and subsequent figures of the specification is included for descriptive purposes only and is not meant to imply the existence of any control hardware involved in the gestures described herein. But in some embodiments, any of the operations described herein, alone or in combination, can be performed in conjunction with a controller device.

Figure 12C:
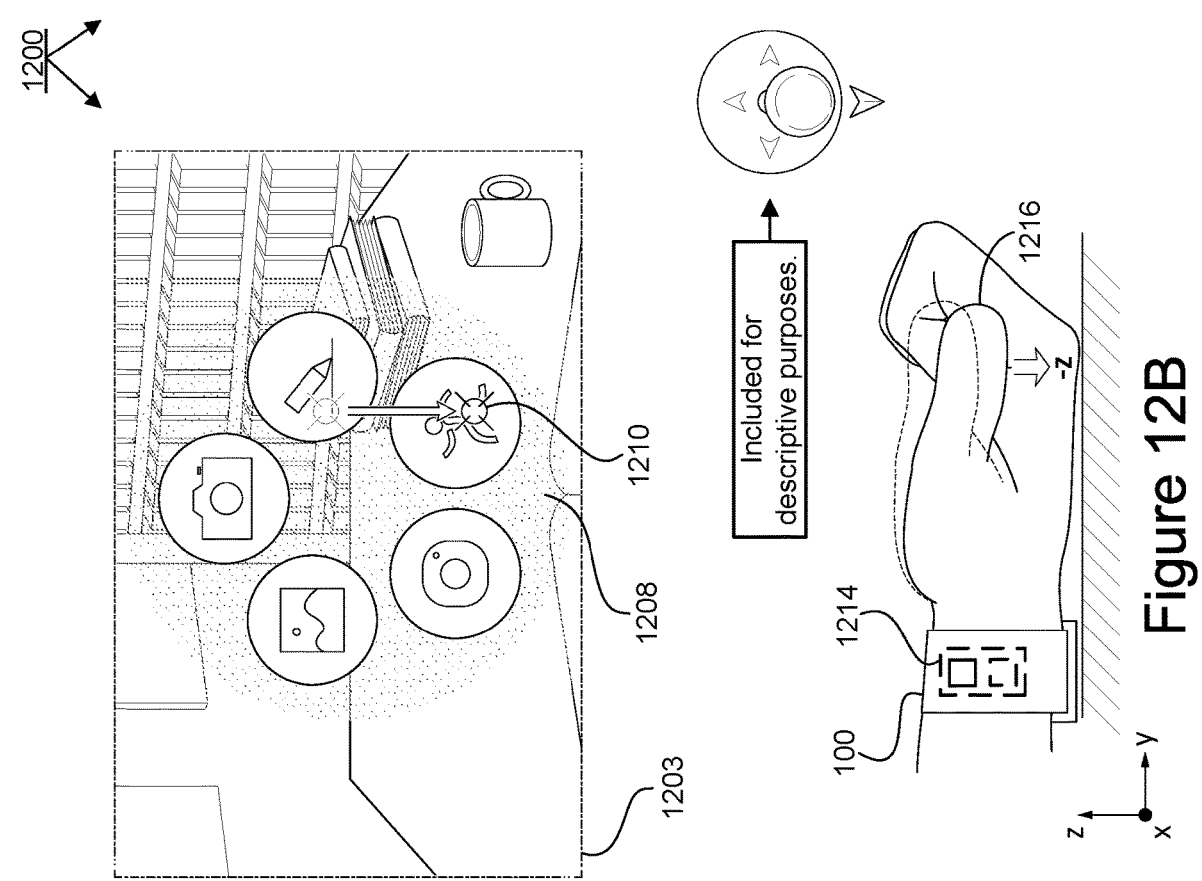

Turning now to FIG. 12C, the user 101 is performing another gesture that includes a thumb movement 1224 away from the palm of the hand of the user 101. Since the hand of the user 101 is in the second spatial orientation (e.g., the palm of the user 101 is facing upward), the thumb movement 1224 is in an upward direction (e.g., a positive "z" direction in a cartesian coordinate plane) with respect to the reference frame of the user 101. As discussed above, the thumb movement 1224 of the gesture performed in FIG. 12C is detected by one or more sensors 1214, shown in the symbolic block view. As discussed previously, the one or more sensors 1214 can include IMU sensors and/or EMG sensors, as well as other sensors that are described in more detail with respect to FIGS. 15A-15B below. Based on the thumb movement 1224 performed as part of the user gesture shown in FIG. 12C, the focus selector 1210 shown in the viewing range 1203 moves in an upward direction within the user interface presented by the head-wearable device 1202. As a result, the focus selector 1210 is selecting a different selectable option within the circular menu user interface element 1208 than before the performance of the user gesture.

Figure 12D:
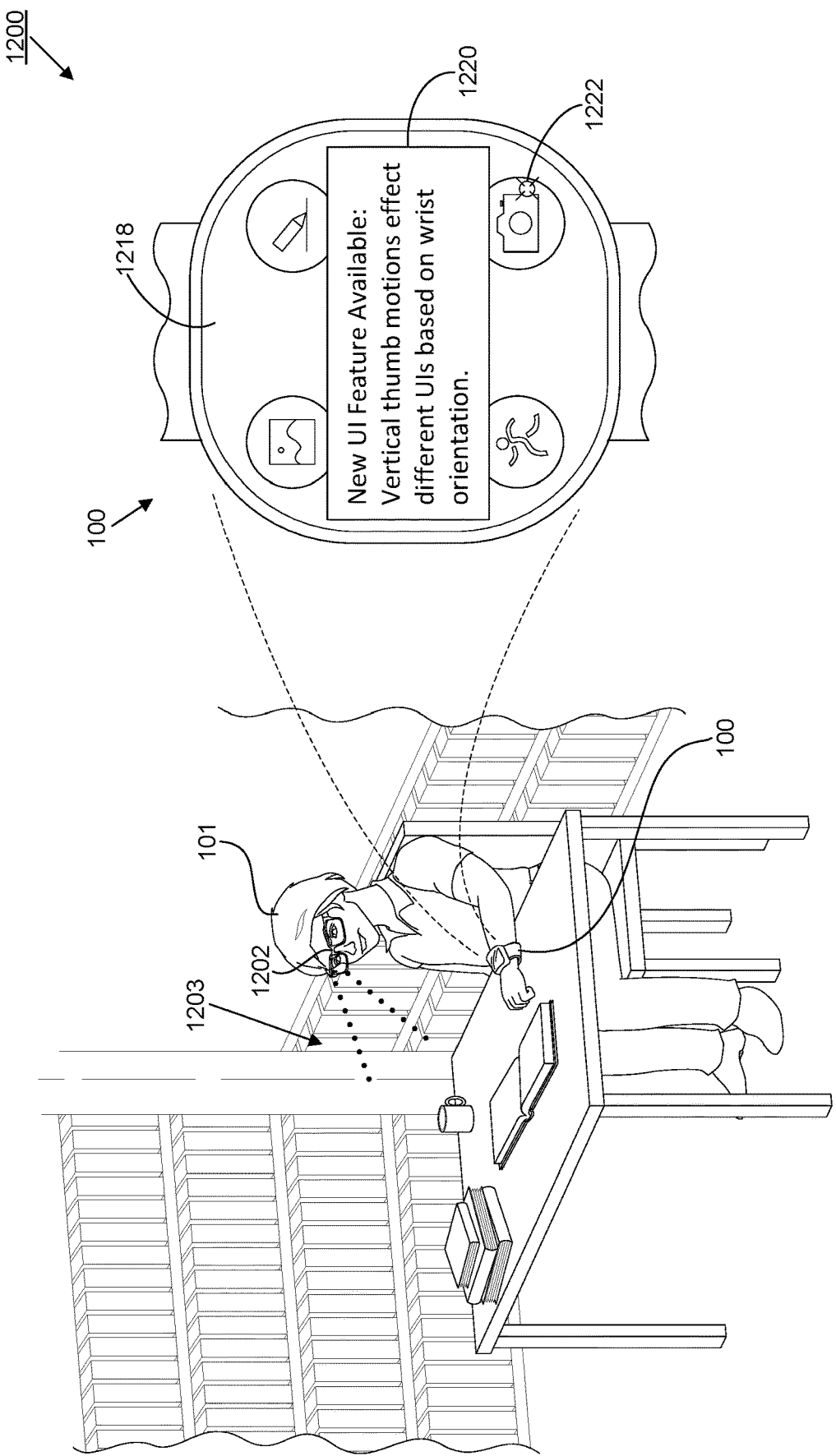

Turning now to FIG. 12D, the user 101 is sitting at the same desk as in FIG. 12A, while viewing a display of the wrist-wearable device 100. A palm of the user 101 is facing downward, which can be considered a first spatial orientation. The display of the wrist-wearable device 100 is therefore facing upward toward the viewing range 1203 of the user.

The user interface 1218 of the wrist-wearable device 100 illustrated in FIG. 12D is presenting a notification user interface element 1220 and selectable options. The user interface 1218 is also displaying a focus selector 1222 indicating which of the selectable options are currently selected.

Figure 12F:
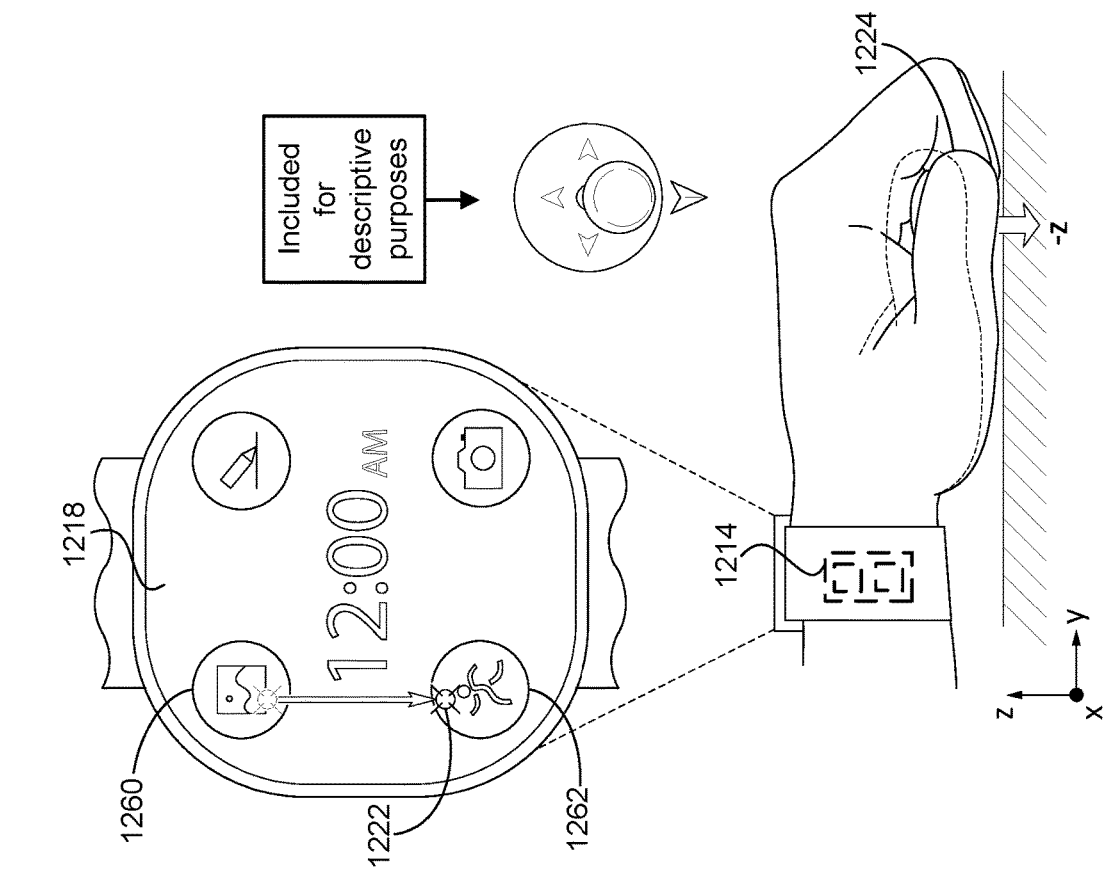
Figure 12E:
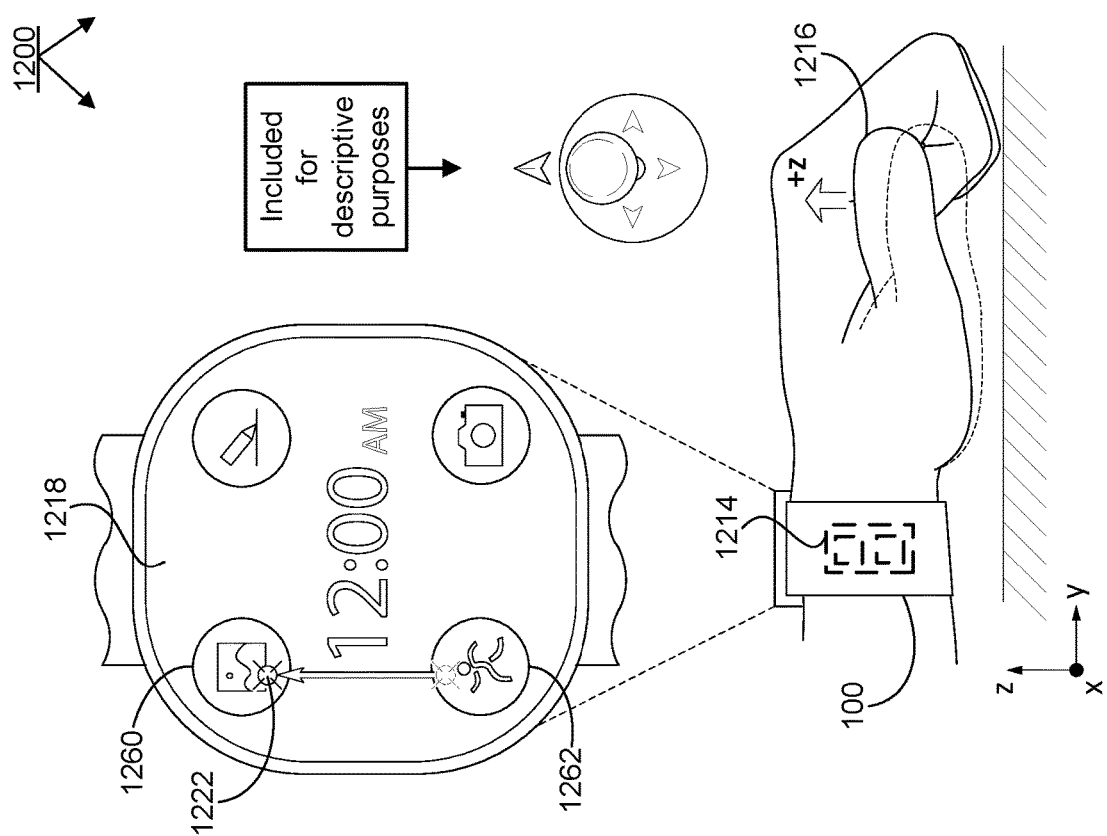

Turning now to FIG. 12E, the user 101 is performing a gesture that includes the thumb movement 1216, as shown in FIG. 12B. However, in FIG. 12E the palm of the user 101 is facing downward (e.g., is in the first spatial orientation), and therefore the thumb movement 1216 is in an upward direction (e.g., a positive "z" direction in a cartesian coordinate plane) with respect to the reference frame of the user 101, instead of the downward gesture shown in FIG. 12B. In this way, the computing system 1200 remains intuitive to a user 101, while allowing the user 101 to use two different axes of rotation corresponding to distinct spatial orientations.

Turning now to FIG. 12F, the user 101 is performing the other gesture, which includes the thumb movement 1224 away from the palm of the hand of the user 101. Since the hand of the user 101 is in the first spatial orientation (e.g., the palm of the user 101 is facing downward), the thumb movement 1224 of the gesture performed in FIG. 12F is detected by one or more sensors 1214 shown in the symbolic block view. Based on the thumb movement 1224 performed as part of the user gesture shown in FIG. 12F, the focus selector 1222 shown in the user interface 1218 moves in a downward direction (e.g., negative "z" direction in a cartesian coordinate plane). As a result, the focus selector 1222 is selecting a different selectable option 1262 within the circular menu user interface element 1208 than a selectable option 1260 that the focus selector 1222 was selecting before the user 101 performed the gesture.

FIGS. 13A-13F illustrate another example user scenario with the example computing system 1200 (e.g., including at least a head-wearable device and a wrist-wearable device), in accordance with some embodiments. As in FIGS. 12A-12F, the user 101 in the specific example illustrated by FIGS. 13A-13F is performing gestures that correspond to navigational operations at either a user interface 1218 of the wrist-wearable device 100, or a user interface displayed at a display of the head-wearable device 1202. As in FIGS. 12A-12F, the navigational operations are illustrated by a focus selector 1222 displayed within the user interface 1218.

Figure 13A:
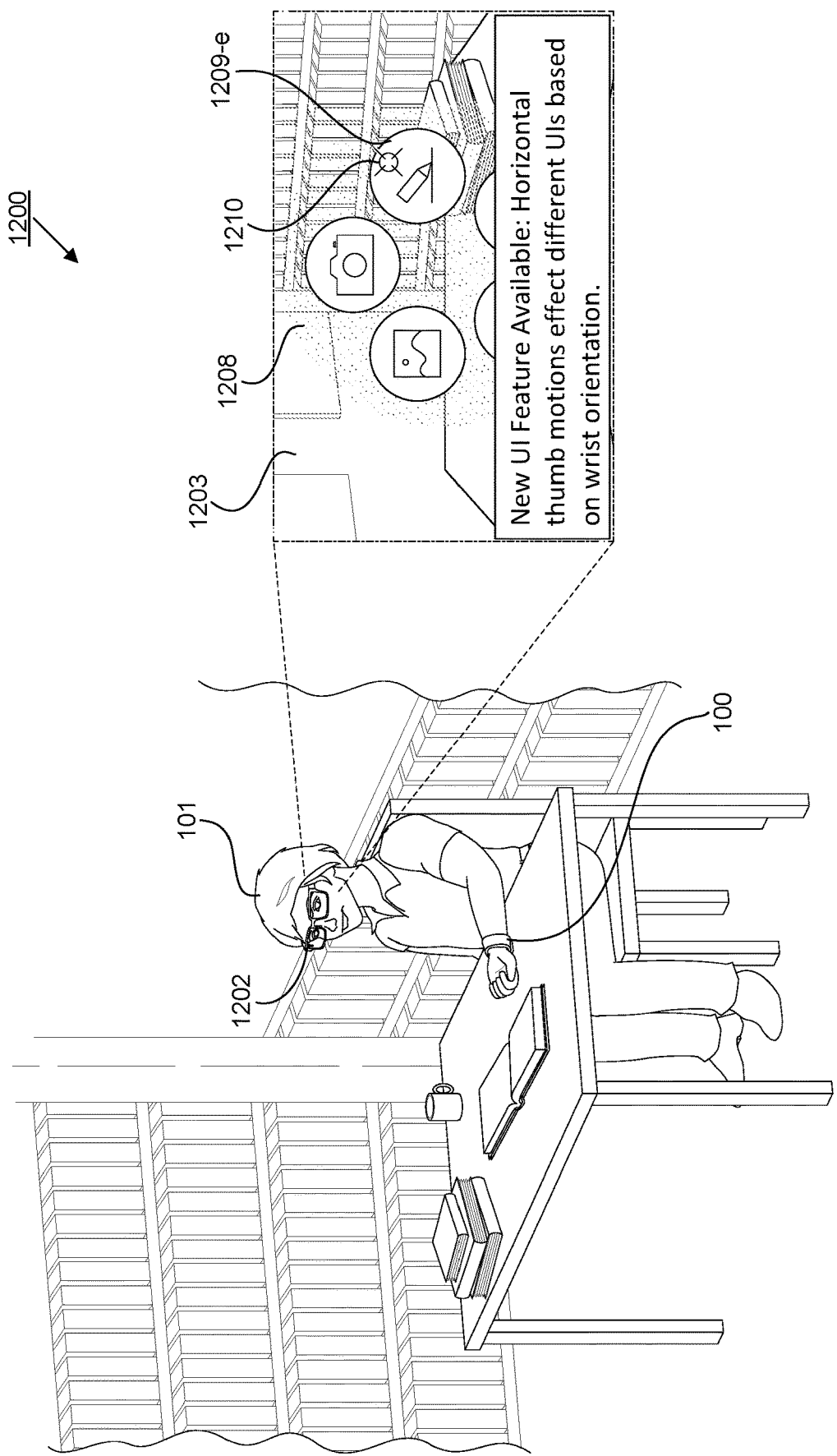

Turning now to FIG. 13A, the user 101 is sitting at the same desk as shown in FIGS. 12A and 12E. As in FIG. 12A, the palm of the user 101 is facing upward in FIG. 13A, which can be considered the second spatial orientation. The user interface is presented at the head-wearable device 1202, as in FIG. 12A. The head-wearable device is displaying the circular menu user interface element 1208, and a focus selector 1210 within the circular menu user interface element 1208.

Turning now to FIG. 13B, the user 101 is performing a gesture that includes a thumb movement 1302 forward along an index finger of the user 101. Since the hand of the user is in the second spatial orientation (e.g., the palm of the user 101 is facing upward), the thumb movement 1302 causes operations to be performed at the head-wearable device 1202. Based on the thumb movement 1302 performed as part of the user gesture in FIG. 13B, the focus selector 1210 shown in the viewing range 1203 moves in a forward direction in the user interface of the head-wearable device

1202. As a result, the focus selector 1210 is selecting a different selectable option within the circular menu user interface element 1208 than before the performance of the user gesture.

Turning now to FIG. 13C, the user 101 is performing a gesture that includes a thumb movement 1304 backward along the index finger of the user 101. Since the hand of the user 101 is in the second spatial orientation (e.g., the palm of the user 101 is facing upward), the thumb movement 1304 causes operations to be performed at the head-wearable device 1202. Based on the thumb movement 1304 performed as part of the user gesture in FIG. 13C, the focus selector 1210 shown in the viewing range 1203 moves in a backward direction, within the circular menu user interface element 1208. As a result, the focus selector 1210 is selecting a different selectable option within the circular menu user interface element 1208 than before the performance of the user gesture.

Figure 13D:
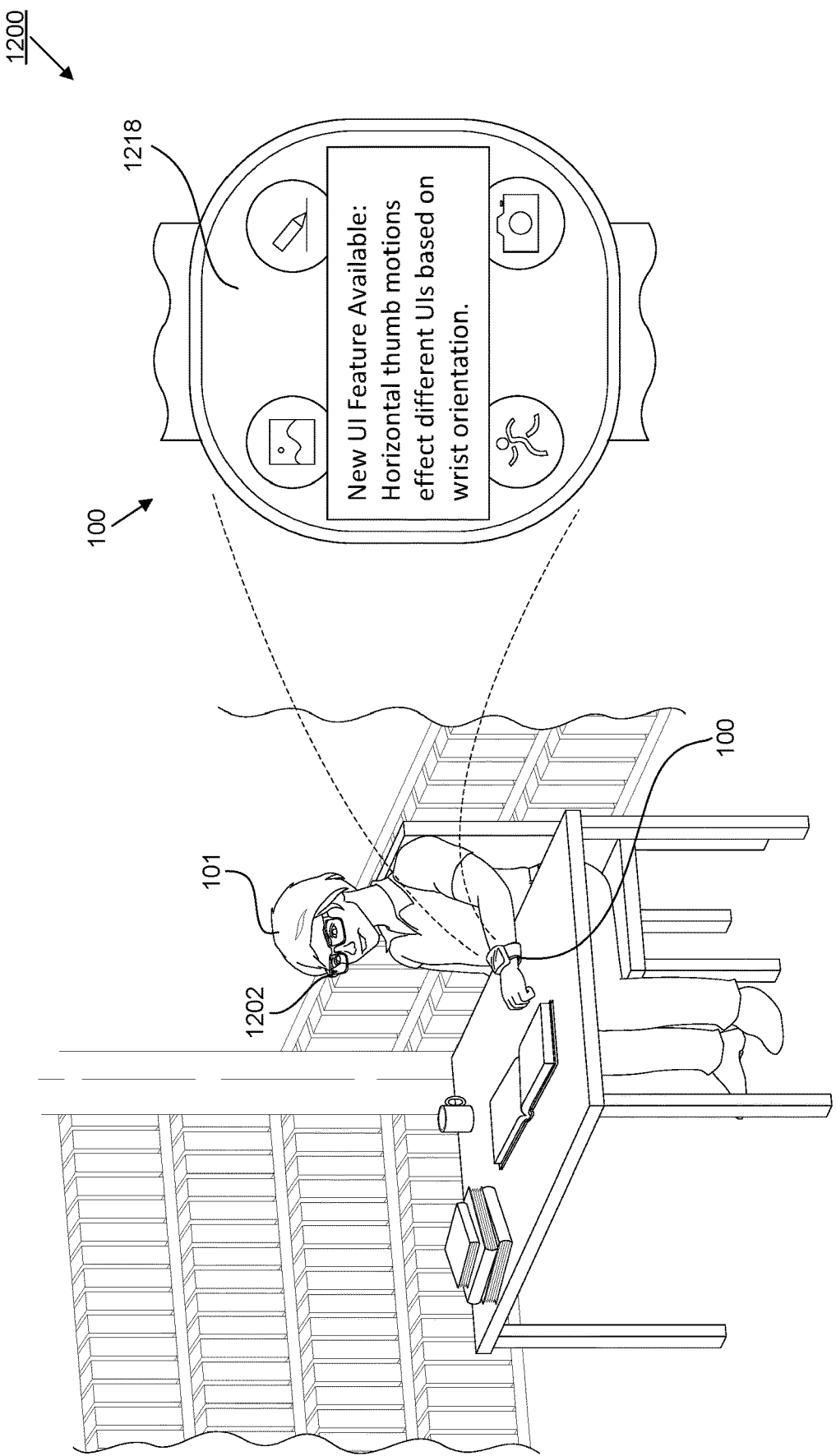

Turning now to FIG. 13D, the user 101 is sitting at the same desk as shown in FIGS. 12A, 12E, and 13A. As in FIG. 12E, the palm of the user 101 is facing downward in FIG. 13E, which can be considered the first spatial orientation. The user interface 1218 is displayed at the wrist-wearable device 100, as in FIG. 12E. The user interface 1218 is displaying a focus selector 1222.

Figure 13F:
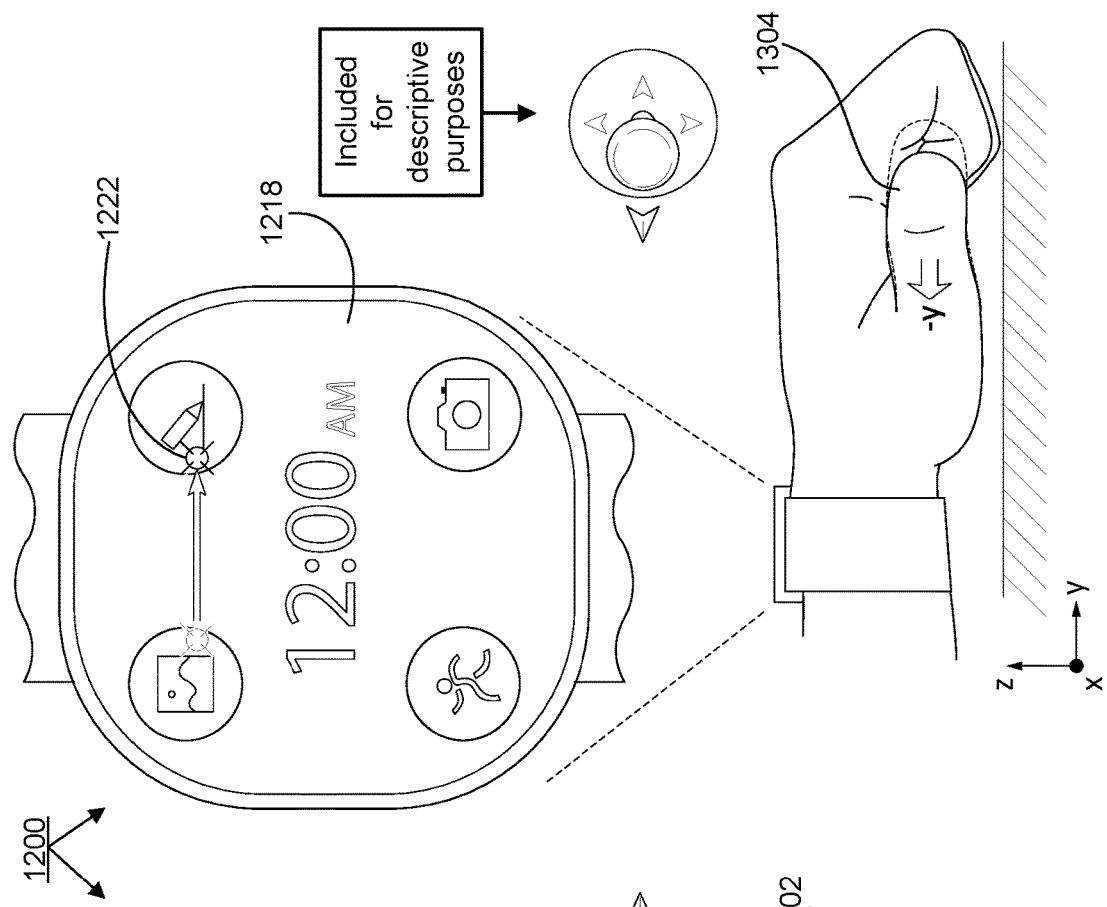
Figure 13E:
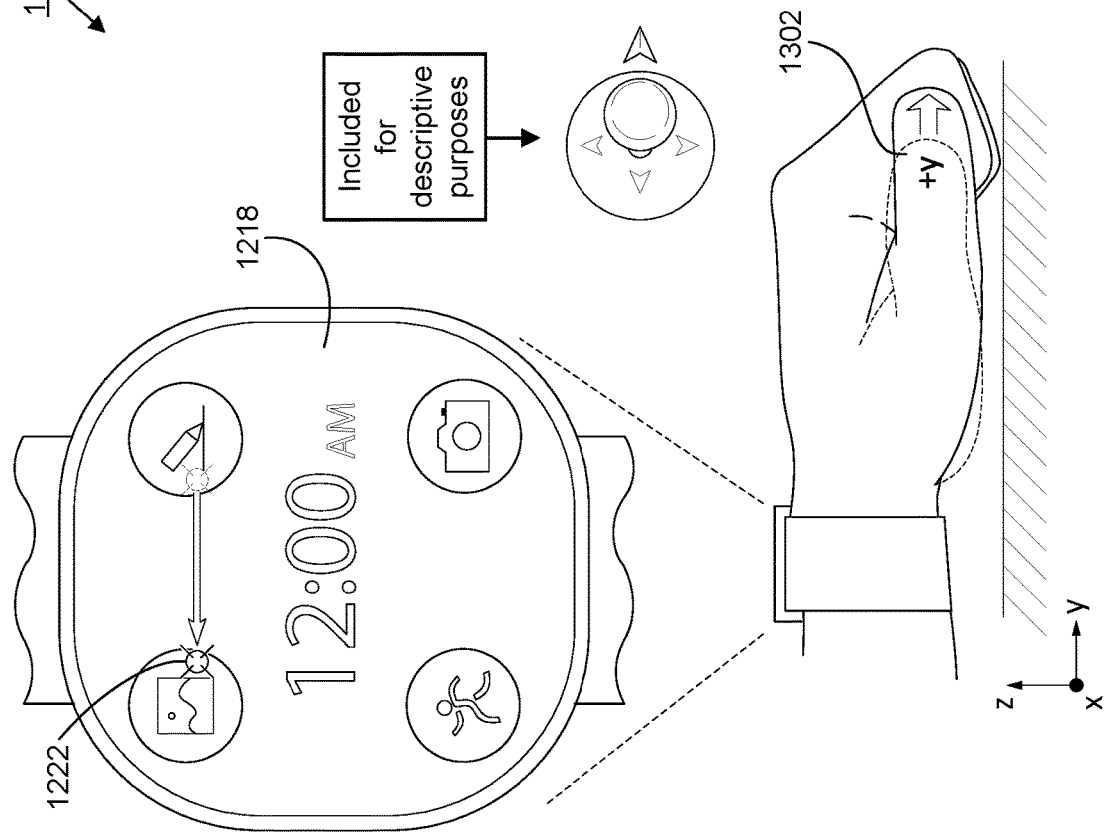

Turning now to FIG. 13E, the user 101 is performing a gesture that includes the thumb movement 1302 forward along the index finger of the user 101, which is substantially the same thumb movement as shown in FIG. 13B. Since the hand of the user 101 is in the first spatial orientation (e.g., the palm of the user 101 is facing downward), the thumb movement 1302 causes operations to be performed at the user interface 1218 of the wrist-wearable device 100. Based on the thumb movement 1302 performed as part of the user gesture in FIG. 13E, the focus selector 1222 shown in the user interface 1218 moves in a backwards direction in the user interface 1218, according to some embodiments. It should be noted that the movement of the focus selector 1222 in response to the thumb movement 1302 is in a substantially opposite direction from the movement of the focus selector 1210 in response to the thumb movement 1302 that is substantially in the same direction as shown in FIG. 13B, despite the fact that the thumb movement 1302 is in the same direction relative to the orientation of the user 101, which is meant to increase the efficiency of the man-machine interface. Since the thumb movements 1216 and 1224, in vertical directions relative to the spatial orientation of the user 101 in FIGS. 12B-12C and 12E-12F, cause movements of the respective focus selectors in opposite directions based on the spatial orientation of the hand of the user 101, the horizontal movements of the thumb of the user 101 also correspond to movements of the respective focus selectors in opposite directions since that is the intuitive result of the flipped coordinate planes. In some embodiments, the operations are configurable by the user 101 such that the horizontal movements of the thumb of the user 101 do not cause movements of the respective focus selectors in opposite directions.

Turning now to FIG. 13F, the user 101 is performing a gesture that includes the same thumb movement 1304 as shown in FIG. 13C. Since the hand of the user 101 is in the first spatial orientation (e.g., the palm of the user 101 is facing downward), the thumb movement 1304 causes operations to be performed at the user interface 1218 of the wrist-wearable device 100. Based on the thumb movement 1304 performed as part of the user gesture in FIG. 13F, the focus selector 1222 shown in the user interface 1218 moves in a forward direction in the user interface 1218, according to some embodiments. It should be noted that the movement of the focus selector 1222 in response to the thumb movement 1304 is in a substantially opposite direction from the movement of the focus selector 1210 in response to the same thumb movement 1304 shown in FIG. 13C, despite the fact that the thumb movement 1304 is in the same direction relative to the orientation of the user 101. As discussed with respect to FIG. 13E, this effect is meant to increase the efficiency of the man-machine interface by causing more intuitive operations.

Figure 14A:
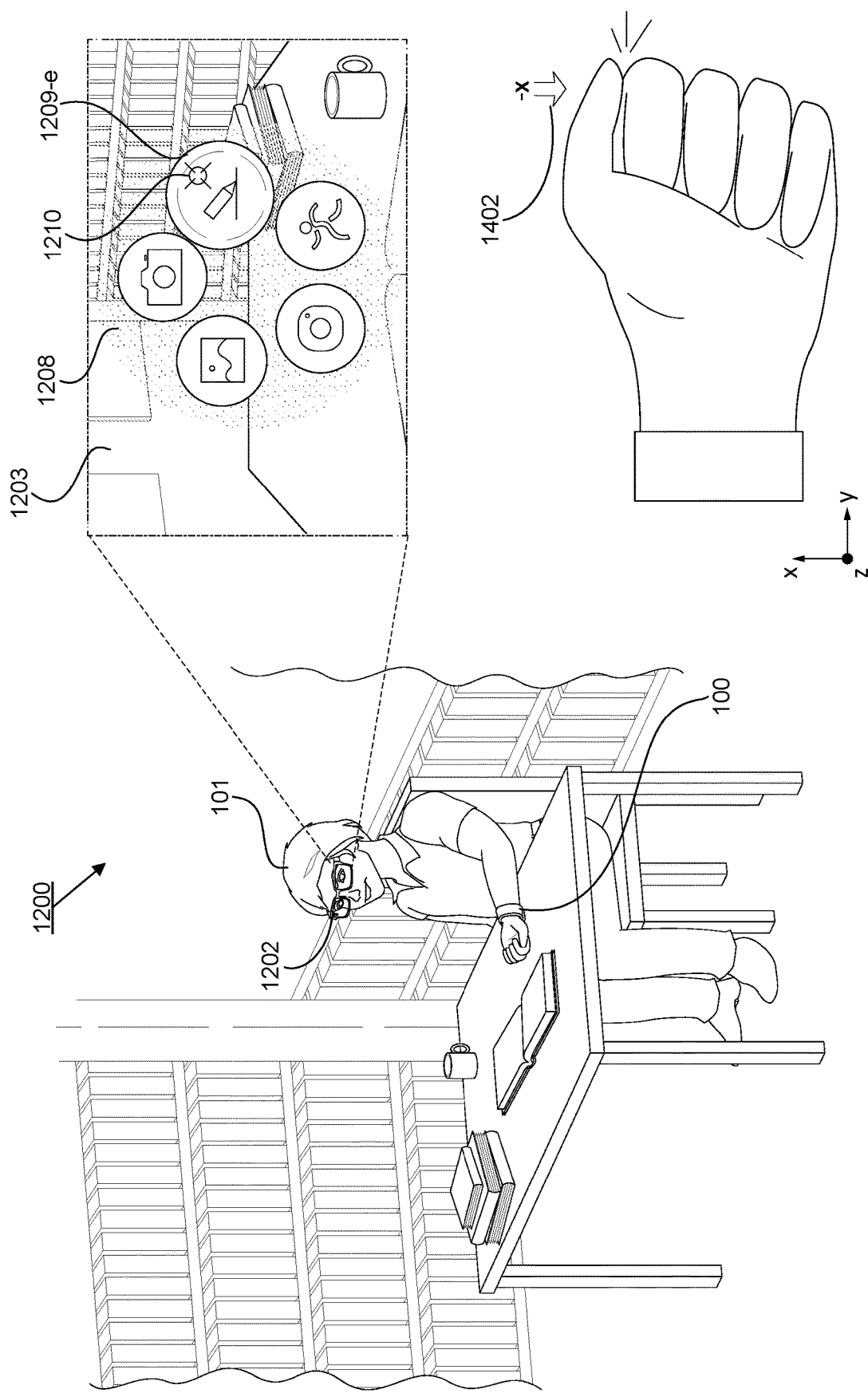
FIGS. 14A-14B illustrate another example user scenario with an example computing system (e.g., including at least a head-wearable device and a wrist-wearable device), in accordance with some embodiments.
Figure 14B:
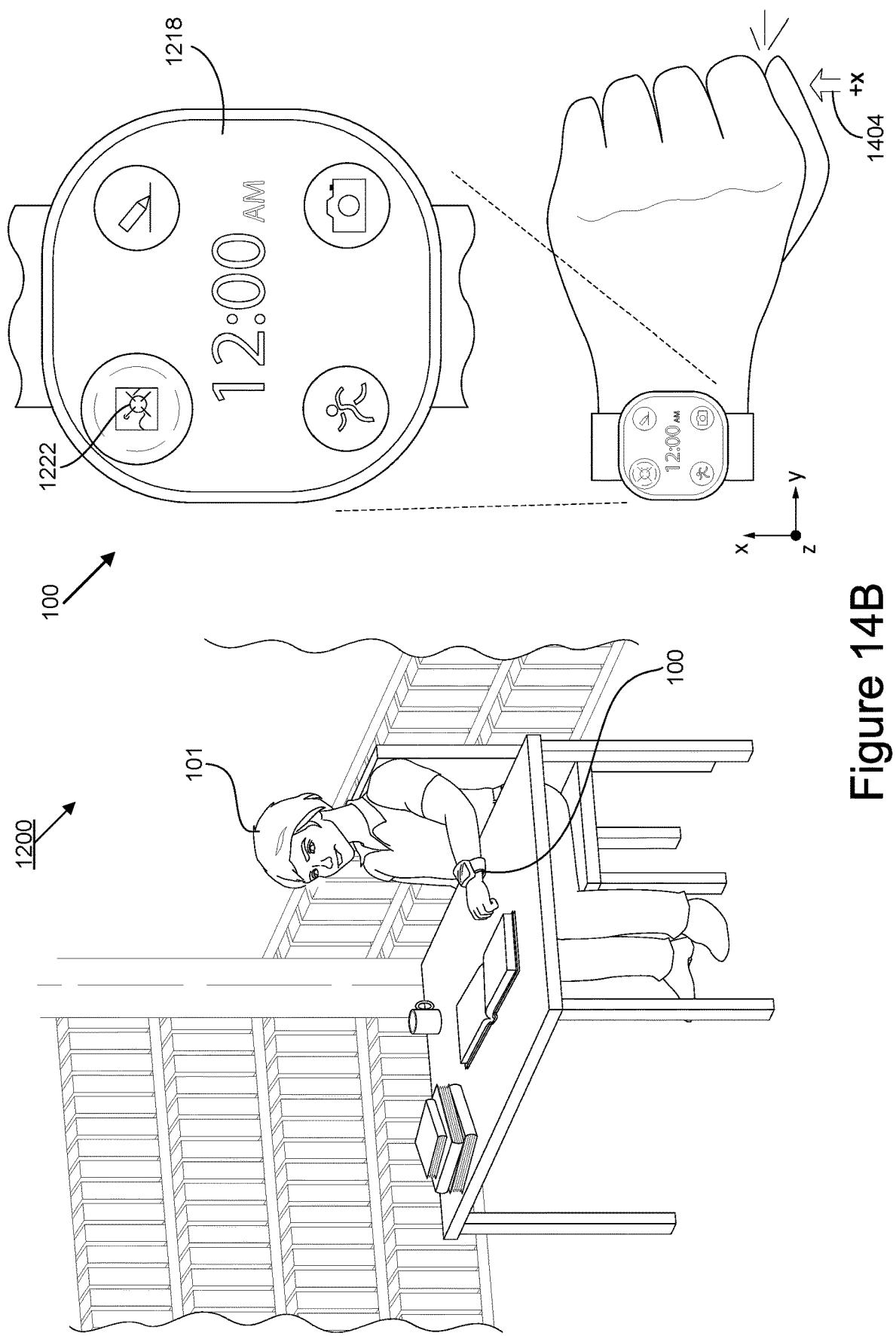

FIGS. 14A-14B illustrate another example user scenario with the example computing system 1200 (e.g., including at least a head-wearable device and a wrist-wearable device), in accordance with some embodiments. As in FIGS. 12A-12F and 13A-13F, the user 101 in the specific example illustrated by FIGS. 14A-14B is performing operations at either a user interface 1218 display at the wrist-wearable device 100, or a user interface presented by the head-wearable device 1202.

Turning now to FIG. 14A, the user 101 is sitting at the same desk as in the previous FIGS. 12A-13F and is wearing the head-wearable device 1202 and the wrist-wearable device 100. The palm of the user 101 is facing upward, which corresponds to the second spatial orientation according to some embodiments. Since the hand of the user 101 is in the second spatial orientation, outside of the viewing range of the user 101, operations caused by gestures performed by the user 101 are caused to be performed at a user interface of the head-wearable device 1202 presented within the viewing range 1203 of the user 101. The user 101 is performing a downward press gesture with a thumb of the user 101 moving toward an index finger of the user. In some embodiments, the downward press gestures are performed after or before the user 101 performs a corresponding thumb movement, as shown in FIGS. 12A-13F. In some embodiments, as illustrated by FIG. 14A, the gesture 1402 is a standalone gesture that causes an operation to be performed to select a selectable option 1209-e, within the circular menu user interface element 1208, while the focus selector 1210 is selecting the selectable option 1209-c.

Turning now to FIG. 14B, the user 101 is sitting at the same desk as in the previous FIGS. 12A-14A and is wearing the head-wearable device 1202 and the wrist-wearable device 100. The user's palm is facing downward, which corresponds to the first spatial orientation according to some embodiments. Since the hand of the user 101 is in the first spatial orientation, operations caused by gestures performed by the user 101 are caused to be performed at the user interface 1218 of the wrist-wearable device 100. The user 101 is performing a downward press gesture with the thumb of the user 101 moving toward the index finger of the user 101. In some embodiments, the gesture 1404 is a standalone gesture that causes an operation to be performed to a selectable option within the user interface 118 of the wrist-wearable device 100.

It should be noted that the user 101 in FIG. 14B is not wearing a head-wearable device, which illustrates that any of the functions described herein can be performed without any head-wearable device, or in conjunction with more than one user interface. Rather the distinct spatial orientations of the hand of the user 101 as described herein can correspond to different operations at the same wrist-wearable device, and/or one of the spatial orientations can correspond to operations being performed or not being performed.

Although the user scenarios described previously with respect to the series of FIGS. 12A through 14B describe operations being performed by the wrist-wearable device 100 and optionally the head-wearable device 1202, in some embodiments, at least a subset of the operations are performed by an intermediary device, such as a smartphone or personal computer, that is in communication with the wearable device. For example, the movement of one or both of the focus selectors 1210 and 1222 may occur at the wearable devices, but interpretation of the movement (e.g., identifying a gesture to which the movement corresponds) optionally occurs at an intermediary device (e.g., the computer system 1771). In some embodiments, the wrist-wearable device and the head-worn device communication with one another via the intermediary device (e.g., each are communicatively coupled to the intermediary device and the intermediary device manages interactions between the devices).

Additionally, although the user scenarios described with respect to the series of FIGS. 1 through 14 are described as separate sequences, in some embodiments, the user scenarios are combined with one another. For example, the sequence described with respect to FIGS. 12A-12F could occur before (or after) the sequences described with respect to FIGS. 1 and 8A-8C (e.g., all three sequences could occur while the user is sitting at a desk). For example, the user could perform the in-air hand gesture 114 shown in the second row 112 of FIG. 1. Then, while the photo application user interface 115 is being displayed, the user 101 can perform the various in-air hand gestures shown in FIGS. 12A-13F to navigate through the thumbnails shown in the photo application user interface 115. The user 101 can then optionally perform one of the downward press thumb gestures shown in FIGS. 14A-14B to perform an operation associated with a thumbnail selected by a focus selector (e.g., the focus selector 1222) in the photo application user interface.

Having thus described example sequences and methods of operation that make use of the example sequences, attention will now be directed to example wrist-wearable devices and capsule devices associated with wrist-wearable devices, on which some or all of the methods can be implemented.

Example Wrist-Wearable Devices

Figure 15B:
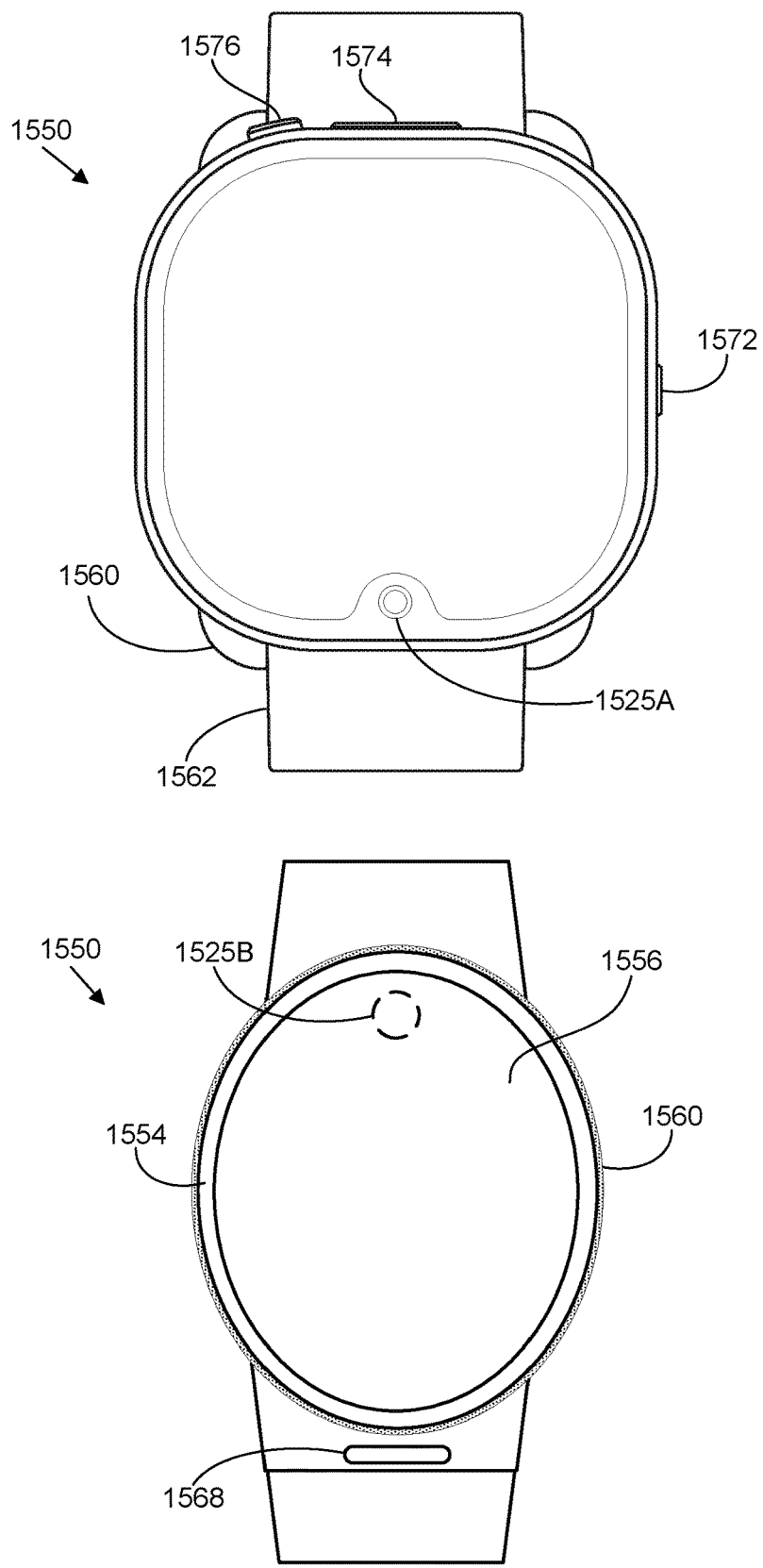

FIGS. 15A and 15B illustrate an example wrist-wearable device 1550, in accordance with some embodiments. The wrist-wearable device 1550 is an instance of the wrist-wearable device 100 described above in reference to FIG. 12A, such that the wrist-wearable device 100 should be understood to have the features of the wrist-wearable device 1550 and vice versa. FIG. 15A illustrates a perspective view of the wrist-wearable device 1550 that includes a watch body 1554 coupled with a watch band 1562. The watch body 1554 and the watch band 1562 can have a substantially rectangular or circular shape and can be configured to allow a user to wear the wrist-wearable device 1550 on a body part (e.g., a wrist). The wrist-wearable device 1550 can include a retaining mechanism 1567 (e.g., a buckle, a hook and loop fastener, etc.) for securing the watch band 1562 to the user's wrist (e.g., the user 101 in FIGS. 12A-14B). The wrist-wearable device 1550 can also include a coupling mechanism 1560 (e.g., a cradle) for detachably coupling the capsule or watch body 1554 (via a coupling surface of the watch body 1554) to the watch band 1562.

Figure 21B:
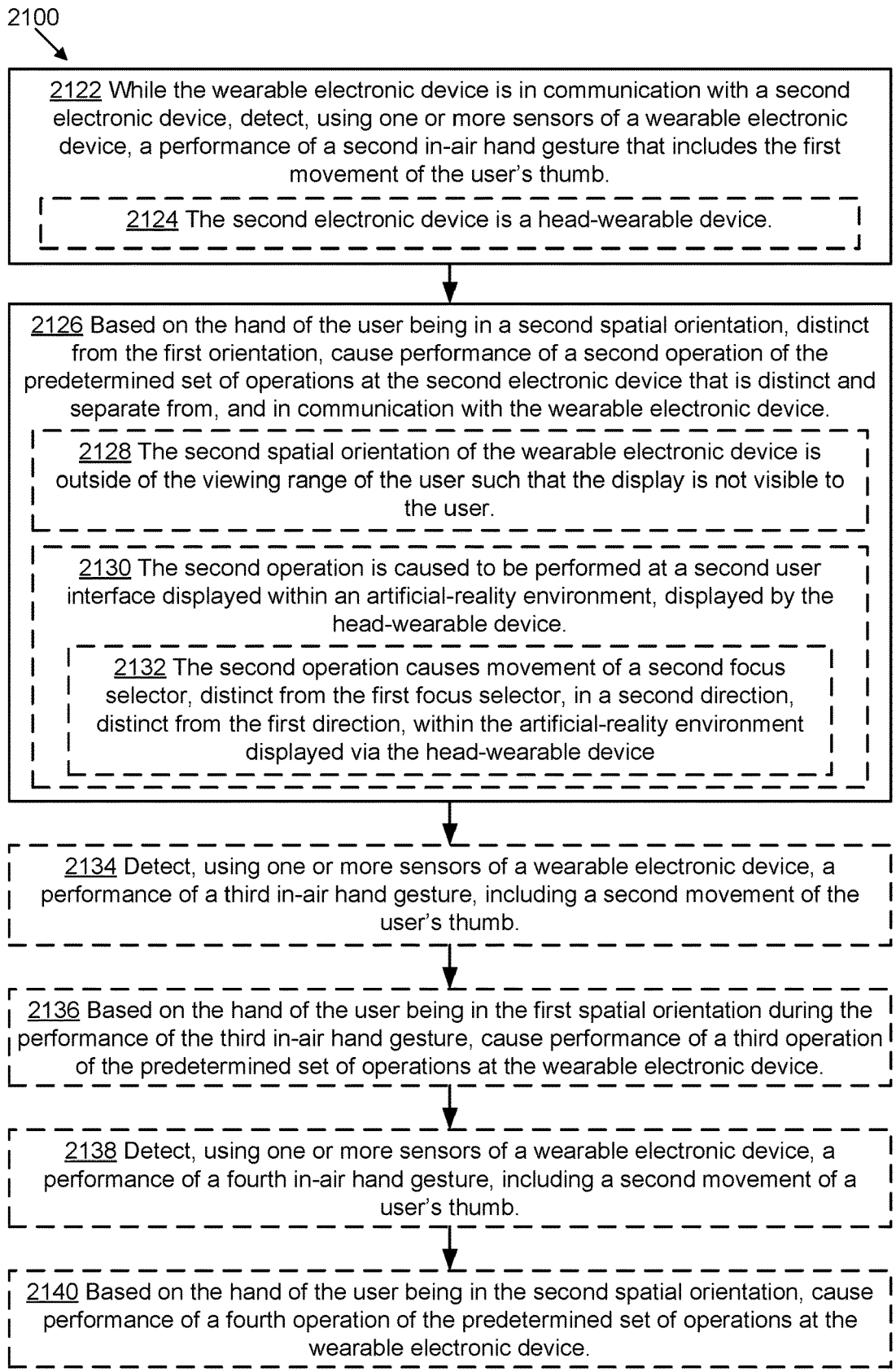

The wrist-wearable device 1550 can perform various functions associated with navigating through user interfaces and selectively opening applications, as described above with reference to FIGS. 12A-14B. As will be described in more detail below with reference to FIG. 21A-21B, operations executed by the wrist-wearable device 1550 can include, without limitation, display of visual content to the user (e.g., visual content displayed on display 1556); sensing user input (e.g., sensing a touch on peripheral button 1568, sensing biometric data on sensor 1564, sensing neuromuscular signals on neuromuscular sensor 1565, etc.); messaging (e.g., text, speech, video, etc.); image capture; wireless communications (e.g., cellular, near field, Wi-Fi, personal area network, etc.); location determination; financial transactions; and providing haptic feedback, alarms, notifications, biometric authentication, health monitoring, sleep monitoring, etc. These functions can be executed independently in the watch body 1554, independently in the watch band 1562, and/or in communication between the watch body 1554 and the watch band 1562. In some embodiments, functions can be executed on the wrist-wearable device 1550 in conjunction with an AR environment as described herein. As the skilled artisan will appreciate upon reading the descriptions provided herein, the novel wearable devices described herein can be used with any types of AR environment.

Figure 17A:
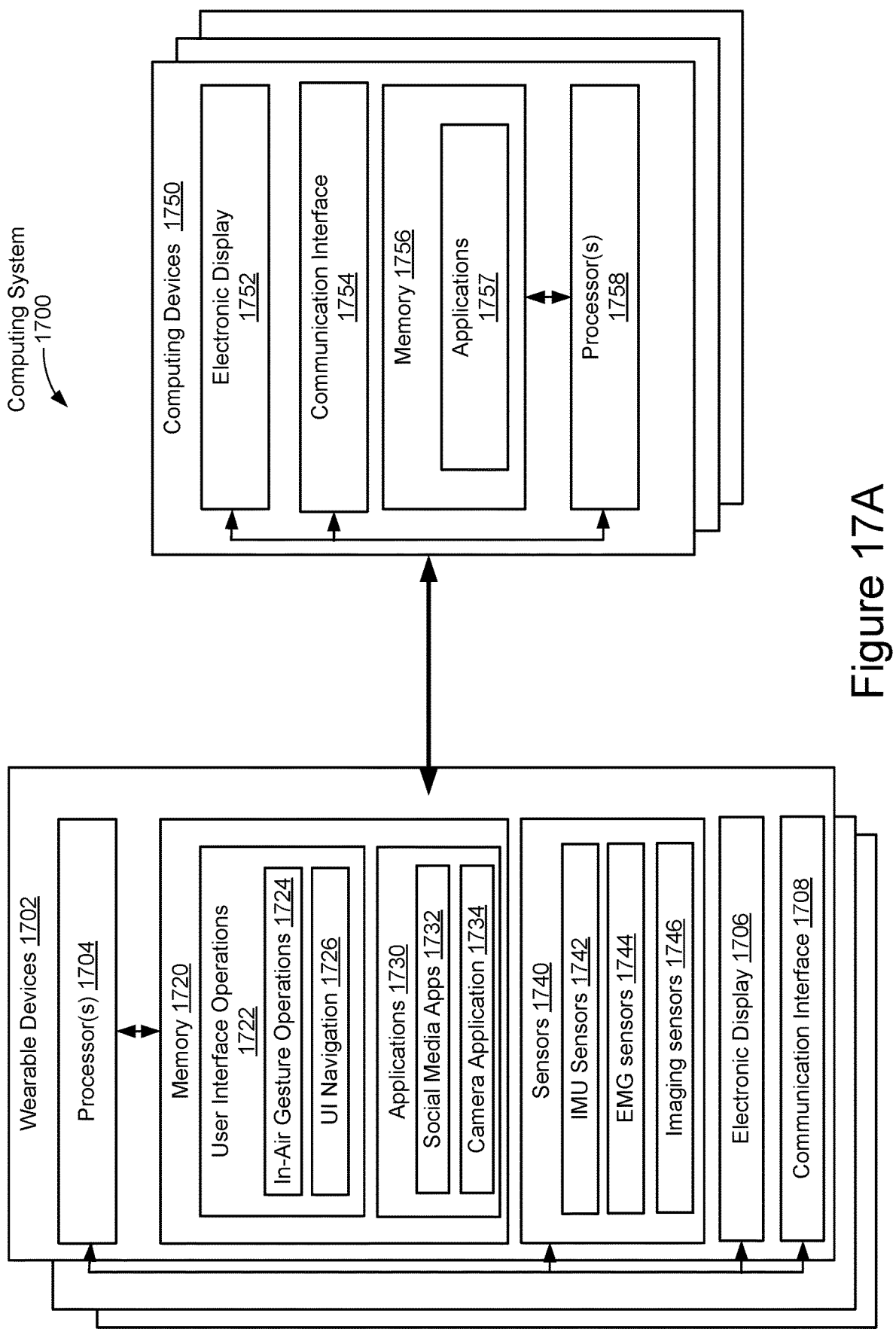
FIGS. 17A-17B are block diagrams illustrating example computing systems, in accordance with some embodiments.

The watch band 1562 can be configured to be worn by a user such that an inner surface of the watch band 1562 is in contact with the user's skin. When worn by a user, sensor 1564 is in contact with the user's skin. The sensor 1564 can be a biosensor that senses a user's heart rate, saturated oxygen level, temperature, sweat level, muscle intentions, or a combination thereof. The watch band 1562 can include multiple sensors 1564 that can be distributed on an inside and/or an outside surface of the watch band 1562. Additionally, or alternatively, the watch body 1554 can include sensors that are the same or different than those of the watch band 1562 (or the watch band 1562 can include no sensors at all in some embodiments). For example, multiple sensors can be distributed on an inside and/or an outside surface of the watch body 1554. As described below with reference to FIGS. 15C and/or 17A, the watch body 1554 can include, without limitation, a front-facing image sensor 1525A and/or a rear-facing image sensor 1525B, a biometric sensor, an IMU, a heart rate sensor, a saturated oxygen sensor, a neuromuscular sensor(s) (e.g., EMG sensors 1744; FIG. 17A), an altimeter sensor, a temperature sensor, a bioimpedance sensor, a pedometer sensor, an optical sensor (e.g., imaging sensor 1746), a touch sensor, a sweat sensor, etc. The sensor 1564 can also include a sensor that provides data about a user's environment including a user's motion (e.g., an IMU), altitude, location, orientation, gait, or a combination thereof. The sensor 1564 can also include a light sensor (e.g., an infrared light sensor, a visible light sensor) that is configured to track a position and/or motion of the watch body 1554 and/or the watch band 1562. The watch band 1562 can transmit the data acquired by sensor 1564 to the watch body 1554 using a wired communication method (e.g., a Universal Asynchronous Receiver/Transmitter (UART), a USB transceiver, etc.) and/or a wireless communication method (e.g., near field communication, Bluetooth, etc.). The watch band 1562 can be configured to operate (e.g., to collect data using sensor 1564) independent of whether the watch body 1554 is coupled to or decoupled from watch band 1562.

In some examples, the watch band 1562 can include a neuromuscular sensor 1565 (e.g., an EMG sensor, a mechanomyogram (MMG) sensor, a sonomyography (SMG) sensor, etc.). Neuromuscular sensor 1565 can sense a user's intention to perform certain motor actions. The sensed muscle intention can be used to control certain user interfaces displayed on the display 1556 of the wrist-wearable device 1550 and/or can be transmitted to a device responsible for rendering an artificial-reality environment (e.g., a head-mounted display) to perform an action in an associated artificial-reality environment, such as to control the motion of a virtual device displayed to the user.

Signals from neuromuscular sensor 1565 can be used to provide a user with an enhanced interaction with a physical object and/or a virtual object in an artificial-reality application generated by an artificial-reality system (e.g., user interface objects presented on the display 1556, or another computing device (e.g., a smartphone)). Signals from neuromuscular sensor 1565 can be obtained (e.g., sensed and recorded) by one or more neuromuscular sensors 1565 of the watch band 1562. Although FIG. 15A shows one neuromuscular sensor 1565, the watch band 1562 can include a plurality of neuromuscular sensors 1565 arranged circumferentially on an inside surface of the watch band 1562 such that the plurality of neuromuscular sensors 1565 contact the skin of the user. The watch band 1562 can include a plurality of neuromuscular sensors 1565 arranged circumferentially on an inside surface of the watch band 1562. Neuromuscular sensor 1565 can sense and record neuromuscular signals from the user as the user performs muscular activations (e.g., movements, gestures, etc.). The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

The watch band 1562 and/or watch body 1554 can include a haptic device 1563 (e.g., a vibratory haptic actuator) that is configured to provide haptic feedback (e.g., a cutaneous and/or kinesthetic sensation, etc.) to the user's skin. The sensors 1564 and 1565, and/or the haptic device 1563 can be configured to operate in conjunction with multiple applications including, without limitation, health monitoring, social media, game playing, and artificial reality (e.g., the applications associated with artificial reality).

The wrist-wearable device 1550 can include a coupling mechanism (also referred to as a cradle) for detachably coupling the watch body 1554 to the watch band 1562. A user can detach the watch body 1554 from the watch band 1562 in order to reduce the encumbrance of the wrist-wearable device 1550 to the user. The wrist-wearable device 1550 can include a coupling surface on the watch body 1554 and/or coupling mechanism(s) 1560 (e.g., a cradle, a tracker band, a support base, a clasp). A user can perform any type of motion to couple the watch body 1554 to the watch band 1562 and to decouple the watch body 1554 from the watch band 1562. For example, a user can twist, slide, turn, push, pull, or rotate the watch body 1554 relative to the watch band 1562, or a combination thereof, to attach the watch body 1554 to the watch band 1562 and to detach the watch body 1554 from the watch band 1562.

As shown in the example of FIG. 15A, the watch band coupling mechanism 1560 can include a type of frame or shell that allows the watch body 1554 coupling surface to be retained within the watch band coupling mechanism 1560. The watch body 1554 can be detachably coupled to the watch band 1562 through a friction fit, magnetic coupling, a rotation-based connector, a shear-pin coupler, a retention spring, one or more magnets, a clip, a pin shaft, a hook and loop fastener, or a combination thereof. In some examples, the watch body 1554 can be decoupled from the watch band 1562 by actuation of the release mechanism 1570. The release mechanism 1570 can include, without limitation, a button, a knob, a plunger, a handle, a lever, a fastener, a clasp, a dial, a latch, or a combination thereof.

As shown in FIGS. 15A-15B, the coupling mechanism 1560 can be configured to receive a coupling surface proximate to the bottom side of the watch body 1554 (e.g., a side opposite to a front side of the watch body 1554 where the display 1556 is located), such that a user can push the watch body 1554 downward into the coupling mechanism 1560 to attach the watch body 1554 to the coupling mechanism 1560. In some embodiments, the coupling mechanism 1560 can be configured to receive a top side of the watch body 1554 (e.g., a side proximate to the front side of the watch body 1554 where the display 1556 is located) that is pushed upward into the cradle, as opposed to being pushed downward into the coupling mechanism 1560. In some embodiments, the coupling mechanism 1560 is an integrated component of the watch band 1562 such that the watch band 1562 and the coupling mechanism 1560 are a single unitary structure.

The wrist-wearable device 1550 can include a single release mechanism 1570 or multiple release mechanisms 1570 (e.g., two release mechanisms 1570 positioned on opposing sides of the wrist-wearable device 1550 such as spring-loaded buttons). As shown in FIG. 15A, the release mechanism 1570 can be positioned on the watch body 1554 and/or the watch band coupling mechanism 1560. Although FIG. 15A shows release mechanism 1570 positioned at a corner of watch body 1554 and at a corner of watch band coupling mechanism 1560, the release mechanism 1570 can be positioned anywhere on watch body 1554 and/or watch band coupling mechanism 1560 that is convenient for a user of wrist-wearable device 1550 to actuate. A user of the wrist-wearable device 1550 can actuate the release mechanism 1570 by pushing, turning, lifting, depressing, shifting, or performing other actions on the release mechanism 1570. Actuation of the release mechanism 1570 can release (e.g., decouple) the watch body 1554 from the watch band coupling mechanism 1560 and the watch band 1562 allowing the user to use the watch body 1554 independently from watch band 1562. For example, decoupling the watch body 1554 from the watch band 1562 can allow the user to capture images using rear-facing image sensor 1525B.

FIG. 15B includes top views of examples of the wrist-wearable device 1550. The examples of the wrist-wearable device 1550 shown in FIGS. 15A-15B can include a coupling mechanism 1560 (as shown in FIG. 15B, the shape of the coupling mechanism can correspond to the shape of the watch body 1554 of the wrist-wearable device 1550). The watch body 1554 can be detachably coupled to the coupling mechanism 1560 through a friction fit, magnetic coupling, a rotation-based connector, a shear-pin coupler, a retention spring, one or more magnets, a clip, a pin shaft, a hook and loop fastener, or any combination thereof.

In some examples, the watch body 1554 can be decoupled from the coupling mechanism 1560 by actuation of a release mechanism 1570. The release mechanism 1570 can include, without limitation, a button, a knob, a plunger, a handle, a lever, a fastener, a clasp, a dial, a latch, or a combination thereof. In some examples, the wristband system functions can be executed independently in the watch body 1554, independently in the coupling mechanism 1560, and/or in communication between the watch body 1554 and the coupling mechanism 1560. The coupling mechanism 1560 can be configured to operate independently (e.g., execute functions independently) from watch body 1554. Additionally, or alternatively, the watch body 1554 can be configured to operate independently (e.g., execute functions independently) from the coupling mechanism 1560. As described below with reference to the block diagram of FIG. 8, the coupling mechanism 1560 and/or the watch body 1554 can each include the independent resources required to independently execute functions. For example, the coupling mechanism 1560 and/or the watch body 1554 can each include a power source (e.g., a battery), a memory, data storage, a processor (e.g., a central processing unit (CPU)), communications, a light source, and/or input/output devices.

The wrist-wearable device 1550 can have various peripheral buttons 1572, 1574, and 1576, for performing various operations at the wrist-wearable device 1550. Also, various sensors, including one or both of the sensors 1564 and 1565, can be located on the bottom of the watch body 1554, and can optionally be used even when the watch body 1554 is detached from the watch band 1562.

Figure 15C:
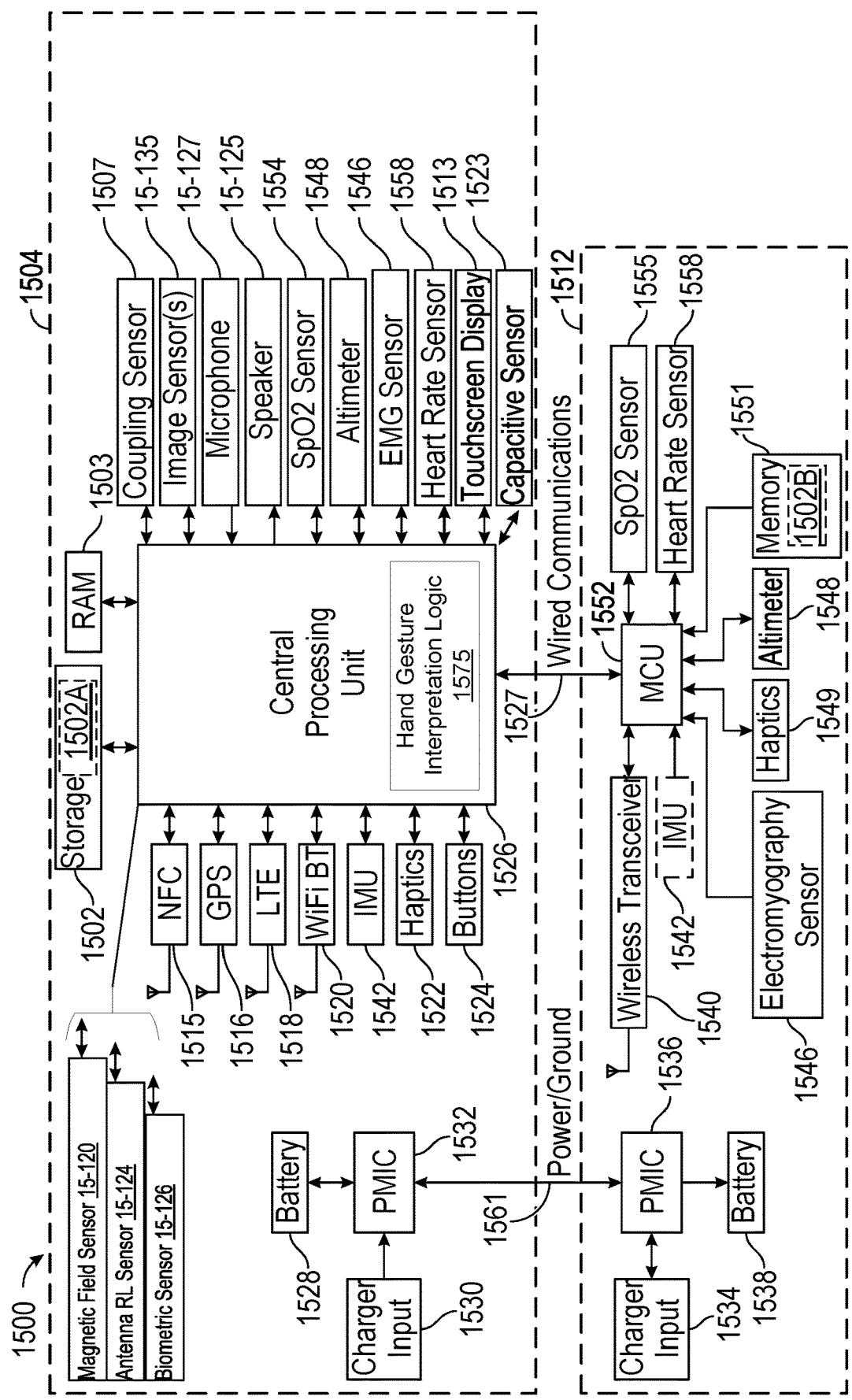

FIG. 15C is a block diagram of a wrist-wearable device system 1500 (which can include some or all of the components of the example wrist-wearable device 1550 shown in FIGS. 15A-15B), according to at least one embodiment of the present disclosure. The wrist-wearable device 100 described in detail above is an example wrist-wearable device system 1500, so the wrist-wearable device 100 will be understood to include the components shown and described for system 1500 below. The wrist-wearable device system 1500 can have a split architecture (e.g., a split mechanical architecture, a split electrical architecture) between a watch body 1504 (e.g., a capsule or capsule portion) and a watch band 1512 (e.g., a band portion/cradle portion), which was described above in reference to FIGS. 14A-14C. Each of watch body 1504 and watch band 1512 can have a power source, a processor, a memory, sensors, a charging device, and a communications device that enables each of watch body 1504 and watch band 1512 to execute computing, controlling, communication, and sensing functions independently in watch body 1504, independently in watch band 1512, and/or in communication between watch body 1504 and watch band 1512.

For example, watch body 1504 can include a capacitive sensor 1522 (or a device such as an NFC sensor 1515 that can in some embodiments act as a capacitive sensor), magnetic field sensor 15-120, antenna return-loss (RL) sensor 15-124, biometric sensor 15-126, battery 1528, CPU 1526, memory 1502 (and/or the storage 1502A), heart rate sensor 1558, EMG sensor 1546, SpO$_2$ sensor 1555, IMU 1542, random access memory 1503, charging input 1530 and communication devices NFC 1515, LTE 1518, and WiFi/Bluetooth 1520. Similarly, watch band 1512 can include battery 1538, microcontroller unit 1552, memory 1551, heart rate sensor 1558, EMG sensor 1546, SpO$_2$ sensor 1555, altimeter 1548, IMU 1542, charging input 1534 and wireless transceiver 1540. Memory 1551 (and/or storage 1502B) may further include determined device state data. In some examples, a level of functionality of at least one of watch band 1512 or watch body 1504 can be modified when watch body 1504 is detached from watch band 1512. The level of functionality that can be modified can include the functionality of at least one sensor (e.g., heart rate sensor 1558, EMG sensor 1546, etc.). Each of watch body 1504 and watch band 1512 can execute instructions stored in storage 1502A or 1502B and memory 1551 respectively that enables at least one sensor (e.g., heart rate sensor 1558, EMG sensor 1546, etc.) in watch band 1512 to acquire data when watch band 1512 is detached from watch body 1504 and when watch band 1512 is attached to watch body 1504.

Watch body 1504 and watch band 1512 can further execute instructions stored in storage 1502B and memory 1551 respectively that enables watch band 1512 to transmit the acquired data to watch body 1504 (or other computing device such as a head mounted display or other computing device) using wired communications 1527 and/or wireless transceiver 1540. For example, watch body 1504 can display visual content to a user on touchscreen display 1513 and play audio content on speaker 15-125. Watch body 1504 can receive user inputs such as audio input from microphone 15-127 and touch input from buttons 1524. Watch body 1504 can also receive inputs associated with a user's location and/or surroundings. For example, watch body 1504 can receive location information from GPS 1516 and/or of watch band 1512.

Watch body 1504 can receive image data from one or more image sensors 15-135 (e.g., a camera). Image sensor 15-135 can include front-facing image sensor 1525A (FIG. 14A) and/or rear-facing image sensor 1525B (FIG. 15A-15B). Front-facing image sensor 1525A and/or rear-facing image sensor 1525B can capture wide-angle images of the area surrounding the front-facing image sensor 1525A and/or rear-facing image sensor 1525B such as hemispherical images (e.g., at least hemispherical, substantially spherical, etc.), 180-degree images, 360-degree area images, panoramic images, ultra-wide area images, or a combination thereof. In some examples, front-facing image sensor 1525A and/or rear-facing image sensor 1525B can be configured to capture images having a range between 45 degrees and 360 degrees. Certain input information received by watch body 1504 (e.g., user inputs, etc.) can be communicated to watch band 1512. Similarly, certain input information (e.g., acquired sensor data, neuromuscular sensor data, etc.) received by watch band 1512 can be communicated to watch body 1504.

Watch body 1504 and watch band 1512 can receive a charge using a variety of techniques. In some embodiments, watch body 1504 and watch band 1512 can use a wired charging assembly (e.g., power cords) to receive the charge. Alternatively, or in addition, watch body 1504 and/or watch band 1512 can be configured for wireless charging. For example, a portable charging device can be designed to mate with a portion of watch body 1504 and/or watch band 1512 and wirelessly deliver usable power to a battery of watch body 1504 and/or watch band 1512.

Watch body 1504 and watch band 1512 can have independent power and charging sources to enable each to operate independently. Watch body 1504 and watch band 1512 can also share power (e.g., one can charge the other) via power management IC 1532 in watch body 1504 and power management IC 1536 in watch band 1512. Power management IC 1532 and power management IC 1536 can share power over power and ground conductors and/or over wireless charging antennas.

Wrist-wearable device system 1500 can operate in conjunction with a health monitoring application that acquires biometric and activity information associated with the user. The health monitoring application can be designed to provide information to a user that is related to the user's health. For example, wrist-wearable device system 1500 can monitor a user's physical activity by acquiring data from IMU 1542 while simultaneously monitoring the user's heart rate via heart rate sensor 1558 and saturated blood oxygen levels via SpO2 sensor 1555. CPU 1526 can process the acquired data and display health related information to the user on touchscreen display 1513.

Wrist-wearable device system 1500 can detect when watch body 1504 and watch band 1512 are connected to one another (e.g., mechanically connected and/or electrically or magnetically connected) or detached from one another. For example, pin(s), power/ground connections 1561, wireless transceiver 1540, and/or wired communications 1527, can detect whether watch body 1504 and watch band 1512 are mechanically and/or electrically or magnetically connected to one another (e.g., detecting a disconnect between the one or more electrical contacts of power/ground connections 1561 and/or wired communications 1527). In some examples, when watch body 1504 and watch band 1512 are mechanically and/or electrically disconnected from one another (e.g., watch body 1512 has been detached from watch band 1512 as described with reference to FIGS. 15A-15B), watch body 1504 and/or watch band 1512 can operate with modified level of functionality (e.g., reduced functionality) as compared to when watch body 1504 and watch band 1512 are mechanically and/or electrically connected to one another. The modified level of functionality (e.g., switching from full functionality to reduced functionality and from reduced functionality to full functionality) can occur automatically (e.g., without user intervention) when wrist-wearable device system 1500 determines that watch body 1504 and watch band 1512 are mechanically and/or electrically disconnected from one another and connected to each other, respectively.

Modifying the level of functionality (e.g., reducing the functionality in watch body 1504 and/or watch band 1512) can reduce power consumption in battery 1528 and/or battery 1538. For example, any of the sensors (e.g., heart rate sensor 1558, EMG sensor 1546, SpO2 sensor 1555, etc.), processors (e.g., CPU 1526, microcontroller unit 1552, etc.), communications elements (e.g., NFC 1515, GPS 1516, LTE 1518, WiFi/Bluetooth 1520, etc.), or actuators (e.g., haptics 1522, 1549, etc.) can reduce functionality and/or power consumption (e.g., enter a sleep mode) when watch body 1504 and watch band 1512 are mechanically and/or electrically disconnected from one another. Watch body 1504 and watch band 1512 can return to full functionality when watch body 1504 and watch band 1512 are mechanically and/or electrically connected to one another. The level of functionality of each of the sensors, processors, actuators, and memory can be independently controlled.

As described above, wrist-wearable device system 1500 can detect when watch body 1504 and watch band 1512 are coupled to one another (e.g., mechanically connected and/or electrically connected) or decoupled from one another. In some examples, watch body 1504 can modify a level of functionality (e.g., activate and/or deactivate certain functions) based on whether watch body 1504 is coupled to watch band 1512. For example, CPU 1526 can execute instructions that detect when watch body 1504 and watch band 1512 are coupled to one another and activate front-facing image sensor 1525A. CPU 1526 can activate front-facing image sensor 1525A based on receiving user input (e.g., a user touch input from touchscreen display 1513, a user voice command from microphone 15-127, a user gesture recognition input from EMG sensor 1546, etc.).

When CPU 1526 detects that watch body 1504 and watch band 1512 are decoupled from one another, CPU 1526 can modify a level of functionality (e.g., activate and/or deactivate additional functions). For example, CPU 1526 can detect when watch body 1504 and watch band 1512 are decoupled from one another and activate rear-facing image sensor 1525B. CPU 1526 can activate rear-facing image sensor 1525B automatically (e.g., without user input) and/or based on receiving user input (e.g., a touch input, a voice input, an intention detection, etc.). Automatically activating the rear-facing image sensor 1525B can allow a user to take wide-angle images without having to provide user input to activate rear-facing image sensor 1525B.

In some examples, rear-facing image can be activated based on an image capture criterion (e.g., an image quality, an image resolution, etc.). For example, rear-facing image sensor 1525B can receive an image (e.g., a test image). CPU 1526 and/or rear-facing image sensor 1525B can analyze the received test image data and determine whether the test image data satisfies the image capture criterion (e.g., the image quality exceeds a threshold, the image resolution exceeds a threshold, etc.). Rear-facing image sensor 1525B can be activated when the test image data satisfies the image capture criterion. Additionally, or alternatively, rear-facing image sensor 1525B can be deactivated when the test image data fails to satisfy the image capture criterion.

In some examples, CPU 1526 can detect when watch body 1504 is coupled to watch band 1562 and deactivate rear-facing image sensor 1525B. CPU 1526 can deactivate rear-facing image sensor 1525B automatically (e.g., without user input) and/or based on receiving user input (e.g., a touch input, a voice input, an intention detection, etc.). Deactivating the rear-facing image sensor 1525B can automatically (e.g., without user input) reduce the power consumption of watch body 1504 and increase the battery charge time in watch body 1504. In some examples, wrist-wearable device system 1500 can include a coupling sensor 1507 that senses whether watch body 1504 is coupled to or decoupled from watch band 1512. Coupling sensor 1507 can be included in any of watch body 1504, watch band 1512, or watch band coupling mechanism 1560 of FIGS. 15A-15B. Coupling sensor 1507 (e.g., a proximity sensor) can include, without limitation, an inductive proximity sensor, a limit switch, an optical proximity sensor, a capacitive proximity sensor, a magnetic proximity sensor, an ultrasonic proximity sensor, or a combination thereof. CPU 1526 can detect when watch body 1504 is coupled to watch band 1512 or decoupled from watch band 1512 by reading the status of coupling sensor 1507.

FIG. 15C also illustrates a hand gesture interpretation logic 1575, for determining and classifying different hand gestures. These hand gesture can be in-air gesture, a surface-contact gesture, and or other gestures that can be detected and determined based on movements of a single hand (e.g., a one-handed gesture performed with a user's hand that is wearing/donning the wrist-wearable device). In-air means, in some embodiments, that the user hand does not contact a portion of the wrist-wearable device 100 (or other communicatively coupled device), in other words the gesture is performed in open air in 3D space and without contacting the wrist-wearable device 100. Surface-contact gestures (contacts at surfaces other than the wrist-wearable device 100) more generally are also contemplated in which neuromuscular signals sensed by one or more EMG sensors (or other types of data from other sensors, such as proximity sensors, time-of-flight sensors, sensors of an inertial measurement unit, etc.) can be used to detect a contact (or an intention to contact) a surface (e.g., a single or double finger tap on a table, on a user's leg, a couch, etc.). Thus, while the primary example herein is an in-air gesture, the disclosure is not limited to those in-air gestures, as other gestures that do not contact a wrist-wearable device are also contemplated, including the surface-contact gestures just described as well as spatial orientations of the wrist-wearable device 100. Further, hand gestures can be associated with one or more commands other than a camera-control gesture. The hand gestures, when detected and determined as a respective command by one or more processors (e.g., processors 1526; FIG. 15C), are configured to cause an action to be performed at a computing device, such as the wrist-wearable device 100, a head-worn wearable device, or other device described below in reference to FIG. 15. In other words, although FIGS. 1A-1D illustrate operations being performed at a wrist-wearable device 100 in response detected gestures by the wrist-wearable device 100, gestures detected by the wrist-wearable device 100 can cause other devices (e.g., headsets, smartphones, tablets, security cameras, etc.) to capture, provide, and/or present camera data.

Having thus described example wrist-wearable device, attention will now be turned to example head-wearable devices, such AR glasses and VR goggles.

Example Head-Wearable Devices

Figure 16A:
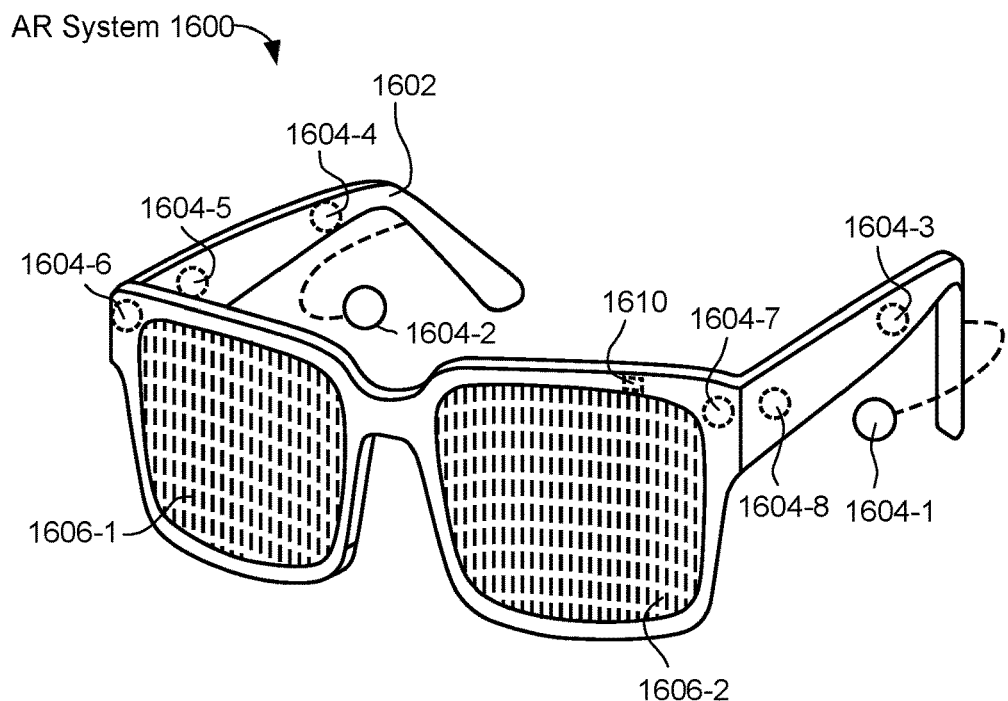
FIG. 16A shows example augmented-reality glasses (which can be used with some embodiments of the example computing systems), in accordance with some embodiments.

FIG. 16A shows an example AR system 1600 in accordance with some embodiments. In FIG. 16A, the AR system 1600 includes an eyewear device with a frame 1602 configured to hold a left display device 1606-1 and a right display device 1606-2 in front of a user's eyes. The display devices 1606-1 and 1606-2 may act together or independently to present an image or series of images to a user. While the AR system 1600 includes two displays, embodiments of this disclosure may be implemented in AR systems with a single near-eye display (NED) or more than two NEDs. In some embodiments, the AR system 1600 is an instance of any of the head-wearable devices described previously (e.g., the head-wearable device 1202).

In some embodiments, the AR system 1600 includes one or more sensors, such as the acoustic sensors 1604. For example, the acoustic sensors 1604 can generate measurement signals in response to motion of the AR system 1600 and may be located on substantially any portion of the frame 1602. Any one of the sensors may be a position sensor, an IMU, a depth camera assembly, or any combination thereof. In some embodiments, the AR system 1600 includes more or fewer sensors than are shown in FIG. 16A. In embodiments in which the sensors include an IMU, the IMU may generate calibration data based on measurement signals from the sensors. Examples of the sensors include, without limitation, accelerometers, gyroscopes, magnetometers, other suitable types of sensors that detect motion, sensors used for error correction of the IMU, or some combination thereof.

In some embodiments, the AR system 1600 includes a microphone array with a plurality of acoustic sensors 1604-1 through 1604-8, referred to collectively as the acoustic sensors 1604. The acoustic sensors 1604 may be transducers that detect air pressure variations induced by sound waves. In some embodiments, each acoustic sensor 1604 is configured to detect sound and convert the detected sound into an electronic format (e.g., an analog or digital format). In some embodiments, the microphone array includes ten acoustic sensors: 1604-1 and 1604-2 designed to be placed inside a corresponding ear of the user, acoustic sensors 1604-3, 1604-4, 1604-5, 1604-6, 1604-7, and 1604-8 positioned at various locations on the frame 1602, and acoustic sensors positioned on a corresponding neckband, where the neckband is an optional component of the system that is not present in certain embodiments of the artificial-reality systems discussed herein.

The configuration of the acoustic sensors 1604 of the microphone array may vary. While the AR system 1600 is shown in FIG. 16A having ten acoustic sensors 1604, the number of acoustic sensors 1604 may be more or fewer than ten. In some situations, using more acoustic sensors 1604 increases the amount of audio information collected and/or the sensitivity and accuracy of the audio information. In contrast, in some situations, using a lower number of acoustic sensors 1604 decreases the computing power required by a controller to process the collected audio information. In addition, the position of each acoustic sensor 1604 of the microphone array may vary. For example, the position of an acoustic sensor 1604 may include a defined position on the user, a defined coordinate on the frame 1602, an orientation associated with each acoustic sensor, or some combination thereof.

The acoustic sensors 1604-1 and 1604-2 may be positioned on different parts of the user's ear. In some embodiments, there are additional acoustic sensors on or surrounding the ear in addition to acoustic sensors 1604 inside the ear canal. In some situations, having an acoustic sensor positioned next to an ear canal of a user enables the microphone array to collect information on how sounds arrive at the ear canal. By positioning at least two of the acoustic sensors 1604 on either side of a user's head (e.g., as binaural microphones), the AR device 1600 is able to simulate binaural hearing and capture a 3D stereo sound field around a user's head. In some embodiments, the acoustic sensors 1604-1 and 1604-2 are connected to the AR system 1600 via a wired connection, and in other embodiments, the acoustic sensors 1604-1 and 1604-2 are connected to the AR system 1600 via a wireless connection (e.g., a Bluetooth connection). In some embodiments, the AR system 1600 does not include the acoustic sensors 1604-1 and 1604-2.

The acoustic sensors 1604 on the frame 1602 may be positioned along the length of the temples, across the bridge of the nose, above or below the display devices 1606, or in some combination thereof. The acoustic sensors 1604 may be oriented such that the microphone array is able to detect sounds in a wide range of directions surrounding the user (e.g., the user 101 in FIGS. 12A-14B) that is wearing the AR system 1600. In some embodiments, a calibration process is performed during manufacturing of the AR system 1600 to determine relative positioning of each acoustic sensor 1604 in the microphone array.

In some embodiments, the eyewear device further includes, or is communicatively coupled to, an external device (e.g., a paired device), such as the optional neckband discussed above. In some embodiments, the optional neckband is coupled to the eyewear device via one or more connectors. The connectors may be wired or wireless connectors and may include electrical and/or non-electrical (e.g., structural) components. In some embodiments, the eyewear device and the neckband operate independently without any wired or wireless connection between them. In some embodiments, the components of the eyewear device and the neckband are located on one or more additional peripheral devices paired with the eyewear device, the neckband, or some combination thereof. Furthermore, the neckband is intended to represent any suitable type or form of paired device. Thus, the following discussion of neckband may also apply to various other paired devices, such as smart watches, smart phones, wrist bands, other wearable devices, hand-held controllers, tablet computers, or laptop computers.

In some situations, pairing external devices, such as the optional neckband, with the AR eyewear device enables the AR eyewear device to achieve the form factor of a pair of glasses while still providing sufficient battery and computation power for expanded capabilities. Some, or all, of the battery power, computational resources, and/or additional features of the AR system 1600 may be provided by a paired device or shared between a paired device and an eyewear device, thus reducing the weight, heat profile, and form factor of the eyewear device overall while still retaining desired functionality. For example, the neckband may allow components that would otherwise be included on an eyewear device to be included in the neckband thereby shifting a weight load from a user's head to a user's shoulders. In some embodiments, the neckband has a larger surface area over which to diffuse and disperse heat to the ambient environment. Thus, the neckband may allow for greater battery and computation capacity than might otherwise have been possible on a stand-alone eyewear device. Because weight carried in the neckband may be less invasive to a user than weight carried in the eyewear device, a user may tolerate wearing a lighter eyewear device and carrying or wearing the paired device for greater lengths of time than the user would tolerate wearing a heavy, stand-alone eyewear device, thereby enabling an artificial-reality environment to be incorporated more fully into a user's day-to-day activities.

In some embodiments, the optional neckband is communicatively coupled with the eyewear device and/or to other devices (e.g., the wrist-wearable device 100). The other devices may provide certain functions (e.g., tracking, localizing, depth mapping, processing, storage, etc.) to the AR system 1600. In some embodiments, the neckband includes a controller and a power source. In some embodiments, the acoustic sensors of the neckband are configured to detect sound and convert the detected sound into an electronic format (analog or digital).

The controller of the neckband processes information generated by the sensors on the neckband and/or the AR system 1600. For example, the controller may process information from the acoustic sensors 1604. For each detected sound, the controller may perform a direction of arrival (DOA) estimation to estimate a direction from which the detected sound arrived at the microphone array. As the microphone array detects sounds, the controller may populate an audio data set with the information. In embodiments in which the AR system 1600 includes an IMU, the controller 1610 may compute all inertial and spatial calculations from the IMU located on the eyewear device. The connector may convey information between the eyewear device and the neckband and between the eyewear device and the controller. The information may be in the form of optical data, electrical data, wireless data, or any other transmittable data form. Moving the processing of information generated by the eyewear device to the neckband may reduce weight and heat in the eyewear device, making it more comfortable and safer for a user.

In some embodiments, the power source in the neckband provides power to the eyewear device and the neckband. The power source may include, without limitation, lithium-ion batteries, lithium-polymer batteries, primary lithium batteries, alkaline batteries, or any other form of power storage. In some embodiments, the power source is a wired power source.

As noted, some artificial-reality systems may, instead of blending an artificial reality with actual reality, substantially replace one or more of a user's sensory perceptions of the real world with a virtual experience. One example of this type of system is a head-worn display system, such as the VR system 1650 in FIG. 16B, which mostly or completely covers a user's field of view.

Figure 16B:
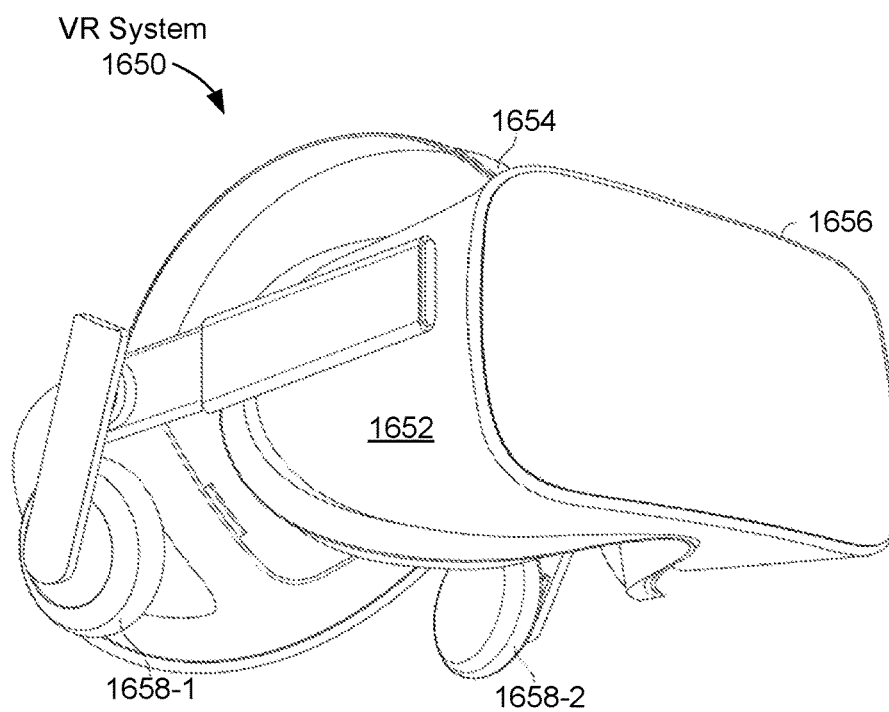
FIG. 16B shows example virtual-reality glasses (which can be used with some embodiments of the example computing systems), in accordance with some embodiments.

FIG. 16B shows a VR system 1650 (e.g., also referred to herein as VR goggles or VR headset) in accordance with some embodiments. The VR system 1650 includes a head-mounted display (HMD) 1652 (e.g., any of the head-wearable devices discussed herein, including the head-wearable device 1202 shown in FIGS. 12A-14A). The HMD 1652 includes a front body 1656 and a frame 1654 (e.g., a strap or band) shaped to fit around a user's head. In some embodiments, the HMD 1652 includes output audio transducers 1658-1 and 1658-2, as shown in FIG. 6B (e.g., transducers 1782-1). In some embodiments, the front body 1656 and/or the frame 1654 includes one or more electronic elements, including one or more electronic displays, one or more IMUs, one or more tracking emitters or detectors, and/or any other suitable device or sensor for creating an artificial-reality experience. In some embodiments, the VR system 1650 is an instance of any of the head-wearable devices described previously (e.g., the head-wearable device 1202 in FIGS. 12A-14B).

Artificial-reality systems may include a variety of types of visual feedback mechanisms. For example, display devices in the AR system 1600 and/or the VR system 1650 may include one or more liquid-crystal displays (LCDs), light emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a refractive error associated with the user's vision. Some artificial-reality systems also include optical subsystems having one or more lenses (e.g., conventional concave or convex lenses, Fresnel lenses, or adjustable liquid lenses) through which a user may view a display screen.

In addition to or instead of using display screens, some artificial-reality systems include one or more projection systems. For example, display devices in the AR system 1600 and/or the VR system 1650 may include micro-LED projectors that project light (e.g., using a waveguide) into display devices, such as clear combiner lenses that allow ambient light to pass through. The display devices may refract the projected light toward a user's pupil and may enable a user to simultaneously view both artificial-reality content and the real world. Artificial-reality systems may also be configured with any other suitable type or form of image projection system.

Artificial-reality systems may also include various types of computer vision components and subsystems. For example, the AR system 1600 and/or the VR system 1650 can include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

In some embodiments, the AR system 1600 and/or the VR system 1650 can include haptic (tactile) feedback systems, which may be incorporated into headwear, gloves, body suits, handheld controllers, environmental devices (e.g., chairs or floormats), and/or any other type of device or system, such as the wearable devices discussed herein. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback may be implemented using motors, piezoelectric actuators, fluidic systems, and/or a variety of other types of feedback mechanisms. The haptic feedback systems may be implemented independently of other artificial-reality devices, within other artificial-reality devices, and/or in conjunction with other artificial-reality devices.

Having thus described example sequences and devices used by a user to perform the example sequences, attention will now be directed to system-level depictions of hardware and software on which (or with which) the methods can be implemented.

Example System-Level Block Diagrams

Figure 17B:
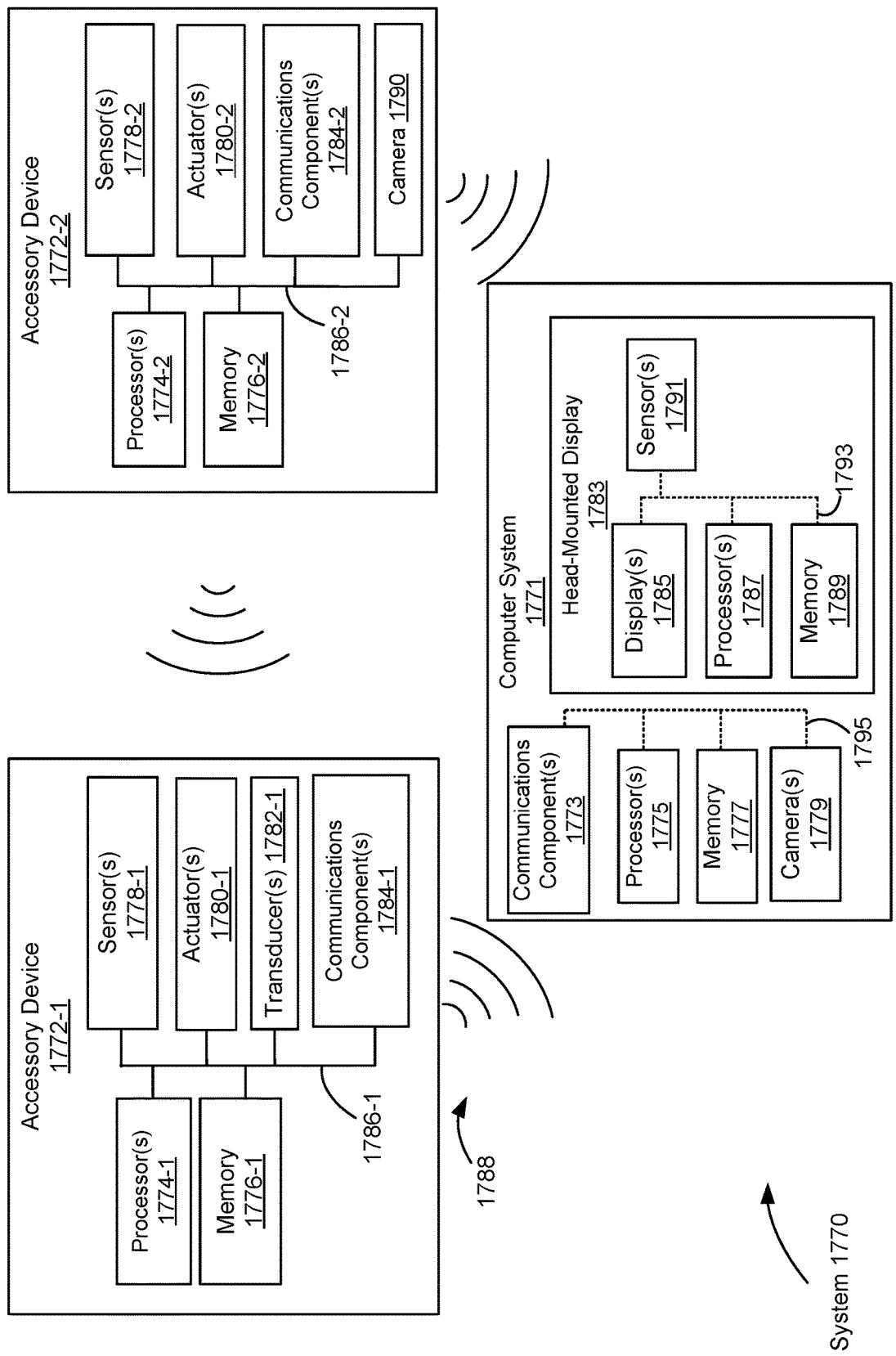

FIGS. 17A-17B are block diagrams illustrating example components used with artificial reality systems in accordance with some embodiments. FIG. 17A is a block diagram illustrating a computing system 1700 in accordance with some embodiments. While some example features are illustrated, various other features have not been illustrated for the sake of brevity and so as not to obscure pertinent aspects of the example embodiments disclosed herein. To that end, as a non-limiting example, the system 1700 includes one or more wearable devices 1702, which can be used in conjunction with one or more computing devices 1750. In some embodiments, the computing system 1700 provides the functionality of an artificial-reality device: a virtual-reality (VR) device, an augmented-reality (AR) device, a mixed-reality device, hybrid-reality device, or a combination thereof. In some embodiments, the system 1700 provides the functionality of a user interface and/or one or more user applications (e.g., games, word processors, messaging applications, calendars, clocks, etc.). In some embodiments, the computing system 1700 is an instance of any of the computing systems described above.

In some embodiments, the computing system 1700 provides the functionality to control or provide commands to the one or more computing devices 1750 based on a wearable device 1702 determining motor actions or intended motor actions of the user. The relative locations of such motor actions or intended motions (e.g., gestures) can be detected using, for example, IMU sensors 1742, EMG sensors 1744, in addition to other sensors at the wearable device 1702. A motor action is an intended motor action when before the user performs the motor action or before the user completes the motor action, the detected neuromuscular signals travelling through the neuromuscular pathways can be determined to be the motor action. Motor actions can be detected based on the detected neuromuscular signals but can additionally (using a fusion of the various sensor inputs), or alternatively, be detected using other types of sensors (such as cameras focused on viewing hand movements and/or using data from an IMU sensor that can detect characteristic vibration sequences or other data types to correspond to in-air hand gestures). The one or more computing devices 1750 include one or more wearable devices (e.g., a HMD), smartphone, tablet, smart watches, laptops, computer systems, augmented reality systems, robots, vehicles, virtual avatars, user interfaces, the wearable device 1702, and/or other electronic devices and/or control interfaces.

The wearable device 1702 includes a wearable structure worn by the user. In some embodiments, the wearable device 1702 is an instance of any of the wrist-wearable devices described previously (e.g., the wrist-wearable device 100) or any of the head-wearable devices described previously (e.g., the head-wearable device 1202 in FIGS. 12A-14A). In some embodiments, the wearable device 1702 collects information about a portion of the user's body (e.g., the user's hand(s) and finger(s) position(s) and orientation(s) relative to, for example, a viewing range of the user (e.g., the viewing range 1203 in FIG. 12A, or a physical surface) that can be used as input to perform one or more commands at the computing device 1750. In some embodiments, the collected information about a portion of the user's body (e.g., the user's hand(s) and finger(s) position(s) and orientation(s) relative to a viewing range and/or a physical surface) can be used as input to perform one or more commands at the computing device 1750 (e.g., selecting content to present on the electronic display 1706 of the wearable device 1702 or controlling one or more applications 1730 locally stored on the wearable device 1702). The information collected about the portion of the user's body can include neuromuscular signals that can be used by the one or more processors 1704 of the wearable device 1702 to determine a motor action that the user (e.g., the user 101 in FIGS. 12A-14B) intends to perform with their hand and/or fingers. The information collected about the user's body can also include information about surface features of one or more portions of the user's body.

In the illustrated embodiment, the wearable device 1702 includes the one or more processors 1704, memory 1720, sensors 1740, including the IMU sensors 1742 and the EMG sensors 1744, an electronic display 1706, and a communication interface 1708. In some embodiments, the memory 1720 includes one or more of interface operations 1722 (e.g., a first set of in-air gesture operations 1724, a second set of user-interface navigation operations 1726), and applications 1730. The wearable device 1702 can include additional components that are not shown in FIG. 17A, such as a power source (e.g., an integrated battery, a connection to an external power source), a haptic feedback generator, etc. In some embodiments, one or more of the components shown in FIG. 17A are housed within a conductive hemispherical-like shape of the wearable device 1702.

In some embodiments, sensors 1740 include one or more hardware devices that contact the user's skin (e.g., the wrist of the user 101). In some embodiments, the sensors 1740 detect neuromuscular signals from neuromuscular pathways within and on the wrist of a user (the sensors can additionally, or alternatively, be coupled with the head-wearable devices discussed herein), and the sensors 1740 can further detect a proximity to a physical surface of the wearable device 1702 based on time-of-flight sensing data. In some embodiments, the sensors 1740 are configured to detect different digit movements, wrist movements, arm movements, index finger movements, middle finger movements, ring finger movements, little finger movements, thumb movements, hand movements, etc. from the different neuromuscular signals detected from the user's skin. In some embodiments, the sensors 1740 are used in pairs and/or other combinations to form respective channels and/or planes for detecting neuromuscular signals and/or gestures relative to a physical surface, where each channel is a pair of sensors.

In some embodiments, the one or more processors 1704 are configured to receive the data detected by the sensors 1740 and determine whether a hand of a user is in a first spatial orientation, or a second spatial orientation (e.g., the sensors 1214 in FIGS. 12A-14B can detect whether the hand of the user 101 is in the first spatial orientation or the second spatial orientation). The input commands when provided to a computing device 1750 cause the computing device to perform an action (e.g., as described in detail above, various in-air hand gestures can cause performance of various operations that update the display of a user interface at the head-wearable device). Alternatively, in some embodiments, the one or more input commands are used to cause the wearable device 1702 to perform one or more actions locally (e.g., present a display on the electronic display 1706, operate one or more applications 1730, cause operations to be performed at another electronic device, etc.). For example, the wearable device 1702 can be a wrist-wearable device (e.g., a smartwatch) and the one or more input commands can be used to cause the smartwatch to perform one or more actions.

The one or more applications 1730 stored in the memory 1720 can be productivity-based applications (e.g., calendars, organizers, word processors), social applications (e.g., social platforms), games, etc. In some embodiments, the one or more applications 1730 are presented to the user via the electronic display 1706. In some embodiments, the one or more applications 1730 are used to facilitate the transmission of information (e.g., to another application running on a computing device 1750). In some embodiments, the user can provide one or more input commands based on the determined motor action to the applications 1730 operating on the wearable device 1702 to cause the applications 1730 to perform the input commands. For example, the user can perform gestures that cause applications 1730, including social media applications 1732 and a camera application 1734 to perform operations based on user gestures that correspond to user-interface navigation operations 1726.

The communication interface 1708 enables input and output to the computing device 1750. In some embodiments, the communication interface 1708 is a single communication channel, such as USB. In other embodiments, the communication interface 1708 includes several distinct communication channels operating together or independently. For example, the communication interface 1708 can include separate communication channels for sending input commands to the computing device 1750 to cause the computing device 1750 to perform one or more actions. In some embodiments, data from the sensors 1740 is sent to the computing device 1750, which then interprets the appropriate input response based on the received data. The one or more communication channels of the communication interface 1708 can be implemented as wired or wireless connections. In some embodiments, the communication interface 1708 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol, including communication protocols not yet developed as of the filing date of this document.

In some embodiments, the computing device 1750 presents media to a user. Examples of media presented by the computing device 1750 include images, video, audio, or some combination thereof. Additional examples of media include executed virtual-reality applications and/or augmented-reality applications to process input data from the sensors 1740 on the wearable device 1702. In some embodiments, the media content is based on received information from one or more applications 1757 (e.g., productivity applications, social applications, games, etc.). The computing device 1750 includes an electronic display 1752 for presenting media content to the user. In various embodiments, the electronic display 1752 comprises a single electronic display or multiple electronic displays (e.g., one display for each eye of a user). The computing device 1750 includes a communication interface 1754 that enables input and output to other devices in the system 1700. The communication interface 1754 is similar to the communication interface 1708 described above.

In some embodiments, the computing device 1750 receives instructions (or commands) from the wearable device 1702 (e.g., a request to process sensor data related to the performance of a surface gesture, an in-air gesture, and/or a location-agnostic gesture). In response to receiving the instructions, the computing device 1750 performs one or more actions associated with the instructions (e.g., perform the one or more input commands in an augmented-reality (AR) or virtual-reality (VR) environment). Alternatively, in some embodiments, the computing device 1750 receives instructions from external device communicatively coupled to the wearable device 1702, and in response to receiving the instructions, performs one or more actions associated with the instructions. In some embodiments, the computing device 1750 receives instructions from the wearable device 1702, and in response to receiving the instructions, provides the instruction to an external device communicatively coupled to the computing device 1750 which performs one or more actions in accordance with the instructions. Although not shown, in the embodiments that include a distinct external device, the external device can be connected to the wearable device 1702, and/or the computing device 1750 via a wired or wireless connection. The external device can be remote game consoles, additional displays, additional head-mounted displays, and/or any other additional electronic devices that can be could to be coupled in conjunction with the wearable device 1702 and/or the computing device 1750.

In some embodiments, the computing device 1750 provides information to the wearable device 1702, which in turn causes the wearable device to present the information to the user. The information provided by the computing device 1750 to the wearable device 1702 can include media content (which can be displayed on the electronic display 1706 of the wearable device 1702), organizational data (e.g., calendars, phone numbers, invitation, directions), files (such as word processing documents, spreadsheets, or other documents that can be worked on locally from the wearable device 1702).

In some embodiments, the computing device 1750 is implemented as an integrated system-on-a-chip, a microcontroller, a desktop or laptop computer, a server computer, a tablet, or a smart phone or other mobile device. Thus, the computing device 1750 includes components common to typical computing devices, such as the processor(s) 1758, random access memory, a storage device, a network interface, an input/output (I/O) interface, and the like. The processor can be or include one or more microprocessors or application specific integrated circuits (ASICs). The memory 1756 can be or include RAM, ROM, DRAM, SRAM and MRAM, and can include firmware, such as static data or fixed instructions, BIOS, system functions, configuration data, and other routines used during the operation of the computing device and the processor. The memory 1756 also provides a storage area for data and instructions associated with applications and data handled by the processor.

The storage device provides non-volatile, bulk, or long-term storage of data or instructions in the computing device. The storage device can take the form of a magnetic or solid-state disk, tape, CD, DVD, or other reasonably high capacity addressable or serial storage medium. Multiple storage devices can be provided or available to the computing device. Some of these storage devices can be external to the computing device, such as network storage or cloud-based storage. The network interface includes an interface to a network and can be implemented as either wired or wireless interface. The I/O interface interfaces with the processor to peripherals (not shown) such as, for example and depending upon the computing device, sensors, displays, cameras, color sensors, microphones, keyboards, and USB devices.

In the example shown in FIG. 17A, the computing device 1750 further includes applications 1757. In some embodiments, the applications 1757 are implemented as software modules that are stored on the storage device and executed by the processor 1758. Some embodiments of the computing device 1750 include additional or different components than those described in conjunction with FIG. 17A. Similarly, the functions further described below can be distributed among components of the computing device 1750 in a different manner than is described here.

Each application 1757 is a group of instructions that, when executed by a processor, generates specific content for presentation to the user. For example, an application 1757 can include virtual-reality application that generates virtual-reality content (such as a virtual-reality environment) and that further generate virtual-reality content in response to inputs received from the wearable devices 1702 (based on determined user motor actions). Examples of virtual-reality applications include gaming applications, conferencing applications, and video playback applications. Additional examples of applications 1757 can include productivity-based applications (e.g., calendars, organizers, word processors, etc.), social-based applications (e.g., social media platforms, dating platforms, etc.), entertainment (e.g., shows, games, movies, etc.), and travel (e.g., ride share applications, hotel applications, airline applications, etc.). In some embodiments, the applications 1757 include React.js, React VR, and/or or React Native functions associated with performing operations to update display properties at the electronic display 1752. In some embodiments, user interface elements are pre-loaded using functions from React.js and/or React VR, and/or are rendered server-side.

In some embodiments, the computing device 1750 allows the applications 1757 to operate in conjunction with the wearable device 1702. In some embodiments, the computing device 1750 receives information from the sensors 1740 of the wearable device 1702 and provides the information to an application 1757. Based on the received information, the application 1757 determines media content to provide to the computing device 1750 (or the wearable device 1702) for presentation to the user via the electronic display 1752 and/or a type of haptic events. For example, if the computing device 1750 receives information from the sensors 1740 on the wearable device 1702 indicating that the user has performed an action (e.g., a virtual touch gesture, a surface touch gesture, a "thumbs-up" gesture, etc.), the application 1757 generates content for the computing device 1750 (or the wearable device 1702) to present, the content mirroring the user's instructions based on determined motor actions by the wearable device 1702. Similarly, in some embodiments, the applications 1757 receive information directly from the sensors 1740 on the wearable device 1702 (e.g., applications locally saved to the wearable device 1702) and provide media content to the computing device 1750 for presentation to the user based on the information (e.g., determined motor actions by the wearable device 1702).

FIG. 17B is a block diagram illustrating a computing system 1770 in accordance with some embodiments. While some example features are illustrated, various other features have not been illustrated for the sake of brevity and so as not to obscure pertinent aspects of the example embodiments disclosed herein. To that end, as a non-limiting example, the computing system 1770 includes accessory devices 1772-1 and 1772-2, which are used in conjunction with an accessory device 1772 (e.g., a computing device 1750). In some embodiments, the computing system 1770 is an instance of any of the computing systems described herein, including the computing system 1200, and the computing system that performs the method 2100.

An example accessory device 1772 (two example embodiments of which are represented by 1772-1 and 1772-2 in FIG. 17B) includes, for example, one or more processors/cores 1774 (referred to henceforth as "processors"), a memory 1776, one or more actuators 1780, one or more communications components 1784, and/or one or more sensors 1778. In some embodiments, these components are interconnected by way of a communications bus 1786. References to these components of the accessory device 1772 cover embodiments in which one or more of these components (and combinations thereof) are included. In some embodiments, the one or more sensors 1778 and the one or more transducers 1782 are the same components. In some embodiments, the example accessory device 1772 includes one or more cameras 1790. In some embodiments (not shown), accessory device 1772 includes a wearable structure. In some embodiments the accessory device and the wearable structure are integrally formed. In some embodiments, the accessory device and the wearable structure are distinct structures, yet part of the computing system 1770. In some embodiments, one or more of the accessory devices 1772 is any of the wrist-wearable devices described previously (e.g., the wrist-wearable device 100) or any of the head-wearable devices described previously (e.g., the head-wearable device 1202) in FIGS. 12A-14A. In some embodiments, there are additional accessory devices, such as hand-held accessory devices that allow for better detection of user gestures and/or a physical surface.

For example, the accessory device 1772-1 can be a ring that is used in conjunction with a wearable structure to utilize data measurements obtained by sensor 1778-1 to adjust a fit of the wearable structure. In another example, the accessory device 1772-1 and accessory device 1772-2 are distinct wristbands to be worn on each wrist of the user.

In some embodiments, a single processor 1774 (e.g., processor 1774-1 of the accessory device 1772-1) executes software modules for controlling multiple accessory devices 1772 (e.g., accessory devices 1772-1 to 1772-n). In some embodiments, a single accessory device 1772 (e.g., accessory device 1772-2) includes multiple processors 1774 (e.g., processors 1774-2), such as one or more actuator processors, one or more communications component processors, one or more sensor processors, and/or one or more transducer processors. In some embodiments, the one or more actuator processors are configured to adjust a fit of a wearable structure. In some embodiments, the one or more communications processors are configured to control communications transmitted by communications component 1784 and/or receive communications by way of communications component 1784. In some embodiments, the one or more sensor processors are configured to control operation of sensor 1778 and/or receive output from sensors 1778. In some embodiments, the one or more transducer processors are configured to control operation of transducers 1782.

In some embodiments, the communications component 1784 of the accessory device 1772 includes a communications component antenna for communicating with the computer system 1771. In some embodiments, the communications component 1773 includes a complementary communications component antenna that communicates with the communications component 1784. In some embodiments, the data contained within the communication signals alerts the computer system 1771 that the accessory device 1772 is ready for use. In some embodiments, the computer system 1771 sends instructions to the accessory device 1772, and in response to receiving the instructions, the accessory device 1772 instructs a transmit and receive electrode to provide coupling information between the receive electrode and the user.

In some embodiments, the one or more actuators 1780 are used to adjust a fit of the wearable structure on a user's appendage. In some embodiments, the one or more actuators 1780 are also used to provide haptic feedback to the user. For example, each actuator 1780 can apply vibration stimulations, pressure stimulations, shear stimulations, or some combination thereof to the user. In some embodiments, the one or more actuators 1780 are hydraulic, pneumatic, electric, and/or mechanical actuators.

In some embodiments, the one or more transducers 1782 are used to transmit and receive one or more signals 1788. In some embodiments, the one or more sensors 1778 are used to transmit and receive one or more signals 1788. In some embodiments, the one or more sensors 1778 and the one or more transducers 1782 are part of a same component that is used to transmit and receive one or more signals 1788. The signals 1788 can be electromagnetic waves, mechanical waves, electrical signals, or any wave/signal capable of being transmitted through a medium. As used herein, a medium includes the wearer's skin, flesh, bone, blood vessels, or some combination thereof.

In addition to transmitting signals (e.g., electrical signals), the accessory device 1772 is also configured to receive (e.g., detect, sense) signals transmitted by itself or by another accessory device 1772. To illustrate, an accessory device 1772-1 can transmit a plurality of signals through a medium, such as a user's appendage, and a second accessory device 1772-2 can receive the signals transmitted by the accessory device 1772-1 through the medium. Furthermore, an accessory device 1772 receiving transmitted signals can use the received signals to determine whether the accessory device is in contact with a user.

In some embodiments, the one or more transducers 1782 of the accessory device 1772-1 include one or more transducers configured to generate and/or receive signals. In some embodiments, integrated circuits (not shown) of the accessory device 1772-1, such as a controller circuit and/or signal generator, control the behavior of the transducers 1782. In some embodiments, the transmit electrode and/or the receive electrode are part of the one or more transducers 1782 of the accessory device 1722-1. Alternatively, the transmit electrode and/or the receive electrode can be part of the one or more sensors 1778-1 of the accessory device 1772-1, or the transmit electrode can be part of a transducer 1782 while the receive electrode can be part of a sensor 1778-1 (or vice versa).

In some embodiments, the sensors 1778 include one or more time-of-flight sensors, and one or more EMG sensors. In some embodiments, the sensors 1778 include one or more of the transmit electrode and the receive electrode for obtaining coupling information. In some embodiments, the sensors 1778 includes one or more neuromuscular sensors. In some embodiments, the neuromuscular sensors include one or more surface electromyography (sEMG) sensors, mechanomyography sensors, and/or sonomyography sensors. Additional non-limiting examples of the sensors 1778 (and the sensors 1791) include, e.g., infrared, pyroelectric, ultrasonic, microphone, laser, optical, Doppler, gyro, accelerometer, resonant LC sensors, capacitive sensors, acoustic sensors, and/or inductive sensors. In some embodiments, the sensors 1778 (and the sensors 1791) are configured to gather additional data about the user (e.g., an impedance of the user's body). Examples of sensor data output by these sensors include, for example, body temperature data, infrared range-finder data, motion data, activity recognition data, silhouette detection and recognition data, gesture data, heart rate data, and other wearable device data (e.g., biometric readings and output, accelerometer data).

The computer system 1771 is a computing device that executes artificial-reality applications (e.g., virtual-reality applications, augmented-reality applications, etc.) to process input data from the sensors 1791 on the HMD 1783 and the sensors 1778 on the accessory device 1772. The computer system 1771 provides output data to at least (i) the display 1785 on the HMD 1783 and (ii) the accessory device(s) 1772. In some embodiments, the HMD 1783 is an instance of the head-wearable device 1202 and/or the AR system 1600. In some embodiments, these components are interconnected by way of a communications bus 1793.

The computer system 1771 includes one or more processors/cores 1775, memory 1777, one or more communications components 1773, and/or one or more cameras 1779. In some embodiments, these components are interconnected by way of a communications bus 1795. References to these components of the computer system 1771 cover embodiments in which one or more of these components (and combinations thereof) are included.

The computer system 1771 can be any suitable computer device, such as a laptop computer, a tablet device, a notebook, a personal digital assistant, a mobile phone, a smart phone, an artificial-reality console, or device (e.g., a virtual-reality device, an augmented-reality device, or the like), a gaming device, a computer server, or any other computing device. The computer system 1771 is sometimes called a host or a host system. In some embodiments, the computer system 1771 includes other user interface components such as a keyboard, a touch-screen display, a mouse, a trackpad, and/or any number of supplemental I/O devices to add functionality to computer system 1771.

In some embodiments, one or more cameras 1779 of the computer system 1771 are used to facilitate the artificial-reality experience. In some embodiments, the computer system 1771 provides images captured by the one or more cameras 1779 to the display 1785 of the HMD 1783, and the display 1785 in turn displays the provided images. In some embodiments, the processors 1787 of the HMD 1783 process the provided images. It is noted that in some embodiments, one or more of the cameras 1779 are part of the HMD 1783. In some embodiments, data from the cameras 1779 of the HMD 1783 can be combined with data from the time-of-flight sensors at the wearable device 1702 (which can be a wrist-wearable device, such as the wrist-wearable device 100 shown in FIGS. 12A-14B according to some embodiments) for more accurate gesture detection. The HMD 1783 can included memory 1789. In some embodiments, the memory 1789 can include instructions, which, when executed by the one or more processors/cores 1775, cause operations to be performed at the HMD 1783.

The HMD 1783 presents media to a user. Examples of media presented by the HMD 1783 include images, video, audio, or some combination thereof. In some embodiments, audio is presented via an external device (e.g., speakers and/or headphones) that receives audio information from the HMD 1783, the computer system 1771, or both, and presents audio data based on the audio information. The displayed images can be in virtual reality, augmented reality, or mixed reality. The display 1785 displays images to the user in accordance with data received from the computer system 1771. In various embodiments, the display 1785 comprises a single electronic display or multiple electronic displays (e.g., one display for each eye of a user). In some embodiments, there is no display associated with the artificial-reality environment, and the artificial-reality environment is presented by other means.

The sensors 1791 include one or more hardware devices that detect spatial and motion information about the HMD 1783. In some embodiments, the sensors 1791 includes one or more neuromuscular sensors. In some embodiments, the neuromuscular sensors include one or more sEMG sensors, mechanomyography sensors, and/or sonomyography sensors. Spatial and motion information can include information about the position, orientation, velocity, rotation, and acceleration of the HMD 1783. For example, the sensors 1791 can include one or more IMU sensors that detect rotation of the user's head while the user is wearing the HMD 1783. In some embodiments, the sensors 1791 include one or more cameras positioned on the HMD 1783. In some embodiments, the HMD 1783 includes one or more sensors 1791. In some embodiments, one or more of the sensors 1791 are part of the computer system 1771.

Figure 18:
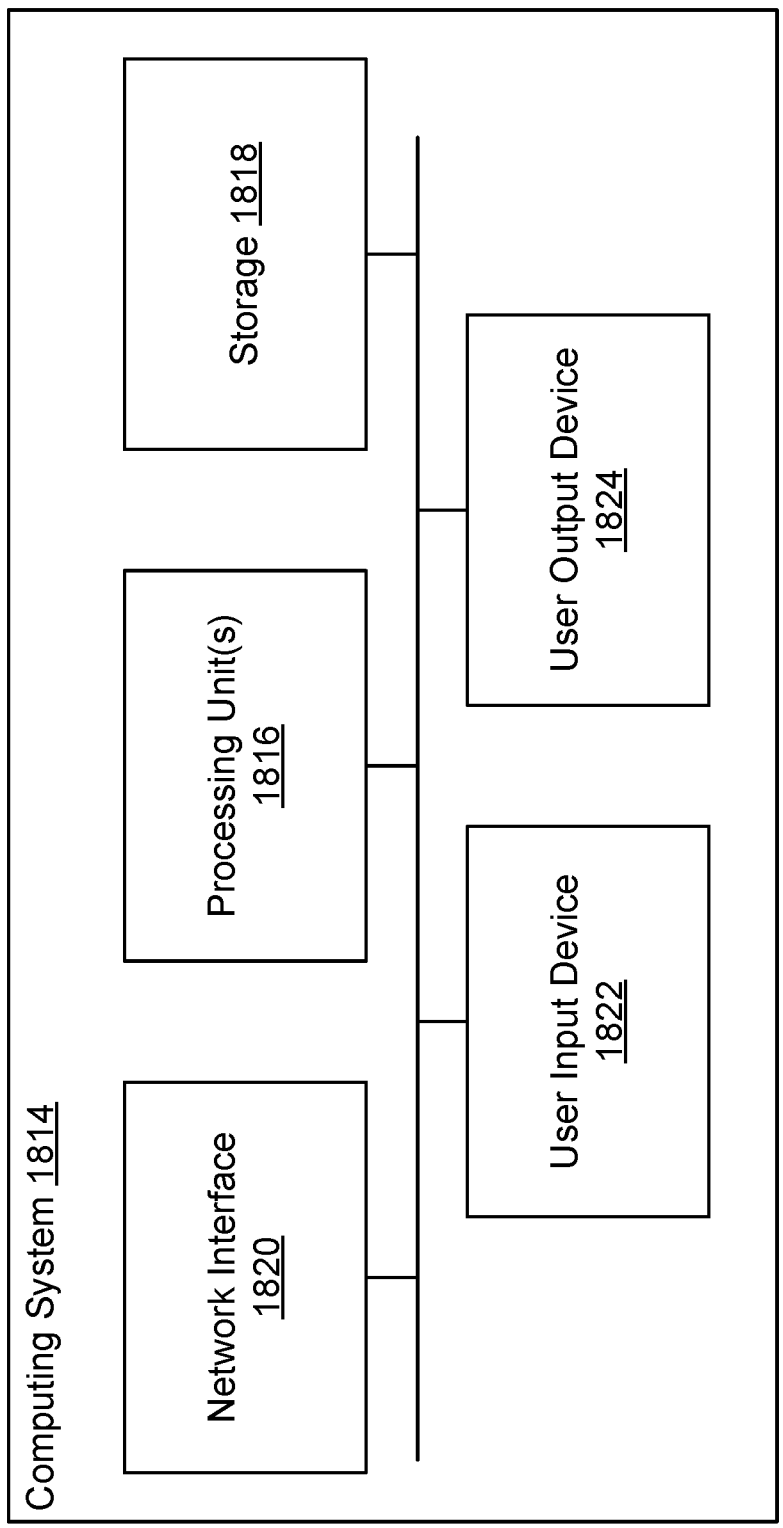
FIG. 18 shows a block diagram of a representative computing system capable of implementing the methods described in the present disclosure, in accordance with some embodiments.
Figure 19:
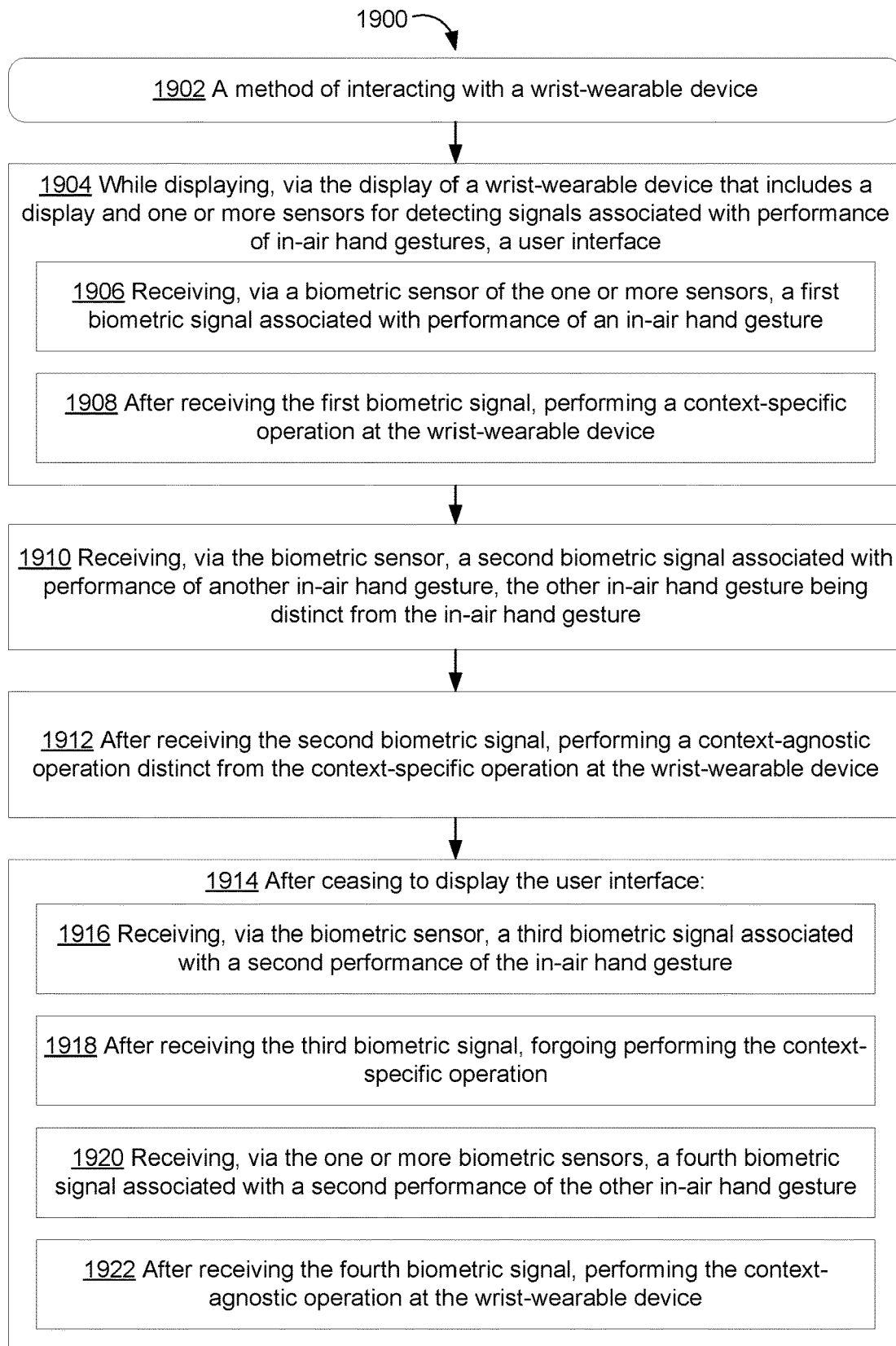
FIG. 19 is a flow diagram illustrating a method for interacting with a wrist-wearable device, in accordance with some embodiments.
Figure 20:
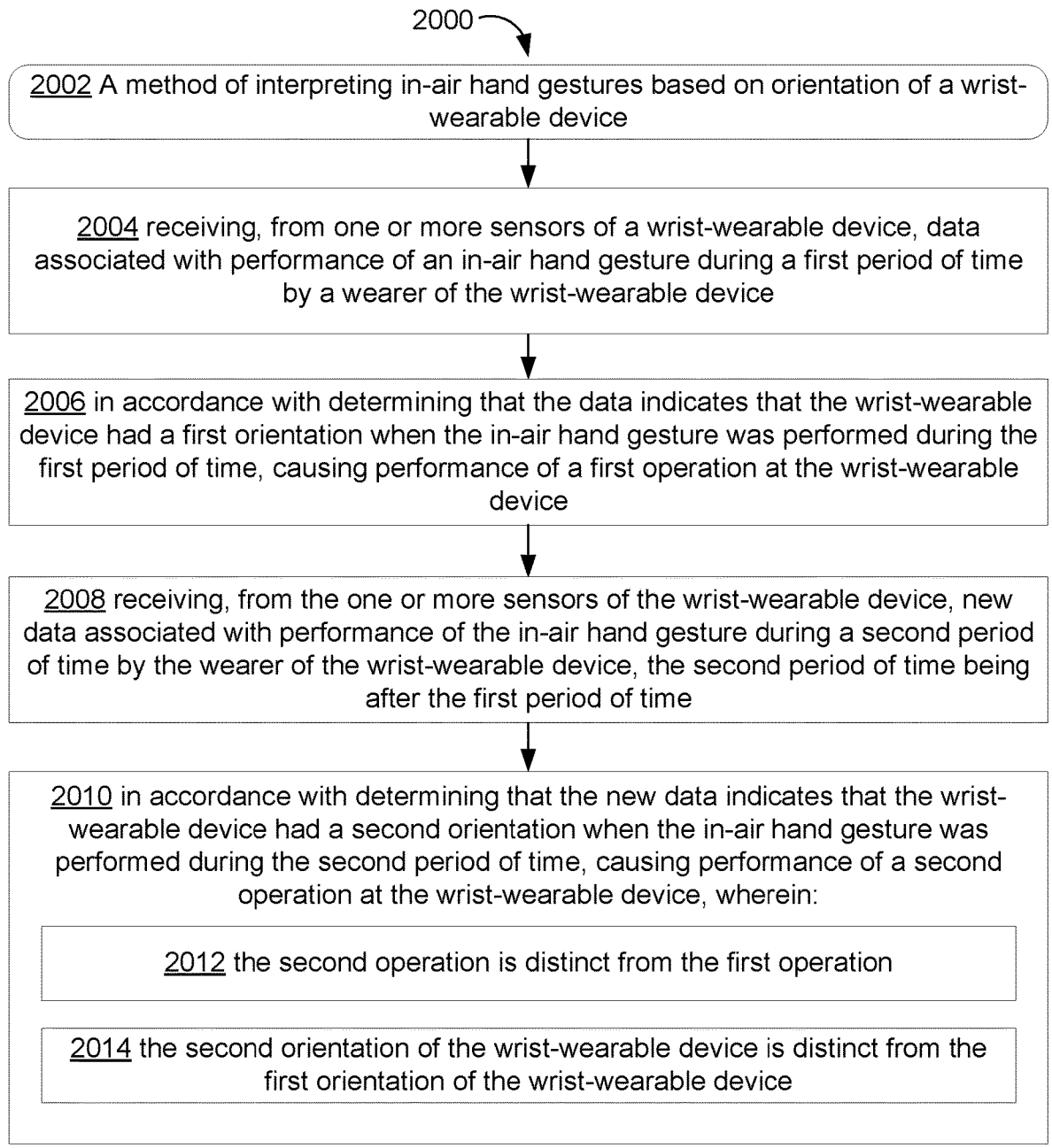
FIG. 20 is a flow diagram illustrating a method for interpreting in-air hand gestures based on orientation of a wrist-wearable device, in accordance with some embodiments.

FIG. 18 shows a block diagram of a representative computing system capable of implementing the methods described in the present disclosure, in accordance with some embodiments.

Various operations described herein can be implemented on computer systems. FIG. 18 shows a block diagram of a representative computing system 1814 usable to implement the present disclosure. In some embodiments, the wrist-wearable device 100 are implemented by the computing system 1814. Computing system 1814 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 1814 can be implemented to provide VR, AR, MR experience. In some embodiments, the computing system 1814 can include conventional computer components such as processors 1816, storage device 1818, network interface 1820, user input device 1822, and user output device 1824.

Network interface 1820 can provide a connection to a wide area network (e.g., the Internet) to which WAN interface of a remote server system is also connected. Network interface 1820 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 1822 can include any device (or devices) via which a user can provide signals to computing system 1814; computing system 1814 can interpret the signals as indicative of particular user requests or information. User input device 1822 can include any or all of a keyboard, touch pad, touchscreen, mouse or other pointing device, scroll wheel, click wheel, dial, button, switch, keypad, microphone, sensors (e.g., a motion sensor, an eye tracking sensor, etc.), and so on.

User output device 1824 can include any device via which computing system 1814 can provide information to a user. For example, user output device 1824 can display images generated by or delivered to computing system 1814 using a display. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that functions as both an input and output device can be used. Output device 1824 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operations indicated in the program instructions. Examples of program instructions or computer code include machine code, such as is produced by a compiler, and files including higher-level codes that are executed by a computer, an electronic component, or a microprocessor using an interpreter. Through suitable programming, processor 1816 can provide various functionalities for computing system 1814, including any of the functionalities described herein as being performed by a server or client, or other functionality associated with message management services.

It will be appreciated that computing system 1814 is illustrative and that variations and modifications are possible. Computer systems used in connection with the present disclosure can have other capabilities not specifically described here. Further, while computing system 1814 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

EXAMPLE EMBODIMENTS

Turning next to FIGS. 19, 20, 21A, and 21B, example methods will now be described.

(A1) In accordance with some embodiments, a method (1900 of FIG. 19) of interacting with a wrist-wearable device (1902), is described herein. As will be discussed in detail, interacting with a wrist-wearable device can be actual performance of a gesture or an intention to perform a gesture that is detected before the muscles have actually moved in the hand to cause performance of the gesture. In some embodiments, in addition to a biometric sensor (which can be, as one example, a collection or group of neuromuscularsignal-sensing electrodes and associated processing components), one or more other types of sensors can also be used to help improve gesture detection performance, such as use of an inertial measurement unit (IMU) data in addition to neuromuscular signal data. Certain types of in-air gestures can be detected using IMU data alone, such that certain embodiments can make use of the techniques described herein using data from an IMU and without needing to use data from a biometric sensor, other embodiments can make use of data from a biometric sensor alone, and other embodiments can make use of data from an IMU and a biometric sensor. In still other embodiments, the type of in-air hand gesture that is performed is what determines the data necessary for detection (e.g., different in-air hand gestures can be detected using one of biometric data alone, IMU data alone, and a combination of biometric data and IMU data). In this description, in-air hand gesture can refer to a type of gesture performed without contacting the display of the wrist-worn device, such as thumb-to-digit contact gestures that are performed in the air and need not contact a display, instead they are detected based on sensed neuromuscular signals and/or verified using other types of sensor data (e.g., data from an IMU).

Operations of the method 1900 can be performed by the wrist-wearable device 100 alone or in conjunction with one or more processors and/or hardware components of another device communicatively coupled to the wrist-wearable device 100 (e.g., a head-worn wearable device, a smartphone, a laptop, a tablet, etc.) and/or instructions stored in memory or computer-readable medium of the other device communicatively coupled to the wrist-wearable device 100.

Returning to the method, the method comprises, displaying a user interface (e.g., user interface 104 displayed in FIG. 1) via the display of a wrist-wearable device that includes a display and one or more sensors for detecting signals associated with performance (1904) of in-air hand gestures (e.g., wrist-wearable device 100 in FIG. 11). In some embodiments, a first user interface is displayed with the wrist-worn device is in a first display-active state in which content for a messaging application is displayed either within a compose window of a messaging application or within a response window display after a user has selected a notification associated with an electronic message for some other user. In some embodiments, the user interface is related to responding to a notification or composing a message in a messaging application.

The method includes, while displaying the user interface, receiving (1906), via a biometric sensor of the one or more sensors, a first biometric signal (e.g., index to thumb) associated with performance of an in-air hand gesture (e.g., FIG. 1 shows in first row 102 that a first in-air hand gesture 108 being received), and after receiving (1908) the first biometric signal, performing a context-specific operation (e.g., the operation is context specific when the operation is performed when specific display state criteria are met (e.g., a certain user interface needs to be displayed, the display needs to be in an on-state, etc. . . . ) at the wrist-wearable device. For example, FIG. 1 shows in first row 102 that in response to the first in-air hand gesture 108 being received, a context specific operation is performed for transcribing a message to send in a messaging conversation (e.g., the message-transcription user interface 110).

The method further comprises, receiving (1910), via the biometric sensor, a second biometric signal associated with performance of another in-air hand gesture, the other in-air hand gesture being distinct from the in-air hand gesture (e.g., FIG. 1 illustrates in a second row 112 another in-air hand gesture 114 (e.g., a user double tapping the tip of their ring finger to the tip of their thumb on the same hand that is wearing the wrist-wearable device 100) is performed by the user and then a context-agnostic operation is performed by the wrist-wearable device).

The method also includes, after receiving (1912) the second biometric signal, performing a context-agnostic operation (e.g., the operation is context-agnostic because the operation is performed irrespective of a context (e.g., display state) of the wrist-wearable device (e.g., at any time performance of the other in-air hand gesture is detected by the wrist-wearable, the context-agnostic operation will be performed)) distinct from the context-specific operation at the wrist-wearable device. In one illustration, FIG. 1 shows a second row 112 in which a user interface for a photo application user interface 115 allows for sending a photo to a specific contact (e.g., Carlos) despite the messaging conversation that was displayed with the other in-air hand gesture was detected being with a different contact (e.g., "Nalini"), in other words, the operation that is being performed is agnostic to the current context at the wrist-wearable device. Other examples when the other in-air hand gesture is performed are shown in the bottom row of FIG. 1 and in FIGS. 2, 6, and 7, which also show that regardless of a current context at the wrist-wearable device, performance of the other in-air hand gesture causes the device to perform the context-agnostic operation.

The method further comprising, after ceasing (1914) to display the user interface (or alternatively, the device can be displaying some other UI or can be in a standby or display-off state): receiving (1916), via the biometric sensor, a third biometric signal (e.g., index to thumb) associated with performance of the in-air hand gesture (e.g., FIG. 1 illustrates in a third row 116, that the first in-air hand gesture 108 is performed again).

The method includes, after ceasing to display the user interface, and after receiving the third biometric signal, forgoing (1918) performing the context-specific operation. For example, FIG. 1 illustrates in a third row 116 that since user interface 104 is not part of the current context at the wrist-wearable device (e.g., is not displayed on the watch display in the third row 116 of FIG. 1), performance of the first in-air hand gesture 108 does not result in the device performing an operation, which is illustrated by user interface 118 being shown again in the next pane 120).

The method also includes, after ceasing to display the user interface, receiving (1920), via the one or more biometric sensors, a fourth biometric signal associated with a second performance of the other in-air hand gesture. For example, FIG. 1 illustrates in the third row 116, a context-agnostic hand gesture 114 (e.g., double tapping the tip of their ring-finger to the tip of their thumb on the same hand that is wearing the wrist-wearable device 100) occurring while user interface 118 is being displayed.

The method includes, after ceasing to display the user interface, and after receiving the fourth biometric signal, performing (1922) the context-agnostic operation at the wrist-wearable device (e.g., FIG. 1 shows in the third row 116 that in response to receiving the context-agnostic hand gesture 114, a photo application user interface 119 is shown for sending a photo to a specific contact (e.g., Carlos) despite a music application being shown in user interface 118).

In some embodiments, the biometric sensor is an electrode (e.g., a dry electrode) for detecting neuromuscular signals (e.g., detecting the movement of tendons or the intention to move the tendons in the user's wrist, which can be processed to determine which digits of the hand are moving or will be moving). Other types of biometric sensors can also be used in addition to, or as alternatives to the biometric sensor for detecting neuromuscular signals. For instance, data from a photoplethysmography (PPG) sensor can also be utilized.

(A2) In some embodiments of A1, the context-agnostic operation is one of a plurality of context-agnostic operations, each respective context-agnostic operation of the plurality of context-agnostic operations being associated with one of a plurality of in-air hand gestures such that, when a respective in-air hand gesture is detected, a corresponding context-agnostic operation is performed at the wrist-wearable device regardless of a current state of the wrist-wearable device. For example, FIG. 1 shows the context-agnostic in-air hand gesture 114 causing the same operation (e.g., same action to be performed by the wrist-wearable device 100) in both the second row 112 and third row 116, despite the preceding user interfaces being distinct and separate from each other (e.g., associated with or presented within different applications)).

(A3) In some embodiments of any of A1-A2, where when the third and fourth biometric signals are received, the wrist-wearable device is in a display-off state or is displaying an additional user interface that is distinct from the user interface. An example of the display-off state is shown in the second row 210 in FIG. 2, which depicts that no user interface is displayed on the wrist-wearable device's display when the in-air hand gesture 206 is received (e.g., the in-air hand gesture can be an example of the other in-air hand gesture that is detected based on the fourth biometric signal). An example of the additional user interface that is distinct from the user interface is shown in the third row 116 of FIG. 1, in which a music user interface is shown as displayed on the wrist-wearable device, which is distinct from the user interface shown in the first row 102 of FIG. 1.

In other words, the other in-air hand gesture, because it is associated with a context-agnostic operation causes a same result each time it is detected, e.g., regardless of whether the other in-air hand gesture is performed when (i) the user interface of the second row of FIG. 1 is displayed, (ii) the additional user interface of the third row 116 of FIG. 1 is displayed, or (iii) the display is off as shown in the second row 112 of FIG. 1, then the same context-agnostic operation is performed. By comparison, when the in-air hand gesture only causes performance of the context-specific operation when a specific context is present at the device, e.g., in the depicted example of Figure, the specific context is that the device is displaying a user interface associated with a messaging application.

Having both context-specific and context-agnostic operations helps a user better interact with the device, e.g., by helping users learn a whole new gesture space without intentionally activating features that are not needed and then wasting time. In other words, the user can have certain controls that are always the same, which gives them more familiarity with the wrist-wearable device. By having context-specific operations, it allows applications to have some flexibility so easy controls can be used based on context.

(A4) In some embodiments of any of A1-A3, where: the other in-air hand gesture has a predetermined association with the context-agnostic operation that is stored in a memory of the wrist-wearable device, and the other in-air hand gesture is performed when the user contacts a phalanx portion of a digit on the user's hand with a thumb on the user's hand (e.g., block diagram in FIG. 15 shows that specific gestures can have associations that are stored locally on the wrist-wearable device.).

(A5) In some embodiments of A4, the method further comprising, receiving, via the biometric sensor of the one or more sensors, a fifth biometric signal (e.g., index to thumb) associated with performance of an additional in-air hand gesture. The method also includes, after receiving the fifth biometric signal, performing another context-agnostic operation distinct from the context-agnostic operation at the wrist-wearable device. In some embodiments, the additional in-air hand gesture has a predetermined association with the other context-agnostic operation, the predetermined association being stored in a memory of the wrist-wearable device, and the additional in-air hand gesture is performed when the user contacts another phalanx portion, different than the phalanx portion, of the digit on the user's hand with a thumb on the user's hand. For example, FIG. 6 illustrates that each phalanx on each finger can be associated with a different operation. In other words, multiple context-agnostic operations can be associated with different in-air hand gestures, which allows for users learning the ability to perform specific gestures at any point in time to allow for quickly accessing the context-agnostic operations. In some embodiments, the context-agnostic operations are ones that the user selects or otherwise configures for association with the respective in-air hand gestures, and users can thus select oft-used operations for quick and easy invocation at any point in time, which furthers the goal of improved man-machine interfaces and enables sustained interactions.

(A6) In some embodiments of A5, the context-agnostic operation is associated with sending an image that was captured via a camera of the wrist-wearable device to a predetermined contact from a plurality of contacts (e.g., in an address book) (e.g., FIG. 1 shows sending a photo application user interface 115 and 119 which are both associated with sending an image to a contact regardless of which user interface was previously displayed (e.g., context-agnostic), in response to connecting the distal end of the ring finger to the distal end of the thumb). In some embodiments, the other context-agnostic operation is associated with sending a textual message via the wrist-wearable device to the predetermined contact from the plurality of contacts (e.g., in an address book) (e.g., FIG. 6 illustrates in second row 610, that the second middle phalanx of the ring finger initiates a messaging user interface).

(A7) In some embodiments of A6, the method further includes, receiving, via the biometric sensor of the one or more sensors, a sixth biometric signal (e.g., middle finger to thumb) associated with performance of a fourth in-air hand gesture, different from the additional in-air hand gesture and the other in-air hand gesture/In some embodiments, the method also includes after receiving the sixth biometric signal, performing a third context-agnostic operation, distinct from the context-agnostic operation and the other context-agnostic operation, at the wrist-wearable device (e.g., FIG. 7 illustrates that different in-air hand gestures can be associated with different contacts).

In some embodiments, the fourth in-air hand gesture has a predetermined association with the third context-agnostic operation, the predetermined associated being stored in a memory of the wrist-wearable device, wherein the third context-agnostic operation is an operation associated with another specified contact from the plurality of contacts (e.g., in the address book) (e.g., FIG. 7 shows that, in response to the in-air hand gesture 704, a user interface 705 is displayed on wrist-wearable device indicating a call is being made to a first contact (e.g., Carlos), in response to the in-air hand gesture 708, a user interface 709 is displayed on wrist-wearable device indicating a call is being made to a second contact (e.g., Kaylee), and in response to the in-air hand gesture 712, a user interface 713 is displayed on wrist-wearable device indicating a call is being made to a third contact (e.g., Nicole)).

In some embodiments, the fourth in-air hand gesture is performed when the user contacts another digit, distinct from the digit, on the user's hand with a thumb on the user's hand. In other words, different fingers can have predetermined associations with different contacts. For example, FIG. 2 in the second row 210 also shows that selecting your ring finger initiates a call with a first contact (e.g., Carlos), and in the third row 214 selecting your middle finger initiates a call with a second contact (e.g., Nicole).

(A8) In some embodiments of any of A1-A4, the context-agnostic operation is an operation for activating a contact-specific function (e.g., in some embodiments, the operation is for opening a messaging conversation with a contact (e.g., a favorited contact) or initiating a call with a contact (e.g., a favorited contact)). In some embodiments, different contacts can be associated with different contacts (e.g., thumb to index finger initiates a call/message to a first contact, and a thumb to middle finger initiates a call/messages to a second contact). For example, FIG. 7 shows a few examples of contact-specific function. One example contact-specific function is shown in first row 700 of FIG. 7, which shows that, in response to the in-air hand gesture 704, a user interface 705 is displayed on wrist-wearable device indicating a call is being made to a first contact (e.g., Carlos). Another example contact-specific function is shown in second row 706 of FIG. 7, which shows that in response to the in-air hand gesture 708, a user interface 709 is displayed on wrist-wearable device indicating a call is being made to a second contact (e.g., Kaylee). One more example contact-specific function is shown in third row 710 of FIG. 7, which shows that in response to the in-air hand gesture 712, a user interface 713 is displayed on wrist-wearable device indicating a call is being made to a third contact (e.g., Nicole). These are contact-specific functions between the are each associated with an action associated with one specific contact. Contact-specific functions are not necessarily limited to one-to-one relationships, instead a group of contacts can also be associated with particular in-air hand gestures and contact-specific operations.

(A9) In some embodiments of any of A1-A4, either the context-specific operation or (and) the context-agnostic operation is an operation for sending a message by tapping out a sequence using combinations of gestures (e.g., morse code). In some embodiments, the sequence is a sequence of pinch gestures (e.g., pinch-pinch-pinch, pinch-and hold, release). For example, FIG. 5 illustrates a sequence (moving from left to right) for using a sequence of hand gestures to compose a text message.

(A10) In some embodiments of any of A1-A4, either (or both) the context-specific operation or (and) the context-agnostic operation is an operation is sending a command or initiate a command to the nearby device (e.g., control volume of a nearby speaker by first selecting it by pointing at it (e.g., ultrawideband (UWB) detects the device being pointed at), and then performing a thumb swiping up/down gesture to increase/decrease volume). For example, FIG. 4 shows a sequence (moving from left to right) illustrating using hand gestures to control external device.

(A11) In some embodiments of any of A1-A4, performing the context-specific operation includes activating a voice-dictation operation for transcribing a message (e.g., FIG. 1 shows in first row 102 that a first in-air hand gesture 108 causes a context-specific outcome, where the context specific outcome is a message-transcription user interface 110 for transcribing a message to send in the messaging conversation). FIG. 3 also illustrates a similar operation.

(A12) In some embodiments of A11, the method further comprises, after the message is transcribed as text, displaying the text on the display of the wrist-wearable device (e.g., in some embodiments the transcribed text can be displayed in another user interface, and the user interface and the other user interface are executed by the same application (e.g., a messaging application)): receiving, via the biometric sensor, a fifth biometric signal associated with a third performance of the in-air hand gesture, and after receiving the fifth biometric signal, performing a different context-specific operation that is distinct from the context-specific operation that was performed while the user interface was displayed. For example, FIG. 3 illustrates user interface 310, indicates that the transcribed message has been sent in response to the wrist-wearable device 100 detecting the other in-air hand gesture 308). In other words, performance of the in-air hand gesture only causes performance of the context-specific operation (e.g., activating voice dictation) when the wrist-wearable device is displaying the user interface; thus, in some embodiments, when the in-air hand gesture is performed elsewhere (e.g., when the wrist-wearable device is displaying a message-composition user interface that includes the text entered by the user using voice dictation), then performance of some other context-specific operation happens instead of performance of the context-specific operation. Thus, the same context-specific operation can be easily learned by users and used in many different contexts to perform similar types of actions (e.g., to cause selection of different types of user interface elements that are currently in focus, e.g., the Reply button in FIG. 3 and also the Send button of FIG. 3.

(A13) In some embodiments of A12, the performing of the different context-specific operation includes sending the transcribed message to at least one other user via a messaging application (e.g., FIG. 3 illustrates user interface 310, indicates that the transcribed message has been sent in response to the wrist-wearable device 100 detecting the other in-air hand gesture 308).

(A14) In some embodiments of any of A1-A4, the performance of the in-air hand gesture includes the user moving one or both of a thumb to another digit on the user's hand so that they make contact at least twice. (e.g., double/triple/quadrupole pinching a thumb and a non-thumb finger together on the same hand) For example, FIG. 3 also illustrates user interface 310, indicates that the transcribed message has been sent in response to the wrist-wearable device 100 detecting the other in-air hand gesture 308. As an alternative to, or in addition to, tapping the user's thumb to another digit, performance of the in-air hand gesture can be based on the thumb remaining in contact with the other digit for at least a predetermined amount of time, e.g., for 0.5 second, 1 second, 2 second, etc., In some embodiments, connecting a thumb of a hand with the same digit of the hand for different predetermined amounts of time can result in different operations being performed (e.g., a 0.5 second hold can start a message, while a 1 second hold can start a video call). In some embodiments, the operations can be starting a video call, opening a private sharing camera to capture a photo or video, sending a voice or text message, sending a pre-determined emoji (e.g., heart, laugh, etc. . . . ), sending a current location, or sending the last photo or video that was taken.

(A15) In some embodiments of any of A1-A4, the user interface is (i) a conversation thread between the user and at least one other user or (ii) a notification associated with an electronic message received from the at least one other user. For example, FIG. 1 shows in user interface 104 a messaging conversation is displayed (e.g., a conversation with "Nicole").

(A16) In some embodiments of any of A1-A15, at least one of the one or more of the sensors for detecting signals associated with performance of in-air hand gestures is a component of an inertial measurement unit (e.g., FIG. 11 shows the wrist-wearable device having an inertial measurement unit).

(B1) In accordance with some embodiments, a wrist-wearable device configured to perform or cause performance of any of claims A1-A16.

(C1) In accordance with some embodiments, a capsule housing the display recited in claim 1, where: the capsule is configured to couple with a band to form a wrist-wearable device, and the capsule includes one or more processors configured to perform or cause performance of any of A1-A16.

(D1) In accordance with some embodiments, a non-transitory, computer-readable storage medium including instructions that, when executed by a wrist-wearable device, cause the wrist-wearable device to perform or cause performance of any of claims A1-A16.

(E1) In accordance with some embodiments, a wrist-wearable device comprising means for performing or causing performance of any of A1-A16.

(F1) In accordance with some embodiments, a head-worn device that is configured to receive instructions from the wrist-wearable device or an intermediary device to cause the context-specific or context-agnostic operations to be performed using a display of the head-worn device.

While the primary examples discussed herein related to use of a wrist-wearable device to both detect and then cause performance of certain contact-specific and context-agnostic gestures, it is also contemplated that the wrist-wearable device could detect the gestures (or partially detect them such as by sending sensor readings for processing at some other device for interpreting which gestures were performed) and then another device can perform the operation.

(G1) In accordance with some embodiments, a method (2000 of FIG. 20) of interpreting in-air hand gestures based on orientation of a wrist-wearable device (2002), comprises: receiving (2004), from one or more sensors of a wrist-wearable device, data associated with performance of an in-air hand gesture (e.g., gesture in which distal phalange portions of the thumb and one other digit make contact with one another, and this gesture does not require any contact with the wrist-wearable device) during a first period of time by a wearer of the wrist-wearable device (e.g., FIG. 8A-8C illustrate a first in-air hand gesture 808 (e.g., connecting a distal end of the index finger to the distal end of a thumb on the same hand)).

Operations of the method 2000 can be performed by the wrist-wearable device 100 alone or in conjunction with one or more processors and/or hardware components of another device communicatively coupled to the wrist-wearable device 100 (e.g., a head-worn wearable device, a smartphone, a laptop, a tablet, etc.) and/or instructions stored in memory or computer-readable medium of the other device communicatively coupled to the wrist-wearable device 100.

The method includes, in accordance with determining that the data indicates that the wrist-wearable device had a first orientation when the in-air hand gesture was performed during the first period of time, causing (2006) performance of a first operation at the wrist-wearable device (e.g., FIG. 8A illustrates a first spatial orientation 804 (e.g., the wrist-wearable device is facing a face of the user 101)). The method also includes, receiving (2008), from the one or more sensors of the wrist-wearable device, new data (e.g., index to thumb) associated with performance of the in-air hand gesture during a second period of time by the wearer of the wrist-wearable device (e.g., FIG. 1 shows in first row 102 that a first in-air hand gesture 108 being received), the second period of time being after the first period of time.

The method also comprises, in accordance with determining that the new data indicates that the wrist-wearable device had a second orientation when the in-air hand gesture was performed during the second period of time, causing (2010) performance of a second operation at the wrist-wearable device (e.g., FIG. 8B illustrates that in response to the wrist-wearable device (and or other devices) processing the second spatial orientation 810 combined with the first in-air hand gesture 808, the wrist-wearable device initiates a voice dictation user interface 306 for sending a text message to a contact). In some embodiments, the second operation is distinct from the first operation (2012), and the second orientation of the wrist-wearable device is distinct from the first orientation of the wrist-wearable device (2014) (e.g., FIG. 8B illustrates that the wrist-wearable device has a second spatial orientation 810 (e.g., the wrist-wearable device is at a normal watch viewing location (e.g., near a chest of a user 101)).

(G2) In some embodiments of G1, the further method comprises, receiving, from the one or more sensors of the wrist-wearable device, additional data (e.g., index to thumb) associated with performance of the in-air hand gesture during a third period of time by the wearer of the wrist-wearable device (e.g., FIG. 8C illustrates the first in-air hand gesture 808 being performed), the third period of time being after the first period of time and the second period of time. The method includes, in accordance with determining that the additional data indicates that the wrist-wearable device had a third orientation when the in-air hand gesture was performed during the third period of time, causing performance of a third operation at the wrist-wearable device (e.g., FIG. 8C shows that the wrist-wearable device has a third spatial orientation 812 (e.g., the wrist-wearable device is placed next to an ear of a user 101)). In some embodiments: the third operation is distinct from the first operation and second operation (FIG. 8C illustrates that the wrist-wearable device begins initiating media playback (e.g., playing a song, a podcast, etc. ) as indicated by user interface 604), and the third orientation of the wrist-wearable device is distinct from the first orientation of the wrist-wearable device and the second orientation of the wrist-wearable device.

(G3) In some embodiments of any one of G1-G2, the first operation is an operation associated with use of a camera of the wrist-wearable device, and the second operation does not relate to use of the camera. For example, FIG. 8A illustrates that in response to the wrist-wearable device (and or other devices) processing the first spatial orientation 804 combined with the first in-air hand gesture 808, the wrist-wearable device initiates a front facing camera for taking a "selfie" photograph (e.g., the watch user interface 809 shows a viewfinder of the front facing camera).

(G4) In some embodiments of any one of G1-G3, the third operation also does not relate to use of the camera. For example, FIG. 8B illustrates that in response to the wrist-wearable device (and or other devices) processing the second spatial orientation 810 combined with the first in-air hand gesture 808, the wrist-wearable device initiates a voice dictation user interface 306 for sending a text message to a contact, which is not an operation related to the user of a camera.

(G5) In some embodiments of any one of G1-G2, the in-air hand gesture is performed while the wrist-wearable device is displaying a clock-face user interface. For example, FIG. 9C illustrates that while a clock user interface 913 is displayed, the wrist-wearable device determines, using included sensors, that the wrist-wearable device has a third spatial orientation 914, and in response to the determination, the wrist-wearable device begins initiating a phone call with a contact as indicated by user interface 916.

(G6) In some embodiments of G2, the first operation is an operation associated with use of a camera of the wrist-wearable device (e.g., for taking a "selfie" photograph) (e.g., FIG. 8A illustrates that in response to the wrist-wearable device (and or other devices) processing the first spatial orientation 804 combined with the first in-air hand gesture 808, the wrist-wearable device initiates a front facing camera for taking a "selfie" photograph (e.g., the watch user interface 809 shows a viewfinder of the front facing camera).), the second operation is an operation associated with providing a voice command (e.g., for sending a dictated message to contact or for activating a virtual assistant and then commanding that assistant) (e.g., FIG. 8B illustrates that in response to the wrist-wearable device (and or other devices) processing the second spatial orientation 810 combined with the first in-air hand gesture 808, the wrist-wearable device initiates a voice dictation user interface 306 for sending a text message to a contact), and the third operation is an operation associated with use of a media player (e.g., playing and pausing media). FIG. 8C illustrates that the wrist-wearable device begins initiating media playback (e.g., playing a song, a podcast, etc.) as indicated by user interface 604).

(G7) In some embodiments of G6, the wrist-wearable device is determined to be in the first orientation when sensor data from the wrist-wearable device indicates that the wrist-wearable device is orientated to take a picture of the wearer's face, (i.e., device is in a selfie pose position. Examples of how you determine the first orientation can include looking at angular position and other data from an IMU (e.g., accelerometer and gyroscope data), looking at data from the camera itself to perform computer-vision processes and detect that a user's face is within view of the camera's field of view, looking at data from a camera on an associated device, such as a head-worn device, to determine that the camera of the wrist-wearable device is looking towards the user's face. Another embodiment can compare position of the wrist-wearable device based on a part of the user's body (e.g., related to a user's chin, neckline, nose, chest, etc.). For example, FIG. 8A illustrates the wrist-wearable device is facing a face of the user 101). In some embodiments, the wrist-wearable device is determined to be the second orientation when sensor data from the wrist-wearable device indicates that the wrist-wearable device is oriented below a chin level of a user. While a chin level is used as a reference point, other reference points can also be used, including, below a neckline of a user, below of a chest of a user, within an upper ¾th position of the body (e.g., above the waist but below the chest) (e.g., FIG. 8B illustrates that the wrist-wearable device is at a normal watch viewing location (e.g., near a chest of a user 101)). In some embodiments, the wrist-wearable device is determined to be the third orientation when sensor data from the wrist-wearable device indicates that the wrist-wearable device is in an orientation that places the wrist-wearable device next to an ear of the user. While placement next to the car of the user is used as a reference point, other reference points can also be used, including, a vertical orientation of the device, being within an upper region of the body, but a face not being detected.

In some embodiments, instead of, or in addition to, using information about an orientation of the wrist-wearable device itself, the determinations as to first, second, and third orientations can be based on a hand pose of the wearer's hand when the in-aid hand gesture is performed during the first period of time, second period of time, third period of time, respectively. In some embodiments, determinations of hand pose do not require look at the wrist-wearable device's specific orientation, but instead can look at data from neuromuscular-signal sensors to discern a pose of the wearer's hand. Hand pose can impact the wrist-wearable device's orientation but it can also be separately assessed independently from the device's orientation as discerned based on, e.g., data from an IMU or the like.

(G8) In some embodiments of G2, the method comprises, receiving, from the one or more sensors of the wrist-wearable device, further additional data associated with performance of another in-air hand gesture, different from the in-air hand gesture. For example, the in-air hand gesture is connecting a distal phalange portion of the thumb to a distal phalange portion of an index finger with one another, and the other in-air hand gesture is connecting a distal phalange portion of the thumb to a distal phalange portion of a middle finger with one another, both of these gesture do not require any contact with the wrist-wearable device) during a fourth period of time by the wearer of the wrist-wearable device (e.g., FIG. 9C illustrate performing another in-air hand gestures (e.g., connecting a distal end of a thumb to a distal end of a middle finger)). The method includes, in accordance with determining that the further additional data indicates that the wrist-wearable device had the third orientation when the other in-air hand gesture was performed during the fourth period of time, causing performance of a fifth operation at the wrist-wearable device, different from the third operation (e.g., FIG. 9C illustrates the wrist-wearable device having a third spatial orientation 914 (e.g., the wrist-wearable device is placed next to an ear of a user 101), and in response to the wrist-wearable device (and or other devices) processing the third spatial orientation 914 combined with the second in-air hand gesture 908, the wrist-wearable device begins initiating a phone call with a contact as indicated by user interface 916).

(G9) In some embodiments of G1, the method comprises, receiving, from the one or more sensors of the wrist-wearable device, additional data associated with performance of another in-air hand gesture, different from the in-air hand gesture, (e.g., the in-air hand gesture is connecting a distal phalange portion of the thumb to a distal phalange portion of an index finger with one another, and the other in-air hand gesture is connecting a distal phalange portion of the thumb to a distal phalange portion of a middle finger with one another, both of these gesture do not require any contact with the wrist-wearable device) during a third period of time by the wearer of the wrist-wearable device (e.g., FIG. 9A illustrates performing another in-air hand gestures (e.g., connecting a distal end of a thumb to a distal end of a middle finger)). In some embodiments, the method also includes, in accordance with determining that the additional data indicates that the wrist-wearable device had the first orientation when the other in-air hand gesture was performed during the third period of time, causing performance of a third operation at the wrist-wearable device, different from the first operation (e.g., FIG. 9A illustrates the wrist-wearable device having first spatial orientation 904 (e.g., the wrist-wearable device is facing a face of the user 101), and in response to the wrist-wearable device (and or other devices) processing the first spatial orientation 904 combined with the second in-air hand gesture 908, the wrist-wearable device initiates a weather application for viewing the nearby weather, as indicated by user interface 909).

(G10) In some embodiments of G9, the method comprises, receiving, from the one or more sensors of the wrist-wearable device, more data associated with performance of the other in-air hand gesture (e.g., the in-air hand gesture is connecting a distal phalange portion of the thumb to a distal phalange portion of an index finger with one another, and the other in-air hand gesture is connecting a distal phalange portion of the thumb to a distal phalange portion of a middle finger with one another, both of these gesture do not require any contact with the wrist-wearable device) during a fourth period of time by the wearer of the wrist-wearable device (e.g., FIG. 9B illustrate another in-air hand gesture (e.g., connecting a distal end of a thumb to a distal end of a middle finger)). In some embodiments, the method also includes, in accordance with determining that the more data indicates that the wrist-wearable device had the second orientation when the other in-air hand gesture was performed during the fourth period of time, causing performance of a fourth operation at the wrist-wearable device, different from the second operation. In some embodiments, the fourth operation is the same operation as the second operation (e.g., different in-air hand gestures at different orientations can result in the same operation) (e.g., FIG. 9B illustrates the wrist-wearable device having second spatial orientation 911 (e.g., the wrist-wearable device is at a normal watch viewing location (e.g., near a chest of a user 101), and in response to the wrist-wearable device (and or other devices) processing the second spatial orientation 911 combined with the second in-air hand gesture 908, the wrist-wearable device displays a clock user interface 912 for displaying the time).

(G11) In some embodiments of G1-G10, the in-air hand gesture is detected based on data from the one or more sensors indicating that one or both of a distal phalange portion of the thumb and a distal phalange portion of first finger have moved to contact one another, and the other in-air hand gesture is detected based on other data from the one or more sensors indicating that one or both of the distal phalange portion of the thumb and a distal phalange portion of a second finger have moved to contact one another (e.g., FIG. 11 illustrates the wearable device having at least an inertial measurement unit (IMU) sensor and a electromyography (EMG) sensor for detecting gestures and/or orientations of the wrist-wearable device). In some embodiments, the in-air hand gesture may include connecting multiple fingers together (e.g., an index finger and a middle finger are connected to a thumb). Stated another way, the in-air hand gesture is further detected based on additional data from the one or more sensors indicating that both of an additional distal phalange portion of another finger and the first finger have moved to contact the distal phalange portion of the thumb (e.g., first in-air hand gesture 808 shown in FIGS. 8A-8C), the other in-air hand gesture is further detected based on more data from the one or more sensors indicating that one or both of an additional distal phalange portion of another finger and the second finger have moved to contact the distal phalange portion of the thumb (e.g., second in-air hand gesture 908 shown in FIGS. 9A-9C), and the in-air hand gesture is different from the other in-air hand gesture.

(G12) In some embodiments of G1, the in-air hand gesture is at least partially detected by data sensed by one or more of an inertial measurement unit (IMU) and a neuromuscular-signal sensor (e.g., Electromyography (EMG) sensor).

(G13) In some embodiments of G1, the first orientation and the second orientation are detected based on data sensed by one or more of an inertial measurement unit (IMU), and a neuromuscular-signal sensor (e.g., a Electromyography (EMG) sensor). For example, FIG. 11 shows the wrist-wearable device having at least IMU and EMG sensors. In some embodiments, additional sensors are used such as a camera to detect orientation based on angles in an environment, biometric sensors to detect biometric pressure changes.

(G14) In some embodiments of G1, the first operation is performed using a first application (that is executing on the wrist-wearable device or that is executing on a device that is in communication with the wrist-wearable device such as a head-worn device (e.g., a pair of smart glasses)), and the second operation is performed using a second application (that is executing on the wrist-wearable device or that is executing on a device that is in communication with the wrist-wearable device such as a head-worn device (e.g., a pair of smart glasses)) (FIGS. 8A-9C, and corresponding respective user interfaces 809, 306, 604, 909, 912, 916, which result from different operations, are each associated with different applications (e.g., a camera application, a messaging application, a music application, a weather application, a clock application, a phone application)).

(G15) In some embodiments of G1, the first operation and the second operation are controlled by an operating system of the wrist-wearable device.

(G16) In some embodiments of G1-G15, the first operation is performed after an operating system of the wrist-wearable device provides data to the first application concerning performance of the in-air hand gesture, and the second operation is performed after an operating system of the wrist-wearable device provides data to the second application concerning performance of the other in-air hand gesture.

(G17) In some embodiments of any one of claims G1-G16, the in-air hand gesture is performed while the wrist-wearable device is in a display-off state (e.g., FIG. 9B illustrates the wrist-wearable device 100 having the display in an off state 910).

(H1) In accordance with some embodiments, a wrist-wearable device is configured to perform or cause performance of any of G1-G16.

(I1) In accordance with some embodiments, a capsule housing the display recited in claim 1, where: the capsule is configured to couple with a band to form a wrist-wearable device, and the capsule includes one or more processors configured to perform or cause performance of any of G1-G16.

(J1) In accordance with some embodiments, a non-transitory, computer-readable storage medium including instructions that, when executed by a wrist-wearable device, cause the wrist-wearable device to perform or cause performance of any of G1-G16.

(K1) In accordance with some embodiments, a wrist-wearable device comprising means for performing or causing performance of any of G1-G16.

(L1) In accordance with some embodiments, a method (e.g., the method 2100) of using thumb-based in-air gestures detected via a wearable device to control two different electronic devices is described herein.

The method 2100 can be performed at a computing system (e.g., the computing system 1200) having one or more processors and memory. In some embodiments, the computing system is the computing system 1700 in FIG. 17A. Operations of the method 2100 can be performed by the wrist-wearable device 100 alone or in conjunction with one or more processors and/or hardware components of another device communicatively coupled to the wrist-wearable device 100 (e.g., a head-wearable device, a smartphone, a laptop, etc.) and/or instructions stored in memory or computer-readable medium of the other device communicatively coupled to the wrist-wearable device 100.

Referring now to FIG. 21A, in performing the method 2100, the computing system detects (2102), using one or more sensors of a wearable electronic device, a performance of a first in-air hand gesture, including a first movement of a user's thumb. In some embodiments, the detecting occurs at a wrist-wearable device, a head-wearable device, an electronic ring device, etc. In some embodiments, the wearable electronic device is a virtual representation of a physical wearable device (e.g., a virtual object that has a physical appearance similar to a wristwatch, such as the wrist-wearable device 100 shown in FIGS. 12A-14B).

The method further includes, based on (2118) the hand of the user being in a first spatial orientation (e.g., the wrist-wearable device is facing the user's face), the computing system causes performance of a first operation of a predetermined set of operations at the wearable electronic device.

The method further includes, while (2122) the wearable electronic device is in communication with a second electronic device, detecting, using one or more sensors of a wearable electronic device, a performance of a second in-air hand gesture that includes the first movement of the user's thumb. For example, the thumb movement 1216 in FIGS. 12B and 12E can be considered a first movement, and specifically, the thumb movement 1216 shown in FIG. 12B can be considered part of the second in-air hand gesture, since it causes operations to be performed at the head-wearable device 1202, which can be considered the second electronic device, according to some embodiments.

The method further includes, based on (2126) the hand of the user being in a second spatial orientation relative to the viewing range of the user (e.g., the wrist-located element is facing away from the user's face), distinct from the first orientation (e.g., the second orientation can correspond to a distinct angle of rotation of the wrist from the first orientation), the computing system causes performance of a second operation of the predetermined set of operations at the second electronic device that is distinct and separate from, and in communication with the wearable electronic device.

As used herein, "in-air" means that the user's hand does not contact a portion of the device, or another electronic device (e.g., a touch-sensitive display of a smartphone device). In other words, the gesture is performed in open air in 3D space and without contacting the wrist-wearable device (e.g., the wrist-wearable device 100 shown in FIGS. 12A-14B). The in-air gestures are performed without a glove, without contacting a glove surface, or without the wrist-wearable device being coupled to a glove. In some embodiments, the in-air hand gesture includes a single contact between a distal phalange (distal, proximal, middle) phalange portion of the user's thumb and a distal phalange portion of the user's index finger, which causes selection of a first camera (e.g., a camera of the head-worn device), or the in-air hand gesture includes two or more contacts between a distal phalange portion of the user's thumb and a distal phalange portion of the user's index finger, e.g., which causes selection of a second camera distinct from the first camera (e.g., a security camera located near (e.g., within a distance that allows for short-range communication) the wrist-wearable device). Such in-air finger-contact gestures are non-limiting examples of the in-air gestures contemplated herein, other examples include gestures in which two fingers (and phalange portions thereof) are moved to make contact with a thumb (and a phalange portion thereof), multi-step gestures in which a first digit can make contact with a thumb and remain in contact and then another digit can make contact with the first digit while the first digit remains in contact with the thumb. Rotational in-air hand gestures are also contemplated, in which a user can rotate their wrist in various directions.

(L2) In some embodiments of L1, the wearable electronic device is (2104) a wrist-wearable device (e.g., a physical wrist-wearable device, or a representation of a wrist-wearable device in an artificial-reality environment). In some embodiments, the wearable electronic device is a hand-wearable device (e.g., an electronic ring), a forearm-wearable device, and/or a smartphone or similar tabular device harnessed to the user by mechanical means.

(L3) In some embodiments of L2, the wrist-wearable device has (2106) a display, and the first operation causes movement of a first focus selector in a first direction within a first user interface displayed on the display of the wrist-wearable device. In some embodiments, a focus selector is a user-interface element that indicates a portion of a user interface that a user is interacting with (e.g., the focus selector 1210 within the user interface 106 in FIG. 12A). For example, a cursor, location marker, or indication (e.g., outline) that is applied to an existing user-interface element.

As used herein, the term wrist-wearable device can mean a physical wrist-wearable device, a virtual representation of a wrist-wearable device, and/or a virtual representation (e.g., a virtual overlay) that augments the appearance of a physical wrist-wearable device. While the primary examples discussed herein related to use of a physical wearable electronic device and its spatial orientations are used to determine whether to control the wearable electronic device or a second electronic device, other examples that are contemplated including using a virtual representation of a wearable electronic device. For example, a head-wearable device can display a virtual environment and displaying the virtual environment can include displaying a three-dimensional virtual watch located at the user's wrist (e.g., a wrist-located element that can be presented within an artificial-reality environment but is not otherwise presented in the physical world). In other words, applications of these techniques apply both to the physical world and the objects within it and also apply to the artificial worlds and non-physical objects (such as the aforementioned wrist-located element) present therewithin. Further, an in-air hand gesture performed while the user's wrist is in the first spatial orientation can cause an operation to be performed at a display and/or a virtual display that is not located at the location of a wrist-wearable device or other wrist-located element. In some embodiments, the wrist-wearable device is a virtual object, presented by the head-wearable device (e.g., the head-wearable device 1202).

(L4) In some embodiments of any of L2-L3, the wrist-wearable device is (2108) a physical wrist-wearable device. For example, the wrist-wearable device is a smartwatch or bracelet.

(L5) In some embodiments of any of L1-L4, the wearable device includes (2110) one or more neuromuscular-signal-sensing electrodes, and the performance of one of the first in-air hand gesture and the second in-air hand gesture is detected by at least one of the one or more neuromuscular-signal-sensing electrodes.

(L6) In some embodiments of any of L1-L5, the wearable device includes (2112) one or more IMU sensors located at the wearable device, and the IMU sensors are configured to detect one or more of the first in-air hand gesture and the second in-air hand gesture.

In some embodiments, detecting performance of the first in-air hand gesture or the second in-air hand gesture is further based on image data captured by an image sensor (e.g., a CMOS and/or CCD sensor that can be used to sense aspects of images captured by a camera at the wrist-wearable device, the head-wearable device, or another electronic device) located at the physical wrist-wearable device or a head-wearable device that is in communication with the wrist-wearable device.

While the primary examples herein focus on use of sensors from wrist-wearable devices (e.g., EMG sensors) to detect the thumb movements associated with the in-air hand gestures, other examples are also contemplated. For instance, instead of detecting gestures using sensors from wrist-wearable devices, other examples might make use of sensors on a handheld controller to detect thumb movements and to then invert interpretations of those thumb movements depending on whether a wrist-wearable device or a head-worn wearable device is being controlled. Continuing with this example, the wrist-wearable device might be a virtual representation of a wrist-wearable device that appears to be on a user's wrist within an artificial-reality environment and depending on whether a controller in the hand of the user is held in an upward or a downward facing direction, the spatial orientation of the controller can be used to disambiguate whether thumb movements at the controller should control the wrist-located element or some other aspect of the AR environment presented via the head-wearable device.

(L7) In some embodiments of any of L1-L6, the first movement includes (2114) motion of the thumb of the user in a lateral direction along an index finger of the user from a first location on the index finger to a second location on the index finger. In some embodiments, the first movement does not include physical contact between the user's thumb and index finger (e.g., but instead includes the motion of the user's thumb in air). In some embodiments, the user causes another operation to be performed by pressing their thumb toward their index finger before, after, and/or during the first movement.

(L8) In some embodiments of any of L1-L7, the first movement includes (2116) a downward press gesture by the user's thumb on the index finger at the first location and/or the second location (e.g., a simulated button-press gesture). In some embodiments, a downward press gesture is required before and/or after the respective thumb movement of the corresponding in-air gesture in order to cause the predetermined operation to be performed. In some embodiments, performing a thumb movement in conjunction with an in-air gesture causes a different predetermined operation to be performed than would be performed if the user only had performed the movement. In some embodiments, the amount of force provided by the downward press gesture determines the type and magnitude of the corresponding operation to be performed in conjunction with the downward press and/or movement. In some embodiments, a downward press gesture causes performance of an operation that is independent of movement of any corresponding gesture (e.g., a standalone button press).

In some embodiments, the wearable electronic device is determined to be in the first spatial orientation based on an orientation axis (e.g., an axis normal to the center of a display of the wrist-wearable device) being within a predefined threshold range of a first orientation angle (e.g., 15-30 degrees). In some embodiments, there is no display on the wearable electronic device, but there is an indicator that indicates a current direction of the orientation axis of the wearable electronic below being within a predefined threshold range of a first orientation angle. In some embodiments, the first orientation angle corresponds to an angle between the wrist-located element and the user's face (e.g., a viewing range). In some embodiments, the first orientation angle is directly upward (e.g., skyward).

In some embodiments, the viewing range is not based on an actual orientation of the user and is not based on such aspects as, for example, a gaze direction of the user (e.g., the viewing range 1203 in FIG. 12A, which can be based on a gaze direction of the user 101 detected by the head-wearable device 1202). In some embodiments, a different reference point than the user's viewing range is used, such as a normal direction from the display of the wrist-wearable device. The predetermined set of operations can be a set of navigational operations that are available at each of two electronic devices where operations are being performed (e.g., the wearable electronic device, and the second electronic device). As an example, the same first movement of the user's thumb can result in different operations being performed depending on which device is being controlled. For example, a first navigational movement through a user interface can be the second operation if the second electronic device is instead being controlled.

(L9) In some embodiments of any of L1-L8, the first spatial orientation corresponds to (2120) an orientation in which the display of the wearable electronic device is within the viewing range of the user such that the display is visible to the user (e.g., a threshold angular range where the user can see the display of the wrist-wearable device). In some embodiments, the determination whether the display of the wearable electronic device is within the viewing range of the user is based on IMU data that provides motion and orientation data. In some embodiments, the viewing range determination is based on gaze tracking, facilitated by one or more components of a head-wearable device.

In some embodiments, the second electronic device is a head-wearable device (e.g., head-mounted display device, virtual-reality goggles and/or artificial-reality glasses, and/or a sensor-laden headband). In some embodiments, the head-wearable device is an eye-wearable device that includes a display and a processor (e.g., smart contacts). In some embodiments, the second electronic device is a personal computing device (e.g., smart phone, tablet, laptop, desktop computer). In some embodiments, the operations described herein are performed while the wearable electronic device is not in communication with a second electronic device.

In some embodiments, while the wearable electronic device is not in communication with the second electronic device, in-air hand gestures that include the first movement of the user's thumb is either performed or not (e.g., are ignored), based on whether the wearable electronic device is in the first spatial orientation or the second spatial orientation. In some embodiments, (e.g., while the wearable electronic device is not in communication with the second electronic device) in-air hand gestures that include the first movement of the user's thumb corresponds to distinct operations at the wearable electronic device, depending on whether the wearable electronic device has the first spatial orientation or the second spatial orientation.

(L10) In some embodiments of any of L1-L9, the second electronic device is (2124) a head-wearable device. For example, the second electronic device can be the head-wearable device shown in FIGS. 12A-14B, which can be an example of the AR system 1600 and/or the VR system 1650, shown in FIGS. 16A-16B, according to some embodiments.

(L11) In some embodiments of any of L1-L10, the second spatial orientation corresponds to (2128) an orientation in which the display of the wearable electronic device is outside the viewing range of the user such that the display is not visible to the user (e.g., an angular range associated with the user's field of view in conjunction with a display of the wrist-wearable device). In some embodiments, the method accounts for constraints of the display to further define the viewing range of the user.

In some embodiments, there are more than two spatial orientations that correspond to different operations. For example, in response to detecting, via one or more sensors, performance of a third in-air gesture, including the first movement of the user's thumb, while the wrist-located element has a third spatial orientation, the third spatial orientation distinct from the first spatial orientation and the second spatial orientation, a method can cause performance of another operation at the wrist-wearable device, distinct from movement of the first focus selector in the first direction (e.g., a movement of the first focus selector in a third direction, distinct from the first direction, within the user interface displayed on the wrist-located element). In some embodiments, the other operation is an operation from the first set of operations; and the other operation causes movement of the first focus selector in a third direction, wherein the third direction is substantially orthogonal to the first direction (e.g., the first in-air hand gesture causes a downward movement of the first focus selector, while the wrist-located element is in the first spatial orientation, and the third in-air hand gesture causes a leftward movement of the first focus selector, while the wrist-located element is in the third spatial orientation).

(L12) In some embodiments of any of L1-L11, the second operation is (2130) caused to be performed at a second user interface presented within an artificial-reality environment (e.g., a user interface presented at an artificial-reality environment that can include a combination of three-dimensional and two-dimensional virtual objects and/or display elements), presented by the head-wearable device (e.g., the user interface 106 presented by the head-wearable device 1202 in FIG. 12A-12C).

(L13) In some embodiments of L12, the second operation causes (2132) movement of a second focus selector, distinct from the first focus selector, in a second direction, distinct from the first direction, within the artificial-reality environment presented via the head-wearable device. In other words, the same movement of a user's thumb results in different focus selector movement on different devices. In this example, the same first movement of the user's thumb causes the first focus selector, at the wrist-wearable device, to move in an upward direction (e.g., the thumb movement 1216 shown in FIG. 12E), while the same first movement of the user's thumb causes the second focus selector, at the head-wearable device, to move in a downward direction (e.g., the thumb movement 1216 shown in FIG. 12B). Thus, depending on wrist orientation when the thumb movements are received, an intuitive movement is actuated by a corresponding focus selector.

(L14) In some embodiments of any of L1-L13, the computing system detects (2134), using one or more sensors of a wearable electronic device, a performance of a third in-air hand gesture, including a second movement of the thumb of the user (e.g., the first direction of the first movement can be outward from the palm toward the fingers and away from the knuckles, and the second direction of the second movement can be inward toward the knuckles). In other words, the focus selector's movement is in accordance with how far or how fast a user's thumb is moving. And the different thumb movements in the examples provided can be of different lengths, thereby resulting in different amounts of movement to the first focus selector on the wrist-wearable device. In other examples, the thumb movement can always trigger a same amount of movement to a focus selector. The same also applies to the focus selector presented by the head-wearable device, where the amount of movement of the second focus selector can be dependent on an amount of movement for the user's thumb. In some embodiments, the amount of movement for the focus selectors is a default amount that is device-specific, such that any movement of the user's thumb (when the watch is being controlled) results in a watch-default amount of movement to the watch's focus selector, while any movement of the user's thumb (when the head-wearable device is being controlled) results in a glasses-default amount of movement to the focus selector on the head-wearable device. In some embodiments, distance, velocity, and/or acceleration are used to determine a distance and/or a speed of movement of the focus selector.

(L16) In some embodiments of L15, based on (2136) the hand of the user being in the first spatial orientation during the performance of the third in-air hand gesture, the computing system causes performance of a third operation of the predetermined set of operations at the wearable electronic device. For example, the third in-air hand gesture can be the thumb movement 1302 shown in FIGS. 13B and 13E.

(L17) In some embodiments of L16, the computing system detects (2138), using one or more sensors of a wearable electronic device, a performance of a fourth in-air hand gesture, including a second movement of the thumb of the user. For example, the fourth in-air hand gesture can be the thumb movement 1304 shown in FIGS. 13C and 13F.

(L18) In some embodiments of L17, based on (2140) the hand of the user being in the second spatial orientation, the computing system causes performance of a fourth operation of the predetermined set of operations at the wearable electronic device.

As one of skill in the art will appreciate, aspects of the method 2100 can be combined and/or replaced with aspects of the methods 1900 and 2000. For example, the method 2100 can be performed prior to, in conjunction with, or after the method 2100. The method 2100 can include the operations of method 2000, e.g., the operations 1904, 1906, and/or 1908 shown in FIG. 19 can be performed before any of the operations 2102, 2114, 2118, 2122 and/or 2126. As another example, the operation 2118 can be replaced (or supplemented by) the operation 1908. In other words, the detecting (2102) of the first in-air hand gesture that includes the first movement of the user's thumb can correspond to a context-specific operation at a user interface of a wrist-wearable device (e.g., the wrist-wearable device 100). Therefore, the first in-air hand gesture can cause the context-specific operation 1908 to be performed at the wrist-wearable device. Similarly, the first operation performed at the wrist-wearable device shown by the operation 2006 can correspond to the first spatial orientation of the operation 2118. Further, one of skill in the art will understand that any of the gestures relating to the operations shown in FIGS. 19 and 20 can cause operations to be performed at the second electronic device in operations 2124 and 2126.

In accordance with some embodiments, a wrist-wearable device is configured to perform or cause performance of any of L1-L18. In accordance with some embodiments, a wrist-wearable device comprises means for performing or causing performance of any of L1-L18. In accordance with some embodiments, a capsule housing the display is configured to couple with a band to form a wrist-wearable device, and the capsule includes one or more processors configured to perform or cause performance of any of L1-L18.

In accordance with some embodiments, a non-transitory, computer-readable storage medium including instructions that, when executed by a wrist-wearable device, cause the wrist-wearable device to perform or cause performance of any of L1-L18.

Example Systems

Figure 22A:
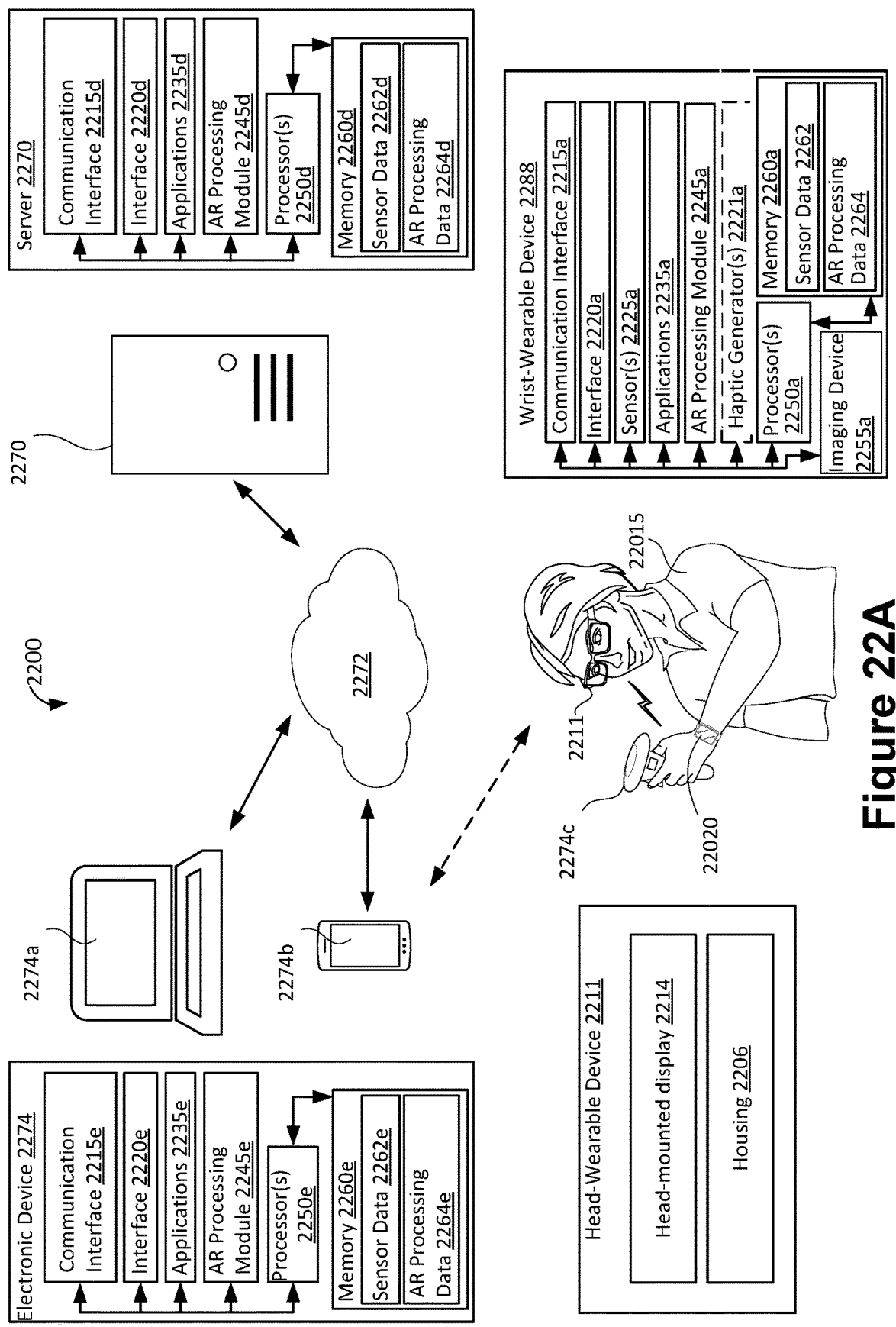
FIGS. 22A and 22B are block diagrams illustrating an example artificial-reality system in accordance with some embodiments.
Figure 22B:
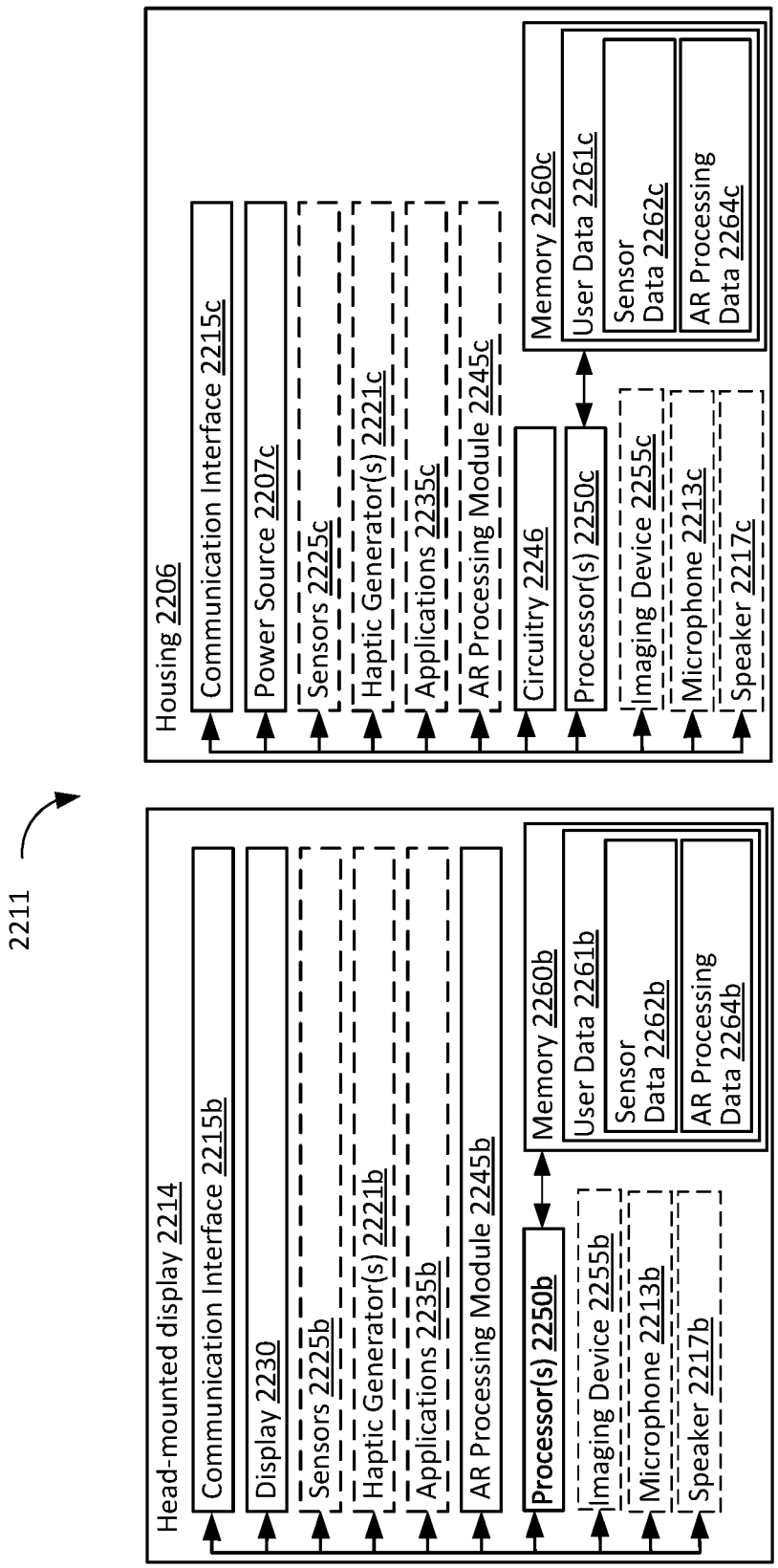

FIGS. 22A and 22B are block diagrams illustrating an example artificial-reality system in accordance with some embodiments. The system 2200 includes one or more devices for facilitating an interactivity with an artificial-reality environment in accordance with some embodiments. For example, the head-wearable device 2211 can present to the user 22015 with a user interface within the artificial-reality environment. As a non-limiting example, the system 2200 includes one or more wearable devices, which can be used in conjunction with one or more computing devices. In some embodiments, the system 2200 provides the functionality of a virtual-reality device, an augmented-reality device, a mixed-reality device, hybrid-reality device, or a combination thereof. In some embodiments, the system 2200 provides the functionality of a user interface and/or one or more user applications (e.g., games, word processors, messaging applications, calendars, clocks, etc.).

The system 2200 can include one or more of servers 2270, electronic devices 2274 (e.g., a computer, 2274a, a smartphone 2274b, a controller 2274c, and/or other devices), head-wearable devices 2211 (e.g., the AR system 1600 or the VR system 1650), and/or wrist-wearable devices 2288 (e.g., the wrist-wearable devices 22020 and/or 1550; FIGS. 15A-15C). In some embodiments, the one or more of servers 2270, electronic devices 2274, head-wearable devices 2211, and/or wrist-wearable devices 2288 are communicatively coupled via a network 2272. In some embodiments, the head-wearable device 2211 is configured to cause one or more operations to be performed by a communicatively coupled wrist-wearable device 2288, and/or the two devices can also both be connected to an intermediary device, such as a smartphone 2274b, a controller 2274c, or other device that provides instructions and data to and between the two devices. In some embodiments, the head-wearable device 2211 is configured to cause one or more operations to be performed by multiple devices in conjunction with the wrist-wearable device 2288. In some embodiments, instructions to cause the performance of one or more operations are controlled via an artificial-reality processing module 2245. The artificial-reality processing module 2245 can be implemented in one or more devices, such as the one or more of servers 2270, electronic devices 2274, head-wearable devices 2211, and/or wrist-wearable devices 2288. In some embodiments, the one or more devices perform operations of the artificial-reality processing module 2245, using one or more respective processors, individually or in conjunction with at least one other device as described herein. In some embodiments, the system 2200 includes other wearable devices not shown in FIG. 22A and FIG. 22B, such as rings, collars, anklets, gloves, and the like.

In some embodiments, the system 2200 provides the functionality to control or provide commands to the one or more computing devices 2274 based on a wearable device (e.g., head-wearable device 2211 or wrist-wearable device 2288) determining motor actions or intended motor actions of the user. A motor action is an intended motor action when before the user performs the motor action or before the user completes the motor action, the detected neuromuscular signals travelling through the neuromuscular pathways can be determined to be the motor action. Motor actions can be detected based on the detected neuromuscular signals, but can additionally (using a fusion of the various sensor inputs), or alternatively, be detected using other types of sensors (such as cameras focused on viewing hand movements and/or using data from an inertial measurement unit that can detect characteristic vibration sequences or other data types to correspond to particular in-air hand gestures). The one or more computing devices include one or more of a head-mounted display, smartphones, tablets, smart watches, laptops, computer systems, augmented reality systems, robots, vehicles, virtual avatars, user interfaces, a wrist-wearable device, and/or other electronic devices and/or control interfaces.

In some embodiments, the motor actions include digit movements, hand movements, wrist movements, arm movements, pinch gestures, index finger movements, middle finger movements, ring finger movements, little finger movements, thumb movements, hand clenches (or fists), waving motions, and/or other movements of the user's hand or arm.

In some embodiments, the user can define one or more gestures using the learning module. In some embodiments, the user can enter a training phase in which a user defined gesture is associated with one or more input commands that when provided to a computing device cause the computing device to perform an action. Similarly, the one or more input commands associated with the user-defined gesture can be used to cause a wearable device to perform one or more actions locally. The user-defined gesture, once trained, is stored in the memory 2260. Similar to the motor actions, the one or more processors 2250 can use the detected neuromuscular signals by the one or more sensors 2225 to determine that a user-defined gesture was performed by the user.

The electronic devices 2274 can also include a communication interface 2215e, an interface 2220e (e.g., including one or more displays, lights, speakers, and haptic generators), one or more sensors 2225e, one or more applications 2235e, an artificial-reality processing module 2245e, one or more processors 2250e, and memory 2260e (including sensor data 2262e and AR processing data 2264e). The electronic devices 2274 are configured to communicatively couple with the wrist-wearable device 2288 and/or head-wearable device 2211 (or other devices) using the communication interface 2215e. In some embodiments, the electronic devices 2274 are configured to communicatively couple with the wrist-wearable device 2288 and/or head-wearable device 2211 (or other devices) via an application programming interface (API). In some embodiments, the electronic devices 2274 operate in conjunction with the wrist-wearable device 2288 and/or the head-wearable device 2211 to perform the different operations and functions described herein.

The server 2270 includes a communication interface 2215*d*, one or more applications 2235*d*, an artificial-reality processing module 2245*d*, one or more processors 2250*d*, and memory 2260*d* (including sensor data 2262*d* and AR processing data 2264*d*). In some embodiments, the server 2270 is configured to receive sensor data from one or more devices, such as the head-wearable device 2211, the wrist-wearable device 2288, and/or electronic device 2274, and use the received sensor data to identify a gesture or user input. The server 2270 can generate instructions that cause the performance of operations and actions associated with a determined gesture or user input at communicatively coupled devices, such as the head-wearable device 2211.

The wrist-wearable device 2288 can also include a communication interface 2215*a*, an interface 2220*a* (e.g., including one or more displays, lights, speakers, and haptic generators), one or more sensors 2225*a*, one or more applications 2235*a*, an artificial-reality processing module 2245*a*, one or more processors 2250*a*, and memory 2260*a* (including sensor data 2262*a* and AR processing data 2264*a*). In some embodiments, the wrist-wearable device 2288 includes one or more haptic generators 2221*a*, one or more imaging devices 2255*a* (e.g., a camera), microphones, speakers, and/or one or more applications 2235*a*. The wrist-wearable device 2288 is configured to communicatively couple with one or more electronic devices 2274, head-wearable device 2211, servers 2270 (or other devices) using the communication interface 2215*a*. In some embodiments, the wrist-wearable device 2288 operates in conjunction with the electronic devices 2274, the head-wearable device 2211, and/or other device to perform the different operations and functions described herein.

The head-wearable device 2211 includes smart glasses (e.g., the augmented-reality glasses), artificial reality headsets (e.g., VR/AR headsets), or other head worn device. In some embodiments, one or more components of the head-wearable device 2211 are housed within a body of the HMD 2214 (e.g., frames of smart glasses, a body of a AR headset, etc.). In some embodiments, one or more components of the head-wearable device 2211 are stored within or coupled with lenses of the HMD 2214. Alternatively or in addition, in some embodiments, one or more components of the head-wearable device 2211 are housed within a modular housing 2206. The head-wearable device 2211 is configured to communicatively couple with other electronic device 2274 and/or a server 2270 using communication interface 2215 as discussed above.

FIG. 22B describes additional details of the HMD 2214 and modular housing 2206 described above in reference to 22A, in accordance with some embodiments.

The HMD 2214 includes a communication interface 2215, a display 2230, an AR processing module 2245*b*, one or more processors 2250*b*, and memory 2260*b* (including sensor data 2262*b* and AR processing data 2264*b*). In some embodiments, the HMD 2214 includes one or more sensors 2225*b*, one or more haptic generators 2221*b*, one or more imaging devices 2255*b* (e.g., a camera), microphones 2213*b*, speakers 2217*b*, and/or one or more applications 2235*b*. The HMD 2214 operates in conjunction with the housing 2206 to perform one or more operations of a head-wearable device 2211, such as capturing camera data, presenting a representation of the image data at a coupled display, operating one or more applications 2235*b*, and/or allowing a user to participate in an AR environment.

The housing 2206 include(s) a communication interface 2215*c*, circuitry 2246, a power source 2207 (e.g., a battery for powering one or more electronic components of the housing 2206 and/or providing usable power to the HMD 2214), one or more processors 2250*c*, and memory 2260*c* (including sensor data 2262*c* and AR processing data 2264*c*). In some embodiments, the housing 2206 can include one or more supplemental components that add to the functionality of the HMD 2214. For example, in some embodiments, the housing 2206 can include one or more sensors 2225*c*, an AR processing module 2245*c*, one or more haptic generators 2221*c*, one or more imaging devices 2255*c*, one or more microphones 2213*c*, one or more speakers 2217*c*, etc. The housing 106 is configured to couple with the HMD 2214 via the one or more retractable side straps. More specifically, the housing 2206 is a modular portion of the head-wearable device 2211 that can be removed from head-wearable device 2211 and replaced with another housing (which includes more or less functionality). The modularity of the housing 2206 allows a user to adjust the functionality of the head-wearable device 2211 based on their needs.

In some embodiments, the communications interface 2215 is configured to communicatively couple the housing 2206 with the HMD 2214, the server 2270, and/or other electronic device 2274 (e.g., the controller 2274*c*, a tablet, a computer, etc.). The communication interface 2215 is used to establish wired or wireless connections between the housing 2206 and the other devices. In some embodiments, the communication interface 2215 includes hardware capable of data communications using any of a variety of custom or standard Wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol. In some embodiments, the housing 2206 is configured to communicatively couple with the HMD 2214 and/or other electronic device 2274 via an application programming interface (API).

In some embodiments, the power source 2207 is a battery. The power source 2207 can be a primary or secondary battery source for the HMD 2214. In some embodiments, the power source 2207 provides useable power to the one or more electrical components of the housing 2206 or the HMD 2214. For example, the power source 2207 can provide usable power to the sensors 2221, the speakers 2217, the HMD 2214, and the microphone 2213. In some embodiments, the power source 2207 is a rechargeable battery. In some embodiments, the power source 2207 is a modular battery that can be removed and replaced with a fully charged battery while it is charged separately.

The one or more sensors 2225 can include heart rate sensors, neuromuscular-signal sensors (e.g., electromyography (EMG) sensors), SpO2 sensors, altimeters, thermal sensors or thermal couples, ambient light sensors, ambient noise sensors, and/or inertial measurement units (IMU)s. Additional non-limiting examples of the one or more sensors 2225 include, e.g., infrared, pyroelectric, ultrasonic, microphone, laser, optical, Doppler, gyro, accelerometer, resonant LC sensors, capacitive sensors, acoustic sensors, and/or inductive sensors. In some embodiments, the one or more sensors 2225 are configured to gather additional data about the user (e.g., an impedance of the user's body). Examples of sensor data output by these sensors includes body temperature data, infrared range-finder data, positional information, motion data, activity recognition data, silhouette detection and recognition data, gesture data, heart rate data, and other wearable device data (e.g., biometric readings and output, accelerometer data). The one or more sensors 2225 can include location sensing devices (e.g., GPS) configured to provide location information. In some embodiment, the data measured or sensed by the one or more sensors 2225 is stored in memory 2260. In some embodiments, the housing 2206 receives sensor data from communicatively coupled devices, such as the HMD 2214, the server 2270, and/or other electronic device 2274. Alternatively, the housing 2206 can provide sensors data to the HMD 2214, the server 2270, and/or other electronic device 2274.

The one or more haptic generators 2221 can include one or more actuators (e.g., eccentric rotating mass (ERM), linear resonant actuators (LRA), voice coil motor (VCM), pieczo haptic actuator, thermoelectric devices, solenoid actuators, ultrasonic transducers or sensors, etc.). In some embodiments, the one or more haptic generators 2221 are hydraulic, pneumatic, electric, and/or mechanical actuators. In some embodiments, the one or more haptic generators 2221 are part of a surface of the housing 2206 that can be used to generate a haptic response (e.g., a thermal change at the surface, a tightening or loosening of a band, increase or decrease in pressure, etc.). For example, the one or more haptic generators 2225 can apply vibration stimulations, pressure stimulations, squeeze simulations, shear stimulations, temperature changes, or some combination thereof to the user. In addition, in some embodiments, the one or more haptic generators 2221 include audio generating devices (e.g., speakers 2217 and other sound transducers) and illuminating devices (e.g., light-emitting diodes (LED)s, screen displays, etc.). The one or more haptic generators 2221 can be used to generate different audible sounds and/or visible lights that are provided to the user as haptic responses. The above list of haptic generators is non-exhaustive; any affective devices can be used to generate one or more haptic responses that are delivered to a user.

In some embodiments, the one or more applications 2235 include social-media applications, banking applications, health applications, messaging applications, web browsers, gaming application, streaming applications, media applications, imaging applications, productivity applications, social applications, etc. In some embodiments, the one or more applications 2235 include artificial reality applications. The one or more applications 2235 are configured to provide data to the head-wearable device 2211 for performing one or more operations. In some embodiments, the one or more applications 2235 can be displayed via a display 2230 of the head-wearable device 2211 (e.g., via the HMD 2214).

In some embodiments, instructions to cause the performance of one or more operations are controlled via an artificial reality (AR) processing module 2245. The AR processing module 2245 can be implemented in one or more devices, such as the one or more of servers 2270, electronic devices 2274, head-wearable devices 2211, and/or wrist-wearable devices 2270. In some embodiments, the one or more devices perform operations of the AR processing module 2245, using one or more respective processors, individually or in conjunction with at least one other device as described herein. In some embodiments, the AR processing module 2245 is configured process signals based at least on sensor data. In some embodiments, the AR processing module 2245 is configured process signals based on image data received that captures at least a portion of the user hand, mouth, facial expression, surrounding, etc. For example, the housing 2206 can receive EMG data and/or IMU data from one or more sensors 2225 and provide the sensor data to the AR processing module 2245 for a particular operation (e.g., gesture recognition, facial recognition, etc.). The AR processing module 2245, causes a device communicatively coupled to the housing 2206 to perform an operation (or action). In some embodiments, the AR processing module 2245 performs different operations based on the sensor data and/or performs one or more actions based on the sensor data. The AR processing module 2245 is configured to perform the different operations described herein.

In some embodiments, the one or more imaging devices 2255 can include an ultra-wide camera, a wide camera, a telephoto camera, a depth-sensing cameras, or other types of cameras. In some embodiments, the one or more imaging devices 2255 are used to capture image data and/or video data. The imaging devices 2255 can be coupled to a portion of the housing 2206. The captured image data can be processed and stored in memory and then presented to a user for viewing. The one or more imaging devices 2255 can include one or more modes for capturing image data or video data. For example, these modes can include a high-dynamic range (HDR) image capture mode, a low light image capture mode, burst image capture mode, and other modes. In some embodiments, a particular mode is automatically selected based on the environment (e.g., lighting, movement of the device, etc.). For example, a wrist-wearable device with HDR image capture mode and a low light image capture mode active can automatically select the appropriate mode based on the environment (e.g., dark lighting may result in the use of low light image capture mode instead of HDR image capture mode). In some embodiments, the user can select the mode. The image data and/or video data captured by the one or more imaging devices 2255 is stored in memory 2260 (which can include volatile and non-volatile memory such that the image data and/or video data can be temporarily or permanently stored, as needed depending on the circumstances).

The circuitry 2246 is configured to facilitate the interaction between the housing 2206 and the HMD 2214. In some embodiments, the circuitry 2246 is configured to regulate the distribution of power between the power source 2207 and the HMD 2214. In some embodiments, the circuitry 746 is configured to transfer audio and/or video data between the HMD 2214 and/or one or more components of the housing 2206.

The one or more processors 2250 can be implemented as any kind of computing device, such as an integrated system-on-a-chip, a microcontroller, a fixed programmable gate array (FPGA), a microprocessor, and/or other application specific integrated circuits (ASICs). The processor may operate in conjunction with memory 2260. The memory 2260 may be or include random access memory (RAM), read-only memory (ROM), dynamic random access memory (DRAM), static random access memory (SRAM) and magnetoresistive random access memory (MRAM), and may include firmware, such as static data or fixed instructions, basic input/output system (BIOS), system functions, configuration data, and other routines used during the operation of the housing and the processor 2250. The memory 2260 also provides a storage area for data and instructions associated with applications and data handled by the processor 2250.

In some embodiments, the memory 2260 stores at least user data 2261 including sensor data 2262 and AR processing data 2264. The sensor data 2262 includes sensor data monitored by one or more sensors 2225 of the housing 2206 and/or sensor data received from one or more devices communicative coupled with the housing 2206, such as the HMD 2214, the smartphone 2274*b*, the controller 2274*c*, etc. The sensor data 2262 can include sensor data collected over a predetermined period of time that can be used by the AR processing module 2245. The AR processing data 2264 can include one or more one or more predefined camera-control gestures, user defined camera-control gestures, predefined non-camera-control gestures, and/or user defined non-camera-control gestures. In some embodiments, the AR processing data 2264 further includes one or more predetermined threshold for different gestures.

Any data collection performed by the devices described herein and/or any devices configured to perform or cause the performance of the different embodiments described above in reference to any of the Figures, hereinafter the "devices," is done with user consent and in a manner that is consistent with all applicable privacy laws. Users are given options to allow the devices to collect data, as well as the option to limit or deny collection of data by the devices. A user is able to opt-in or opt-out of any data collection at any time. Further, users are given the option to request the removal of any collected data.

It will be understood that, although the terms "first," "second," etc., may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described to best explain principles of operation and practical applications, to thereby enable others skilled in the art.

What is claimed is:

1. A non-transitory computer-readable storage medium including instructions that, when executed by a wearable device, cause the wearable device to perform or cause performance of operations for:

receiving, from one or more sensors of a wrist-wearable device, data associated with performance of an in-air hand gesture during a first period of time by a wearer of the wrist-wearable device;

in accordance with determining that the data indicates that the wrist-wearable device had a first orientation when the in-air hand gesture was performed during the first period of time, causing performance of a first operation at the wrist-wearable device;

receiving, from the one or more sensors of the wrist-wearable device, new data associated with performance of the in-air hand gesture during a second period of time by the wearer of the wrist-wearable device, the second period of time being after the first period of time; and in accordance with determining that the new data indicates that the wrist-wearable device had a second orientation when the in-air hand gesture was performed during the second period of time, causing performance of a second operation at the wrist-wearable device, wherein:

the in-air hand gesture that was performed while the wrist-wearable device had the first orientation and the in-air hand gesture that was performed while the wrist-wearable device had the second orientation correspond to a same in-air hand gesture, and the second operation is distinct from the first operation, and the second orientation of the wrist-wearable device is distinct from the first orientation of the wrist-wearable device.

2. The non-transitory, computer-readable storage medium of claim 1, further comprising instructions for:

receiving, from the one or more sensors of the wrist-wearable device, additional data associated with performance of the in-air hand gesture during a third period of time by the wearer of the wrist-wearable device, the third period of time being after the first period of time and the second period of time; and in accordance with determining that the additional data indicates that the wrist-wearable device had a third orientation when the in-air hand gesture was performed during the third period of time, causing performance of a third operation at the wrist-wearable device, wherein:

the third operation is distinct from the first operation and second operation, and the third orientation of the wrist-wearable device is distinct from the first orientation of the wrist-wearable device and the second orientation of the wrist-wearable device.

3. The non-transitory, computer-readable storage medium of claim 2, wherein the first operation is an operation associated with use of a camera of the wrist-wearable device, and the second operation does not relate to use of the camera.

4. The non-transitory, computer-readable storage medium of claim 1, wherein the in-air hand gesture is performed while the wrist-wearable device is displaying a clock-face user interface.

5. The non-transitory, computer-readable storage medium of claim 2, wherein:

the first operation is an operation associated with use of a camera of the wrist-wearable device, the second operation is an operation associated with providing a voice command, and the third operation is an operation associated with use of a media player.

6. The non-transitory, computer-readable storage medium of claim 5, wherein:

the wrist-wearable device is determined to be in the first orientation when sensor data from the wrist-wearable device indicates that the wrist-wearable device is orientated to take a picture of the wearer's face, the wrist-wearable device is determined to be the second orientation when sensor data from the wrist-wearable device indicates that the wrist-wearable device is oriented below a chin level of a user, and the wrist-wearable device is determined to be the third orientation when sensor data from the wrist-wearable device indicates that the wrist-wearable device is in an orientation that places the wrist-wearable device next to an ear of the user.

7. The non-transitory, computer-readable storage medium of claim 2, further comprising instructions for:

receiving, from the one or more sensors of the wrist-wearable device, further additional data associated with performance of another in-air hand gesture, different from the in-air hand gesture, during a fourth period of time by the wearer of the wrist-wearable device; and in accordance with determining that the further additional data indicates that the wrist-wearable device had the third orientation when the other in-air hand gesture was performed during the fourth period of time, causing performance of a fifth operation at the wrist-wearable device, different from the third operation.

8. The non-transitory, computer-readable storage medium of claim 1, further comprising instructions for:

receiving, from the one or more sensors of the wrist-wearable device, additional data associated with performance of another in-air hand gesture, different from the in-air hand gesture, during a third period of time by the wearer of the wrist-wearable device; and in accordance with determining that the additional data indicates that the wrist-wearable device had the first orientation when the other in-air hand gesture was performed during the third period of time, causing performance of a third operation at the wrist-wearable device, different from the first operation.

9. The non-transitory, computer-readable storage medium of claim 8, further comprising instructions for:

receiving, from the one or more sensors of the wrist-wearable device, more data associated with performance of the other in-air hand gesture during a fourth period of time by the wearer of the wrist-wearable device; and in accordance with determining that the more data indicates that the wrist-wearable device had the second orientation when the other in-air hand gesture was performed during the fourth period of time, causing performance of a fourth operation at the wrist-wearable device, different from the second operation.

10. The non-transitory, computer-readable storage medium of claim 1, wherein the in-air hand gesture is at least partially detected by data sensed by one or more of an inertial measurement unit (IMU) and a neuromuscular-signal sensor.

11. The non-transitory, computer-readable storage medium of claim 1, wherein the first operation is performed using a first application, and the second operation is performed using a second application, or the first operation is performed after an operating system of the wrist-wearable device provides data to the first application concerning performance of the in-air hand gesture, and the second operation is performed after an operating system of the wrist-wearable device provides data to the second application concerning performance of the other in-air hand gesture.

12. The non-transitory, computer-readable storage medium of claim 1, wherein the first operation and the second operation are controlled by an operating system of the wrist-wearable device.

13. The non-transitory, computer-readable storage medium of claim 1, wherein the in-air hand gesture is performed while the wrist-wearable device is in a display-off state.

14. A wrist-wearable device, comprising:

a display;

one or more processors; and memory comprising instructions that, when executed by the wrist-wearable device, cause performance of operations for:

receiving, from one or more sensors of a wrist-wearable device, data associated with performance of an in-air hand gesture during a first period of time by a wearer of the wrist-wearable device;

in accordance with determining that the data indicates that the wrist-wearable device had a first orientation when the in-air hand gesture was performed during the first period of time, causing performance of a first operation at the wrist-wearable device;

receiving, from the one or more sensors of the wrist-wearable device, new data associated with performance of the in-air hand gesture during a second period of time by the wearer of the wrist-wearable device, the second period of time being after the first period of time; and in accordance with determining that the new data indicates that the wrist-wearable device had a second orientation when the in-air hand gesture was performed during the second period of time, causing performance of a second operation at the wrist-wearable device, wherein:

the in-air hand gesture that was performed while the wrist-wearable device had the first orientation and the in-air hand gesture that was performed while the wrist-wearable device had the second orientation correspond to a same in-air hand gesture, and the second operation is distinct from the first operation, and the second orientation of the wrist-wearable device is distinct from the first orientation of the wrist-wearable device.

15. The wrist-wearable device of claim 14, wherein the memory further comprises instructions for:

receiving, from the one or more sensors of the wrist-wearable device, additional data associated with performance of the in-air hand gesture during a third period of time by the wearer of the wrist-wearable device, the third period of time being after the first period of time and the second period of time; and in accordance with determining that the additional data indicates that the wrist-wearable device had a third orientation when the in-air hand gesture was performed during the third period of time, causing performance of a third operation at the wrist-wearable device, wherein:

the third operation is distinct from the first operation and second operation, and the third orientation of the wrist-wearable device is distinct from the first orientation of the wrist-wearable device and the second orientation of the wrist-wearable device.

16. A method of interpreting in-air hand gestures based on orientation of a wrist-wearable device, the method comprising:
- receiving, from one or more sensors of a wrist-wearable device, data associated with performance of an in-air hand gesture during a first period of time by a wearer of the wrist-wearable device;
- in accordance with determining that the data indicates that the wrist-wearable device had a first orientation when the in-air hand gesture was performed during the first period of time, causing performance of a first operation at the wrist-wearable device;
- receiving, from the one or more sensors of the wrist-wearable device, new data associated with performance of the in-air hand gesture during a second period of time by the wearer of the wrist-wearable device, the second period of time being after the first period of time; and
- in accordance with determining that the new data indicates that the wrist-wearable device had a second orientation when the in-air hand gesture was performed during the second period of time, causing performance of a second operation at the wrist-wearable device, wherein:
  - the in-air hand gesture that was performed while the wrist-wearable device had the first orientation and the in-air hand gesture that was performed while the wrist-wearable device had the second orientation correspond to a same in-air hand gesture, and
  - the second operation is distinct from the first operation, and
  - the second orientation of the wrist-wearable device is distinct from the first orientation of the wrist-wearable device.

17. The method of claim 16, further including:
- receiving, from the one or more sensors of the wrist-wearable device, additional data associated with performance of the in-air hand gesture during a third period of time by the wearer of the wrist-wearable device, the third period of time being after the first period of time and the second period of time; and
- in accordance with determining that the additional data indicates that the wrist-wearable device had a third orientation when the in-air hand gesture was performed during the third period of time, causing performance of a third operation at the wrist-wearable device, wherein:
  - the third operation is distinct from the first operation and second operation, and
  - the third orientation of the wrist-wearable device is distinct from the first orientation of the wrist-wearable device and the second orientation of the wrist-wearable device.

18. The method of claim 16, further including:
- receiving, from the one or more sensors of the wrist-wearable device, additional data associated with performance of another in-air hand gesture, different from the in-air hand gesture, during a third period of time by the wearer of the wrist-wearable device; and
- in accordance with determining that the additional data indicates that the wrist-wearable device had the first orientation when the other in-air hand gesture was performed during the third period of time, causing performance of a third operation at the wrist-wearable device, different from the first operation.

19. The wrist-wearable device of claim 14, further comprising instructions for:
- receiving, from the one or more sensors of the wrist-wearable device, additional data associated with performance of another in-air hand gesture, different from the in-air hand gesture, during a third period of time by the wearer of the wrist-wearable device; and
- in accordance with determining that the additional data indicates that the wrist-wearable device had the first orientation when the other in-air hand gesture was performed during the third period of time, causing performance of a third operation at the wrist-wearable device, different from the first operation.

20. The wrist-wearable device of claim 14, wherein the first operation is an operation associated with use of a camera of the wrist-wearable device, and the second operation does not relate to use of the camera.

* * * * *